US008762882B2

(12) United States Patent
Ikeda et al.

(10) Patent No.: US 8,762,882 B2
(45) Date of Patent: Jun. 24, 2014

(54) INFORMATION PROCESSING APPARATUS, CONTROL METHOD FOR USE THEREIN, AND COMPUTER PROGRAM

(75) Inventors: Takuo Ikeda, Tokyo (JP); Makoto Imamura, Tokyo (JP); Hidenori Karasawa, Tokyo (JP); Yoshiyasu Kubota, Kanagawa (JP); Takashi Kitao, Tokyo (JP); Shogo Sato, Saitama (JP)

(73) Assignee: Sony Corporation, Tokyo (JP)

( * ) Notice: Subject to any disclaimer, the term of this patent is extended or adjusted under 35 U.S.C. 154(b) by 969 days.

(21) Appl. No.: 12/024,799

(22) Filed: Feb. 1, 2008

(65) Prior Publication Data

US 2008/0187248 A1 Aug. 7, 2008

(30) Foreign Application Priority Data

Feb. 5, 2007 (JP) ................................. 2007-025097
Feb. 5, 2007 (JP) ................................. 2007-025098
Feb. 5, 2007 (JP) ................................. 2007-025099

(51) Int. Cl.
*G06F 3/048* (2013.01)

(52) U.S. Cl.
USPC ............ 715/789; 715/802; 715/837; 715/838

(58) Field of Classification Search
USPC ......................................................... 715/716
See application file for complete search history.

(56) References Cited

U.S. PATENT DOCUMENTS

| | | | | |
|---|---|---|---|---|
| 6,160,553 A * | 12/2000 | Robertson et al. | ............ | 715/767 |
| 6,976,229 B1 * | 12/2005 | Balabanovic et al. | ........ | 715/838 |
| 7,051,291 B2 * | 5/2006 | Sciammarella et al. | ...... | 715/838 |
| 7,058,901 B1 * | 6/2006 | Hafey et al. | .................... | 715/792 |
| 7,278,115 B1 * | 10/2007 | Conway et al. | ............... | 715/838 |
| 7,301,672 B2 * | 11/2007 | Abe et al. | ........................ | 358/1.9 |
| 7,318,196 B2 * | 1/2008 | Crow et al. | .................... | 715/716 |
| 7,325,199 B1 * | 1/2008 | Reid | ............................. | 715/723 |
| 7,444,593 B1 * | 10/2008 | Reid | ............................. | 715/723 |

(Continued)

FOREIGN PATENT DOCUMENTS

| | | |
|---|---|---|
| JP | 06-028095 | 2/1994 |
| JP | 2001-34411 | 2/2001 |

(Continued)

OTHER PUBLICATIONS

Japanese Office Action issued Aug. 30, 2011 in Japanese Patent Application No. JP2007-025098, filed Feb. 5, 2007.

(Continued)

*Primary Examiner* — William Titcomb
(74) *Attorney, Agent, or Firm* — Oblon, Spivak, McClelland, Maier & Neustadt, L.L.P.

(57) ABSTRACT

Disclosed herein is an information processing apparatus including: operation accepting means for accept an operation input; image storing means for storing a plurality of images; management information storing means for storing management information corresponding to the plurality of images stored in the image storing means; image drawing means for drawing, in a display area including at least an image display area, at least one of images stored in the image storing means onto the image display area in a predetermined sequence; and controlling means for, when an operation input commanding selection of an image included in the image display area has been accepted by the operation accepting means, controlling recording of the selection of the image to management information stored in the management information storing means in correspondence with the image.

19 Claims, 44 Drawing Sheets

(56) References Cited

U.S. PATENT DOCUMENTS

| | | | |
|---|---|---|---|
| 7,457,485 B2* | 11/2008 | Inou | 382/305 |
| 7,458,025 B2* | 11/2008 | Crow et al. | 715/723 |
| 7,522,174 B2* | 4/2009 | Yamamoto et al. | 345/619 |
| 7,523,398 B2* | 4/2009 | Watanabe | 715/745 |
| 7,552,187 B2* | 6/2009 | Fuchs | 709/208 |
| 7,797,641 B2* | 9/2010 | Karukka et al. | 715/802 |
| 7,864,978 B2* | 1/2011 | Anthony et al. | 382/100 |
| 7,900,161 B2* | 3/2011 | Nakamura et al. | 715/830 |
| 2004/0056880 A1* | 3/2004 | Matsuoka et al. | 345/716 |
| 2004/0177319 A1* | 9/2004 | Horn | 715/501.1 |
| 2006/0209089 A1* | 9/2006 | Date | 345/632 |
| 2006/0230362 A1* | 10/2006 | Matsusaka | 715/838 |
| 2006/0265654 A1* | 11/2006 | Nakamura et al. | 715/704 |
| 2007/0011614 A1* | 1/2007 | Crow et al. | 715/723 |
| 2007/0094611 A1* | 4/2007 | Sasaki | 715/804 |
| 2007/0118800 A1* | 5/2007 | Moore et al. | 715/730 |
| 2007/0118818 A1* | 5/2007 | Gunderson et al. | 715/838 |
| 2007/0177225 A1* | 8/2007 | Morishita | 358/474 |
| 2007/0220441 A1* | 9/2007 | Melton et al. | 715/781 |
| 2007/0260994 A1* | 11/2007 | Sciammarella et al. | 715/769 |
| 2007/0271518 A1* | 11/2007 | Tischer et al. | 715/744 |
| 2008/0046809 A1* | 2/2008 | Oshima et al. | 715/234 |
| 2008/0046925 A1* | 2/2008 | Lee et al. | 725/37 |
| 2008/0059906 A1* | 3/2008 | Toki | 715/810 |
| 2009/0138825 A1* | 5/2009 | Duarte | 715/838 |

FOREIGN PATENT DOCUMENTS

| | | |
|---|---|---|
| JP | 2001-231005 | 8/2001 |
| JP | 2001-306375 | 11/2001 |
| JP | 2001-306475 | 11/2001 |
| JP | 2002-10056 A | 1/2002 |
| JP | 2002-055750 | 2/2002 |
| JP | 2003-323384 | 11/2003 |
| JP | 2004-152172 | 5/2004 |
| JP | 2004-213428 | 7/2004 |
| JP | 2004-349778 | 12/2004 |
| JP | 2005-031747 | 2/2005 |
| JP | 2005-033711 | 2/2005 |
| JP | 2005-33711 | 2/2005 |
| JP | 2005-39486 | 2/2005 |
| JP | 2005-039486 | 2/2005 |
| JP | 2005-269011 | 9/2005 |
| JP | 2005-286608 | 10/2005 |
| JP | 2005-321512 | 11/2005 |
| JP | 2006-139505 | 6/2006 |
| JP | 2006-146623 | 6/2006 |
| JP | 2006-173796 | 6/2006 |
| JP | 2006-227692 | 8/2006 |
| JP | 2006-252279 | 9/2006 |

OTHER PUBLICATIONS

Japanese Office Action issued May 15, 2012 in patent application No. 2007-025097.

Japanese Office Action issued Jul. 24, 2012 in Japanese Patent Application No. 2007-025099, 4 pages.

Japanese Office Action issued Jul. 23, 2013, in Japan Patent Application No. 2007-025097.

* cited by examiner

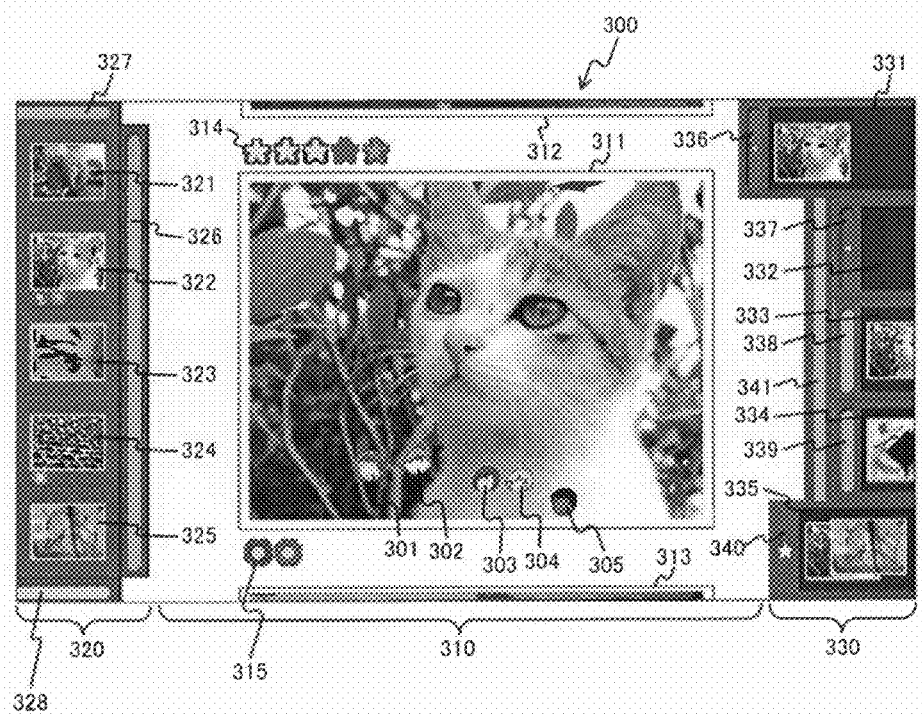

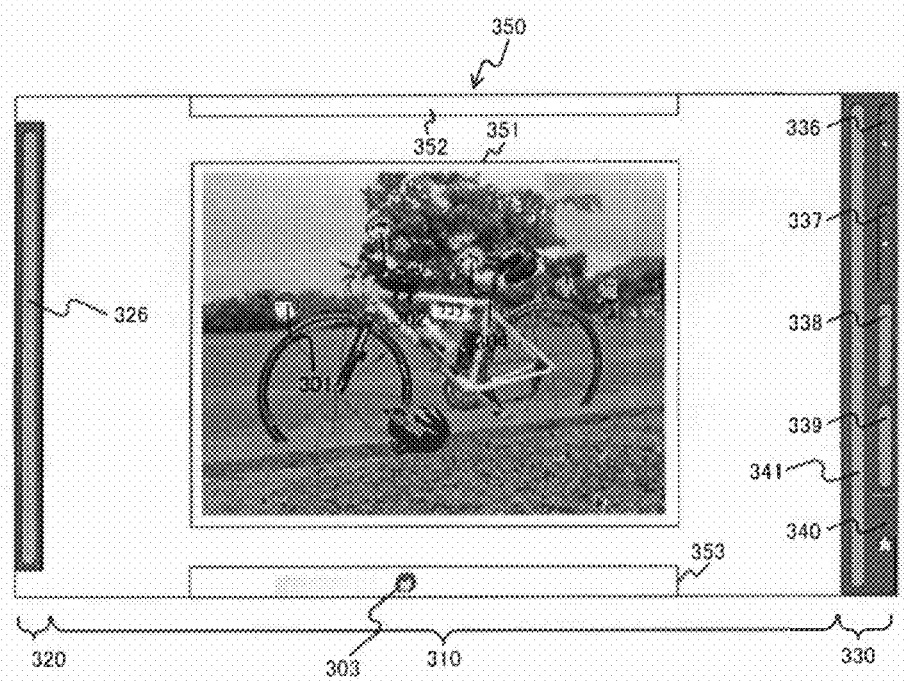

PRESS "R" KEY

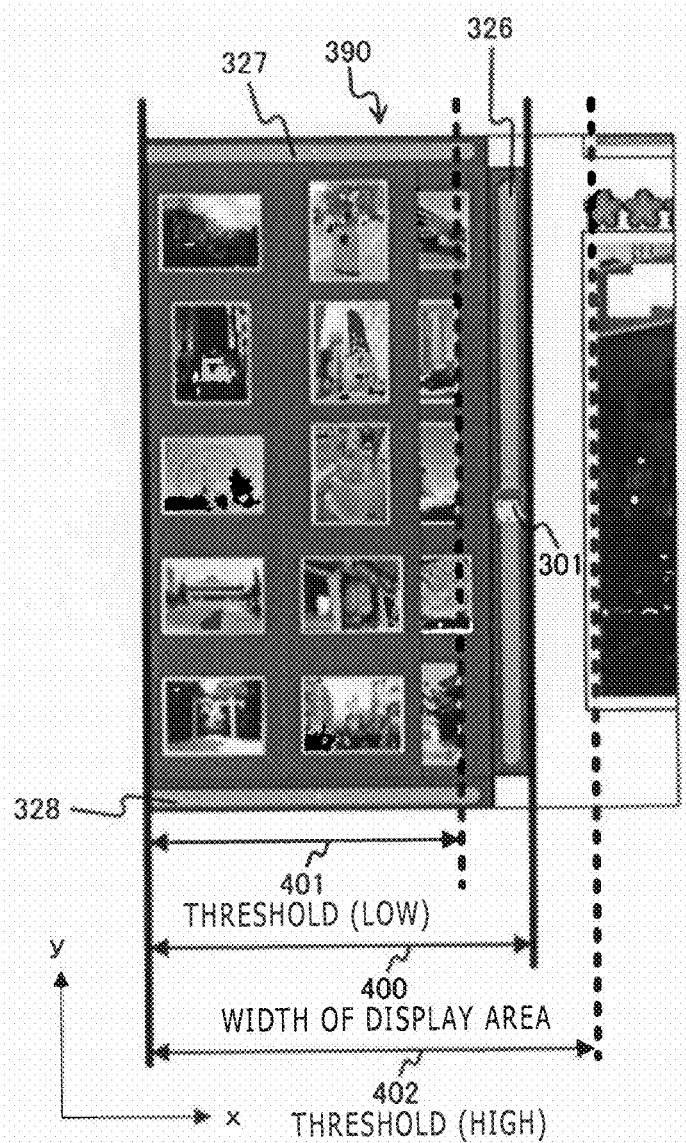

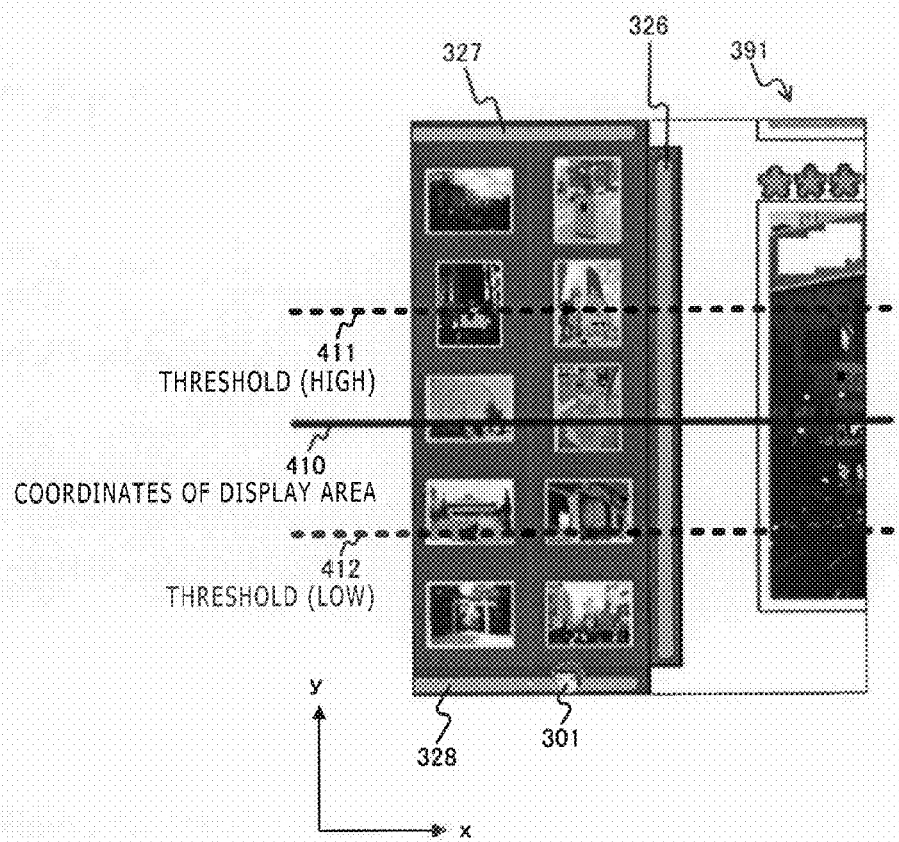

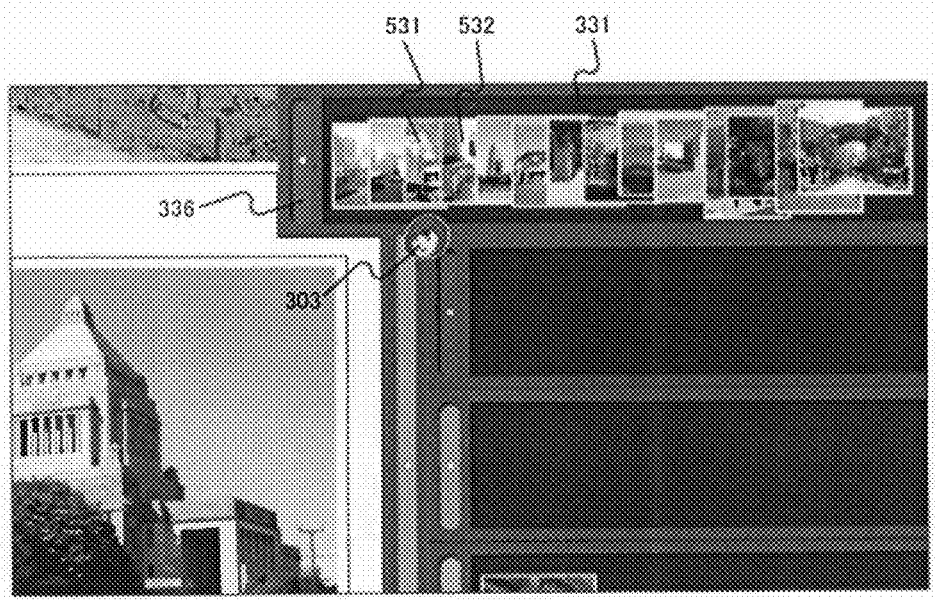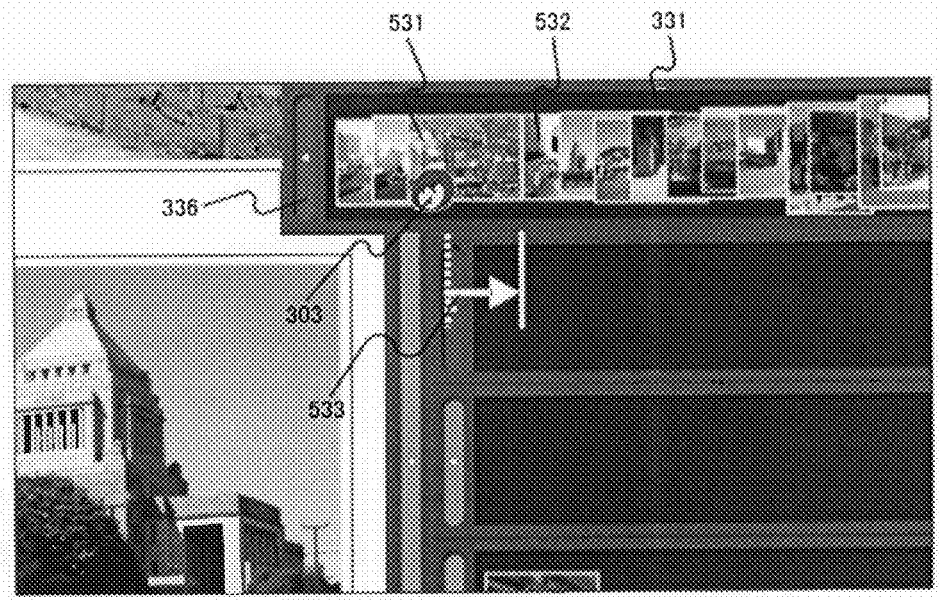

INFORMATION PROCESSING APPARATUS, CONTROL METHOD FOR USE THEREIN, AND COMPUTER PROGRAM

CROSS REFERENCES TO RELATED APPLICATIONS

The present invention contains subject matter related to Japanese Patent Application JP 2007-025097, JP2007-025098 and JP2007-025099 filed in the Japan Patent Office on Feb. 5, 2007, the entire contents of which being incorporated herein by reference.

BACKGROUND OF THE INVENTION

1. Field of the Invention

The present invention relates to an information apparatus and, more particularly, to an information processing apparatus, a control method for use in these apparatuses, and a computer program for making a computer execute this program that are configured to handle a plurality of display images by use of a pointing device, such as a mouse.

2. Description of the Related Art

Today, most ordinary families have information processing apparatuses, such as personal computers. Because these information processing apparatuses are often operated mainly by one person, the interfaces between apparatus and human, such as keyboards and mouses, and application software are often configured to be operated on a single-operator basis.

Also, more and more ordinary families are installing information processing apparatuses, such as living-room personal computers (PCs) and living-room Internet television receivers that are operated and used by two or more family members. Therefore, various kinds of information processing apparatuses, such as living-room PCs and living-room Internet television receivers are proposed.

In addition, information processing apparatuses having large-size screen displays are proposed to allow ordinary families to view video for example on a large-sized screen in living rooms.

For example, it is possible for family members to view images taken by a digital still camera for example on one of the above-mentioned information processing apparatuses in the living room. It is also possible to interconnect, via a network, two or more of the above-mentioned information processing apparatuses, thereby allowing people to view images taken by a digital still camera for example displayed on the display monitor of each of the interconnected information processing apparatuses, for example. Thus, many people can view images for example on the same screen in each of ordinary families and other places, so that technologies are proposed for many people to easily view images displayed on each display monitor.

For example, an image display apparatus is proposed in which, when a display switching operation is made from a status in which one image is displayed in the entire screen of the display block to a status in which many images are displayed in one screen as an index, the image displayed immediately before the switching or the images near that image are preferentially displayed as reduced (refer to, for example, Japanese Patent Laid-Open 2001-231005 (FIG. 1), hereinafter referred to as Patent Document 1).

SUMMARY OF THE INVENTION

According to the above-mentioned related-art technologies disclosed in the above-mentioned Patent Document 1, when display switching is made from a full screen display to an index image display, a predetermined reduced image is preferentially displayed, so that the reduced screen that is displayed immediately after the display switching is easily recognized by many viewing people.

Now, assume that two or more family members view, in the living room for example, two or more images taken by a digital still camera for example displayed on the display monitor of an information processing apparatus configured to be operated mainly by one person. In this case, it is possible that the representative member (the father for example) of the family operates the mouse for example to sequentially operates images displayed on the display monitor.

If the representative member of a family makes an operation when family members view images as described above, the likings of the representative member are preferred and the likings of the other members are only verbally transmitted to the representative member. In such a situation, it is difficult for the likings of the other members to be reflected on the operation by the representative member, thereby possibly lowering the interest of the other members in the viewing activities.

If the images displayed on a display monitor can be easily operated by each audience member, the viewing interest thereof may be significantly enhanced. Also, in a situation where images displayed on a display monitor are operated by many viewers, it is important for these images to be easily seen by operators and viewers.

Therefore, the present invention addresses the above-identified and other problems associated with related-art methods and apparatuses and solves the addressed problems by providing an information processing apparatus, a control method for use in these apparatuses, and a computer program that are configured to allow the easy operation of two or more displayed images.

In carrying out the invention and according to one embodiment thereof, there is provided an information processing apparatus. This information processing apparatus has operation accepting means for accept an operation input; image storing means for storing a plurality of images; management information storing means for storing management information corresponding to the plurality of images stored in the image storing means; image drawing means for drawing, in a display area including at least an image display area, at least one of images stored in the image storing means onto the image display area in a predetermined sequence; and controlling means for, when an operation input commanding selection of an image included in the image display area has been accepted by the operation accepting means, controlling recording of the selection of the image to management information stored in the management information storing means in correspondence with the image.

The above-mentioned information processing apparatus further has reduced image storing means for storing reduced images corresponding to the plurality of images stored in the image storing means wherein, in a display area including at least the image display area and the a storage area divided into a plurality of areas, the image drawing means draws a reduced image corresponding to an image stored in the image storing means onto the storage area and, if an operation input commanding selection of an image included in the image display area in correspondence with any of the storage areas has been accepted by the operation accepting means, the controlling means records the area selected in correspondence with the image to management information stored in the management information storage in correspondence with the image and controls the image drawing means to draw the reduced image stored in the reduced image storing means in correspondence with the image onto the image selected in correspondence with the image.

In the above-mentioned information processing apparatus, if an operation input commanding selection of an image included in the image display area in correspondence with any of the storage areas has been accepted by the operation accepting means, the controlling means controls the image drawing means to draw a marker indicative of an area selected in correspondence with the image in the proximity of the image included in the image display area.

In the above-mentioned information processing apparatus, if at least two operation inputs commanding selection of one image included in the image display area have been accepted by the operation accepting means, the controlling means records the number of operation inputs commanding the selection to management information stored in the management information storing means in correspondence with the image and controls the image drawing means to draw, onto the image display area, at least one image of images stored in the image storing means in a sequence in accordance with the number of accepted operation inputs commanding the selection recorded to the management information.

In the above-mentioned information processing apparatus, if a predetermined operation input has been accepted by the operation accepting means, the controlling means controls the image drawing means to draw so as to execute at least one of enlargement and reduction of at least one of the storage areas.

In the above-mentioned information processing apparatus, the image drawing means draws each of the storage areas as a rectangular area adjacent to the image display area and, if an operation input commanding movement of an end portion adjacent to the image display area in each of the storage areas toward the image display area has been accepted by the operation accepting means, the controlling means controls the image drawing means to draw so as to move the end portion in accordance with the operation input to enlarge each of the storage areas.

In the above-mentioned information processing apparatus, if at least two reduced images are drawn in any of the storage areas, the controlling means controls the image drawing means to draw such that reduced images are overlapped each other with at least a part thereof displayed in the storage area.

In the above-mentioned information processing apparatus, the image drawing means draws, in the display area, a cursor that moves in accordance with an operation input accepted by the operation accepting means and, if the cursor is superimposed on any of a plurality of reduced images drawn as superimposed on each other in any of the storage areas, the controlling means controls the image drawing means to draw such that each reduced image superimposed on the reduced image is moved to display the reduced image in the entirety thereof.

In the above-mentioned information processing apparatus, if a predetermined operation input has been accepted by the operation accepting means, the controlling means controls the image drawing means to draw such that a reduced image included in the storage area corresponds to at least one of images included in the image display area.

The above-mentioned information processing apparatus further has reduced image generating means for generating reduced images corresponding to a plurality of images stored in the image storing means, wherein the reduced image storing means stores the reduced images generated by the reduced image generating means.

In the above-mentioned information processing apparatus, the image drawing means draws, onto the display area, a cursor that moves in accordance with an operation input accepted by the operation accepting means and, if a predetermined drag operation has been accepted by the operation accepting means with the cursor drawn as superimposed on a predetermined area included in the display area, the controlling means controls the image drawing means to draw an image associated with the predetermined area in accordance with the drag operation.

In the above-mentioned information processing apparatus, the controlling means controls, in accordance with an operation input accepted by the operation accepting means, the image drawing means to draw an image included in the image display area such that the image moves.

In carrying out the invention and according to another embodiment thereof, there is provided an information processing apparatus. This information processing apparatus has operation accepting means for accepting an operation input; image storing means for storing a plurality of images; reduced image storing means for storing reduced image corresponding to a plurality of images stored in the image storing means; management information storing means for storing management information corresponding to the plurality of images stored in the image storing means; image drawing means for drawing, in a display area at least including an image display area, a list image display area, and a storage area, at least one of images stored in the image storing means onto the image display area in a predetermined sequence and at least two of the reduced images stored in the reduced image storing means onto the list image display area as list images in the predetermined sequence; and controlling means for, when an operation input commanding selection of an image included in the image display area in correspondence with the storage area has been accepted by the operation accepting means, controlling recording of the selection of the image to management information stored in the management information storing means in correspondence with the image and controlling the image drawing means to draw a reduced image stored in the reduced image storing means in correspondence with the image onto the storage area.

In carrying out the invention and according to still another embodiment thereof, there is provided a control method for an information processing apparatus having image storing means for storing a plurality of images and management information storing means for storing management information corresponding to the plurality of images stored in the image storing means. This control method has the steps of: accepting an operation input; drawing, in a display area including at least an image display area, at least one of the plurality of images stored in the image storing means onto the image display area in a predetermined sequence; and controlling, when an operation input commanding selection of an image included in the image display area has been accepted in the accepting step, recording of selection of the image to management information stored in the management information storing means in correspondence with the image.

In carrying out the invention and according to yet another embodiment thereof, there is provided a program configured to make a computer execute, in an information processing apparatus having image storing means for storing a plurality of images and management information storing means for storing management information corresponding to the plurality of images stored in the image storing means. This program makes the computer execute the steps of: accepting an operation input; drawing, in a display area including at least an image display area, at least one of the plurality of images stored in the image storing means onto the image display area in a predetermined sequence; and controlling, when an operation input commanding selection of an image included in the image display area has been accepted in the accepting step, recording of selection of the image to management information stored in the management information storing means in correspondence with the image.

BRIEF DESCRIPTION OF THE DRAWINGS

FIG. 3 shows a display screen, one of display screens to be displayed on a display block;

FIG. 6 is a display screen, one example of a display screen shown on the display block;

FIG. 15 is a screen indicative of a relationship between a width of a display area and thresholds 401 shown on the shelf panel;

FIG. 16 is a screen indicative of y-coordinate of a display area, a threshold, and a threshold shown on the shelf panel;

FIGS. 29A and 29B are display examples of display screens shown on the display block;

DETAILED DESCRIPTION OF THE PREFERRED EMBODIMENTS

This invention will be described in further detail by way of embodiments thereof with reference to the accompanying drawings.

Figure 1:
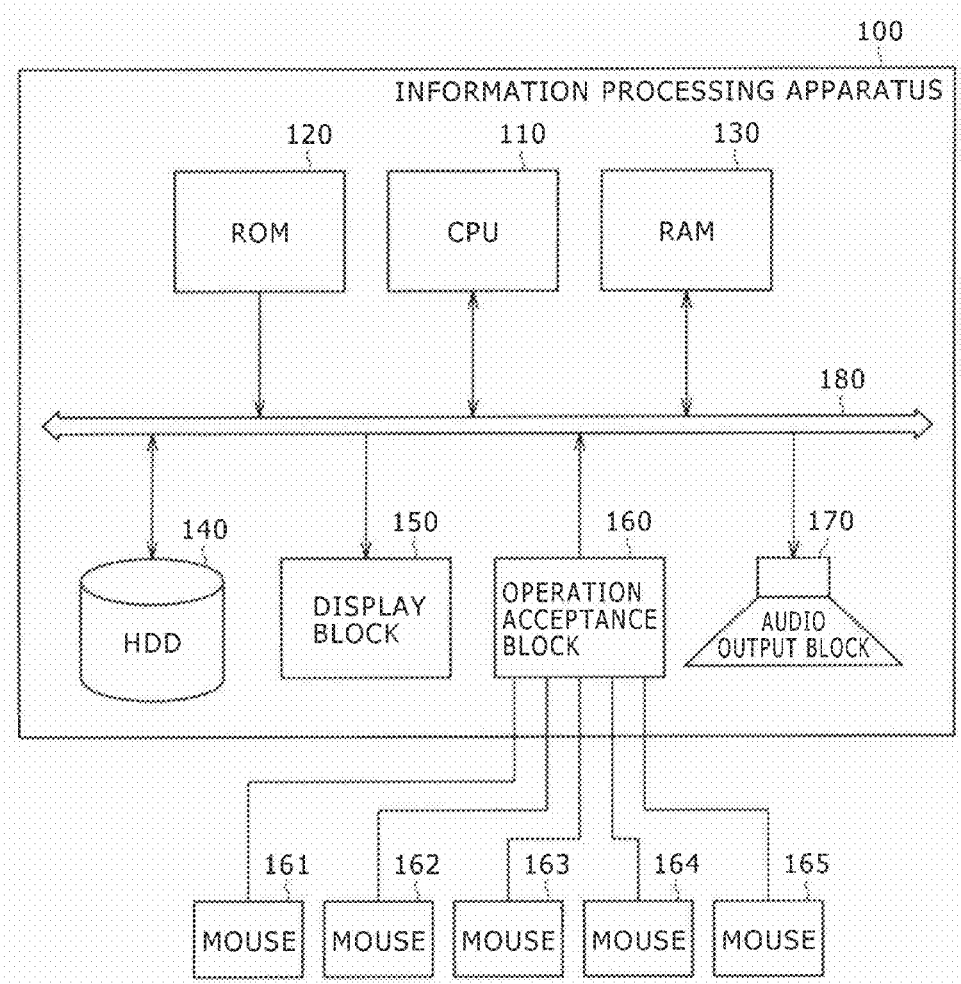
FIG. 1 is a block diagram illustrating an exemplary functional configuration of an information processing apparatus practiced as one embodiment of the invention.

Now, referring to FIG. 1, there is shown a block diagram of a functional configuration example of the information processing apparatus 100 practiced as one embodiment of the invention. The information processing apparatus 100 is a personal computer (PC) having a dedicated display block, for example. The information processing apparatus 100 is made up of a CPU (Central Processing Unit) 110, a ROM (Read Only Memory) 120, a RAM (Random Access Memory) 130, a HDD (Hard Disk Drive) 140, the display block 150, an operation acceptance block 160, and an audio output block 170. Passing of signals between these blocks is executed via a bus 180.

The CPU 110 controls the other components of the information processing apparatus 100 as instructed by various control programs stored in the ROM 120. Also the CPU 110 controls the other components of the information processing apparatus 100 on the basis of various kinds of information read from the HDD 140 and operator inputs accepted by the operation acceptance block 160.

The ROM 120 stores various control programs, for example.

The RAM 130 is used as the main memory (or the main storage device) of the CPU 110 and provides a work area for programs to be executed by the CPU 110, for example.

The HDD 140 stores various application programs. In addition, the HDD 140 stores the image data corresponding to images taken by an image-taking apparatus and the management information about these image data, for example. This management information includes the attributes of image data and the thumbnail images corresponding to images, for example.

The display block 150 displays various kind of information under the control of the CPU 110. For this display block 150, a display device, such as an LCD (Liquid Crystal Display) may be used, for example.

The operation acceptance block 160 has a keyboard made up of various keys and a mouse (or a pointing device). Accepting an operator input through any of these input devices, the operation acceptance block 160 outputs the information associated with the input to the CPU 110. It should be noted that it is practicable to integrally configure at least a part of the operation acceptance block 160 and the display block 150 as a touch panel. It is also practicable to interconnect the main body of the information processing apparatus 100 and the mouse in a wired manner or a wireless manner.

It should be noted that, in the present embodiment of the invention, the operation acceptance block 160 is operated mainly by use of the mouse. The mouse as used in the present embodiment of the invention has at least a left button and a right button and a wheel arranged in between them. It is practicable for the information processing apparatus 100 to connect two or more mouses thereto. The information processing apparatus 100 executes various control operations in accordance with the operations done through the connected mouses. It should be noted that, in the present embodiment of the invention, the operation acceptance block 160 has five mouses 161 through 165, for example.

A cursor (or a mouse pointer) that moves in synchronization with the movement of the mouse is displayed on a screen shown on the display block 150. The cursor is used to point at each target of a command or an operation by user on each screen shown on the display block 150. In the present embodiment of the invention, each cursor has a face image of each user so as to facilitate for each user to find the cursor of his own. Details of the cursor will be described later with reference to drawings.

The following describes how the mouse is operated. "Pointing" denotes the bringing of the cursor to a desired object. "Left clicking" denotes the clicking the left button of the mouse only once. "Right clicking" denotes the clicking of the right button of the mouse only once. "Double clicking" denotes the clicking of the left button consecutively twice. "Middle button clicking" denotes the clicking the wheel between the buttons only once. "Left drag" denotes the moving of the mouse with the left button kept pressed. "Right drag" denotes the moving of the mouse with the right button kept pressed. "Middle drag" denotes the moving of the mouse with the wheel kept pressed. "Drop" denotes the releasing of the pressed button after drop, thereby moving a dragged object to a desired position, for example.

The audio output block 170 is a loudspeaker through which various audio signals are outputted under the control of the CPU 110.

It is also practicable for the information processing apparatus 100 to have an information output block so as to output the image information corresponding to each image displayed on the display block 150 to another image display apparatus to display the same image thereon as on the display block 150.

Figure 2:
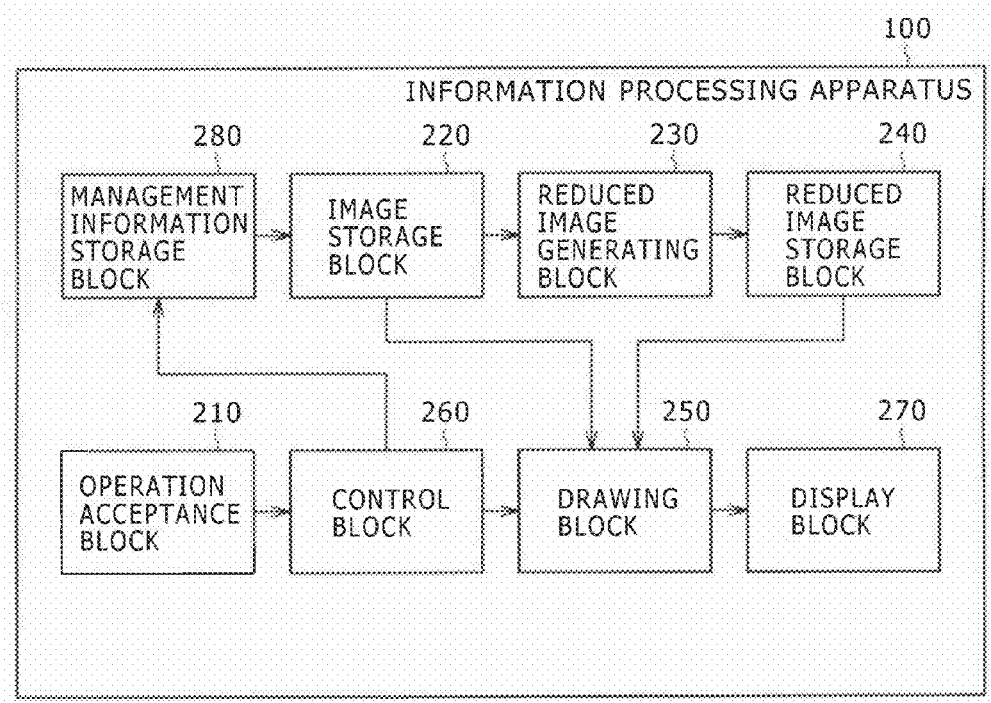
FIG. 2 is a block diagram illustrating an exemplary functional configuration of associated with drawing control of the information processing apparatus shown in FIG. 1.

Referring to FIG. 2, there is shown a block diagram illustrating a functional configuration example associated with the control to be executed by the information processing apparatus 100 in the present embodiment of the invention. The information processing apparatus 100 has an operation acceptance block 210, an image storage block 220, a reduced image generating block 230, a reduced image storage block 240, a drawing block 250, a control block 260, a display block 270, and a management information storage block 280.

The operation acceptance block 210 accepts operations done by the user and outputs the accepted operations to the control block 260. For example, in accordance with an operation of a mouse that is a pointing device, the corresponding input operation is accepted. It should be noted that operation acceptance block 210 corresponds to the operation acceptance block 160 shown in FIG. 1.

The image storage block 220 stores various kinds of images and outputs stored images to the reduced image generating block 230 and the drawing block 250. The image storage block 220 stores the images shown in FIGS. 3 through 9, for example.

The reduced image generating block 230 generates the thumbnail images (images that are reduced in size) of images stored in the image storage block 220 and outputs the generated thumbnail images to the reduced image storage block 240.

The reduced image storage block 240 stores the thumbnail images generated by the reduced image generating block 230 and outputs stored thumbnail images to the drawing block 250. It should be noted that it is also practicable to store thumbnail images contained in the management information of each item of image data in advance, thereby outputting the pre-stored thumbnail images to the drawing block 250.

The drawing block 250 draws each image stored in the image storage block 220 and each thumbnail image stored in the reduced image storage block 240 as display image to the displayed on the display block 270. For example, the drawing block 250 draws, in a predetermined sequence, on a slide panel 310 (shown in FIG. 3 for example), at least one image of the images stored in the image storage block 220 in a display area including at least the slide panel. Also, the drawing block 250 draws, on a drawer panel 330 (shown in FIG. 3 for example), a reduced image corresponding to each image stored in the image storage block 220 in a display area including at least the slide panel 310 and the drawer panel 330 partitioned into two or more areas. In addition, the drawing block 250 draws each area of the drawer panel 330 as an approximately rectangular area that is adjacent to the slide panel 310. Further, the drawing block 250 draws the cursor that moves in accordance with an operation input done through the operation acceptance block 210 into the display areas. Still further, the drawing block 250 draws, in a predetermined sequence, on a shelf panel 320 (shown in FIG. 3 for example), at least one of the images stored in the image storage block 220 and draws, in a predetermined sequence, on the shelf panel 320, at least two reduced images of the reduced images stored in the reduced image storage block 240, in a display area containing the slide panel 310, the shelf panel 320, and the drawer panel 330.

The control block 260 controls the drawing block 250 in accordance with each operation received from the operation acceptance block 210. For example, when an operation input for selecting an image contained in the slide panel 310 has been accepted by the operation acceptance block 210, the control block 260 records information indicative of the selection of that image to the management information stored in the management information storage block 280 in correspondence to that image. To be more specific, when an operation input for selecting an image contained in the slide panel 310 in relationship with any one of areas of the drawer panel 330 contained in the slide panel 310 has been accepted by the operation acceptance block 210, the control block 260 records the area of the drawer panel 330 selected in correspondence to that image to the management information stored in the management information storage block 280 in correspondence to that image and controls the drawing block 250 so as to draw a reduced image stored in the reduced image storage block 240 in correspondence to that image onto the area of the drawer panel 330 selected in relationship with that image. Further, when an operation input for selecting an image contained in the slide panel 310 in relationship with any one of the areas of the drawer panel 330 has been accepted by the operation acceptance block 210, the control block 260 controls the drawing block 250 so as to draw a marker indicative of the area of the drawer panel 330 selected in relationship with that image in the vicinity of that image contained in the slide panel 310.

The management information storage block 280 stores the management information corresponding to two or more images stored in the image storage block 220. Under the control of the control block 260, various kinds of management information are stored in the management information storage block 280 or deleted therefrom. The management information manages each of the images stored in the image storage block 220 and includes the attribute and size of the image, a sequence in which the image is displayed on the slide panel 310 and the shelf panel 320 shown in FIG. 3 for example, and drawer area information indicative whether the image is stored in each area of the drawer panel 330 shown in FIG. 3 for example. Namely, when an operation input for selecting (or storing) an image contained in the slide panel 310 has been accepted by the operation acceptance block 210, information indicative of the selection (or storage) of that image is recorded to the management information corresponding to that image, as the drawer area information. For example, for images stored in the first drawer section 331 through the fourth drawer section 334 shown in FIG. 3 for example, of two or more images stored in the image storage block 220, the corresponding numbers are recorded to areas as the drawer area information of the management information corresponding to that image. For example, if the image has been stored in the first drawer section 331, "1" is recorded as the drawer area information of the management information corresponding to that image. Likewise, for the second drawer section 332 through the fourth drawer section 334, "2" through "4" are recorded, respectively, as the drawer area information of the management information. It should be noted that, for a bookmark drawer section 335, "5" is recorded as the drawer area information of the management information and the information about the operated cursor is recorded as well. Sometimes, all of "1" through "5" may be recorded as the drawer area information of the management information.

The display block 270 displays the contents of the drawing done by the drawing block 250. It should be noted that the display block 270 corresponds to the display block 150 shown in FIG. 1.

Referring to FIG. 3, there is shown a display screen 300, one of the display screens to be shown on the display block 150.

The display screen 300 is a screen having a basic screen configuration practiced as one embodiment of the invention. The display screen 300 has a slide panel (main area) 310, a shelf panel (thumbnail area) 320, and a drawer panel (drawer area) 330. Also, the display screen 300 shows cursors 301 through 305 corresponding to five actually used mouses of the mouses arranged on the information processing apparatus 100. It should be noted that, in the present embodiment, it is assumed that five mouses be operated by a family of father, mother, daughter, and son, and one guest. In this case, each cursor is shown as an image representing the face of each operator. To be more specific, the cursors have face images of father, mother, daughter, son, and guest, respectively, and the hair colors thereof correspond to a first handle section 336 through a fourth handle section 339 in the drawer panel 330. This arrangement allows the user to easily recognize his or her own cursor and drawer section. For example, the father cursor 301 and the first handle section 336 may be colored blue, the mother cursor 303 and the second handle section 337 red, the son cursor and the third handle section 338 orange, and the daughter cursor 304 and the fourth handle section 339 pink, thereby providing pairs of cursor and drawers.

The slide panel 310 is the main area in the display screen 300. The main area displays the images corresponding to the image data stored in the HDD 140 in a vertically movable manner. It should be noted that these image data provide images corresponding to the thumbnails shown in the shelf panel 320; for example, two or more images stored in a predetermined folder. For example, the slide panel 310 shows images 311 through 313, a bookmark 314, and a stamp 315. Images 311 through 313 are images taken by a digital still camera for example. The image 312 can be displayed at the center of the slide panel 310 by left-button-dragging the image 312 downward using one of the mouse devices positioned on the image 312. When the image 312 is displayed at the center of the slide panel 310, the upper portion of the image 311 is displayed below the image 312. The image 313 can be displayed at the center of the slide panel 310 by left-button-dragging the image 313 upward using one of mouse devices positioned on the image 313. When the image 313 is displayed at the center of the slide panel 310, the lower portion of the image 311 is displayed above the image 313.

The bookmark 314 is formed as a start that is shown in the upper left portion of each image displayed in the slide panel 310. When the mouse is left-clicked with the cursor positioned on the star, the color of one of the starts of the bookmark 314 changes and the thumbnail image corresponding to the image shown below the bookmark 314 is stored in the bookmark drawer section 335.

The stamp 315 is shown in the lower left portion of each image shown in the slide panel 310 if this image corresponds to a thumbnail image stored in any one of the first drawer section 331 through the fourth drawer section 334. It should be noted that each image shown in the slide panel 310 can be stored in one or more of the first drawer section 331 through the fourth drawer section 334 in which images are stored. Consequently, the stamp 315 is shown in the number corresponding to the first drawer section 331 through the fourth drawer section 334 in which images are stored. Also, the stamp 315 is colored in accordance with the first handle section 336 through the fourth handle section 339 corresponding to the drawer sections in which images are stored.

The shelf panel 320 provides a thumbnail area in which a list of thumbnail images corresponding to the images to be sequentially displayed in the slide panel 310 is shown. The display area of the shelf panel 320 shows thumbnail images 321 through 325 of the plurality of thumbnail images are displayed as shown in FIG. 3, for example. The shelf panel 320 also has a right handle section 326, an upper handle section 327, and a lower handle section 328.

Horizontally left-button dragging the right handle section 326 enlarges or reduces the area of the shelf panel 320 in the horizontal direction in which the right handle section 326 is dragged by the cursor positioned on the right handle section 326. In this case, according to the enlargement or reduction of the area of the shelf panel 320, each image shown in the slide panel 310 is displayed in an enlarged or reduced manner.

Left-button dragging the upper handle section 327 downward by the cursor positioned on the upper handle section 327 makes the thumbnail image shown in the shelf panel 320 slide downward, thereby switching between thumbnail images shown in shelf panel 320. Likewise, left-button-dragging the lower handle section 328 upward by the cursor positioned on the lower handle section 328 makes a thumbnail image shown in the shelf panel 320, thereby switching between thumbnail images shown in the shelf panel 320.

The drawer panel 330 The drawer panel 330 provides a drawer area for storing images to be displayed in the slide panel 310 or the shelf panel 320 as desired by the user. The drawer panel 330 has the first drawer section 331 through the fourth drawer section 334, the bookmark drawer section 335, the first handle section 336 through the fifth handle section 340, and an overall handle section 341.

The first drawer section 331 through the fourth drawer section 334 and the bookmark drawer section 335 provides areas in which images shown in the slide panel 310 or the shelf panel 320 can be stored in accordance with mouse operations.

Horizontally left-button dragging any of the first handle section 336 through the fifth handle section 340 by the cursor positioned on any of the first handle section 336 through the fifth handle section 340 enlarges or reduces the areas of the first drawer section 331 through the fourth drawer section 334 and the bookmark drawer section 335.

Horizontally left-button dragging the overall handle section 341 by the cursor positioned on the overall handle section 341 enlarges or reduces the area in the horizontal direction of the drawer section located to the right side of the overall handle section 341 of the first drawer section 331 through the fourth drawer section 334 and the bookmark drawer section 335.

Figure 4A:
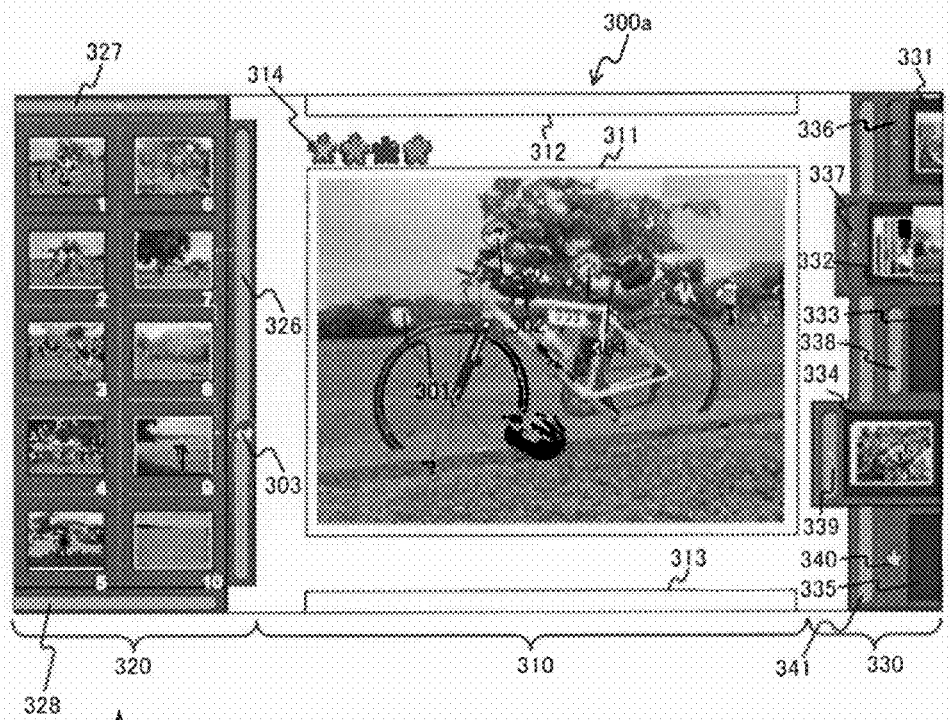
FIGS. 4A and 4B show an example of display screen shown on the display block.
Figure 4B:
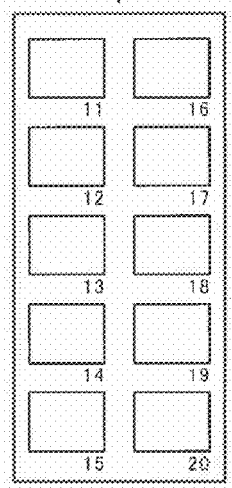
Figure 5:
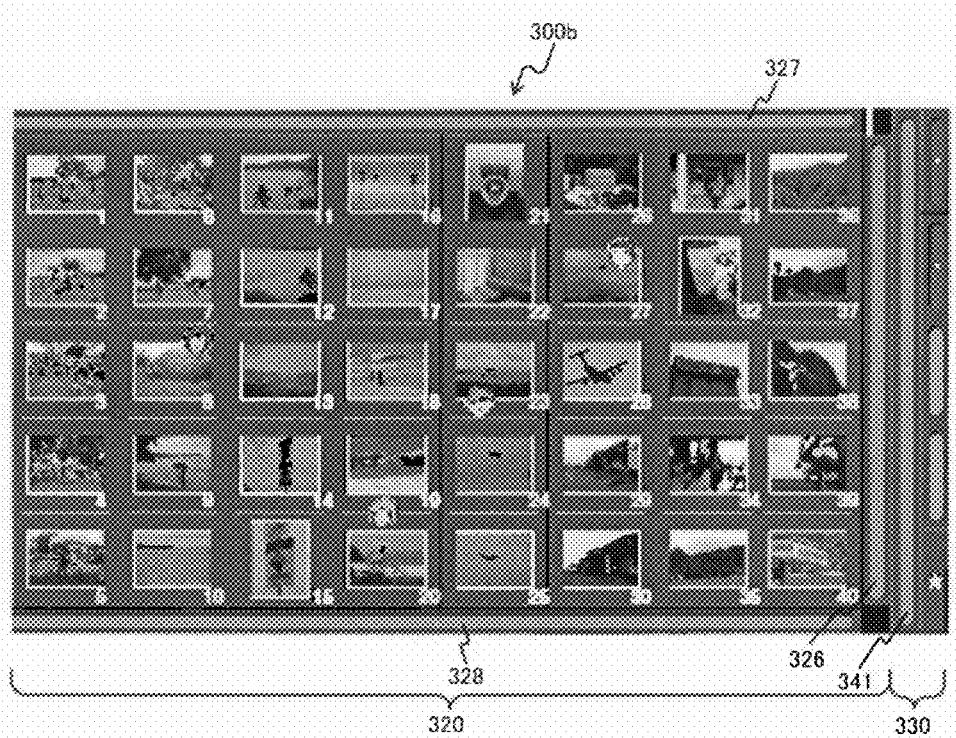
FIG. 5 is a display screen resulted after enlarging an area of a shelf panel to the right end of the display screen.

The following describes the thumbnail image to be displayed in the shelf panel 320 with reference to FIGS. 4 and 5. It should be noted that, with reference to FIGS. 4 and 5, components similar to those previously described with reference to FIG. 3 are denoted by the same reference numerals.

FIG. 4A shows a display screen 300a, one example of display screens to be shown on the display block 150. FIG. 4B shows thumbnail images 11 through 20 that are shown in the shelf panel 320 after sliding thumbnail images 1 through 10 in the shelf panel 320 upward. FIG. 5 shows a display screen 300b obtained by enlarging the display screen 300a in the shelf panel 320 to the right end of the display screen 300a. It should be noted that the shelf panel 320 in the display screen 300b shows thumbnail images 1 through 40.

For example, as shown in FIG. 4A, assume that, with the display screen 300a shown on the display block 150, thumbnail images 1 through 10 be shown on the shelf panel 320. In this case, left-dragging the right handle section 326 by the cursor positioned on the right handle section 326 by a predetermined distance displays thumbnails 11 through 15 shown in FIG. 4B into the area to the right of the thumbnail images 6 through 10 in the shelf panel 320. Left-button dragging the right handle section 326 further by a predetermined distance displays thumbnails 11 through 20 shown in FIG. 4B into the area to the right of the thumbnails 6 through 10 in the shelf panel 320.

Left-button dragging the right handle section 326 by the cursor positioned on the right handle section 326 to the right end of the display screen 300a enlarges the area of the shelf panel 320 to form approximately entire display screen into the shelf panel 320 as shown in FIG. 5, thereby displaying thumbnail image 1 through 40 in the shelf panel 320.

Left-button dragging the lower handle section 328 upward by the cursor positioned on the lower handle section 328 by a predetermined distance slides thumbnail images 1 through 11 upward, thereby displaying thumbnail images 11 through 20 shown in FIG. 4B into the shelf panel 320.

For example, left-button dragging the lower handle section 328 upward by the cursor positioned on the lower handle section 328 by a predetermined distance with thumbnail images 1 through 5 displayed in the shelf panel 320 slides the thumbnail images 1 through 5 upward, thereby displaying the thumbnail images 6 through 10 in the shelf panel 320. Thus, use of the lower handle section 328 allows the thumbnail images 1 through 40 shown in FIG. 5 to be sequentially displayed in the shelf panel 320 with the display area being slid to the right side. On the other hand, use of the upper handle section 327 allows the thumbnail images 1 through 40 shown in FIG. 5 to be sequentially displayed in the shelf panel 320 with the display are being slid to the left side.

The following describes an operation of sliding images displayed in the slide panel 310 with reference to drawings.

Referring to FIG. 6, shows a display screen 350, one example of display screens to be displayed on the display block 150. FIG. 7 shows a display screen 355, another example of display screens to be displayed on the display block 150.

The display screen 350 is obtained by sliding the right handle section 326 of the shelf panel 320 to the left end and sliding the overall handle section 341 of the drawer panel 330 to the right end. Images 351 through 353 are shown on the slide panel 310 of the 350. In this case, left-button dragging the image 353 with the mother cursor 303 positioned on the display part of the image 353 upward causes only the image 353 to slide upward until this dragging operation reaches a predetermined distance. Left-button dragging further by another predetermined distance causes images 351 through 353 to slide upward, thereby displaying the entire image 353 in the slide panel 310. Likewise, left-button dragging the image 352 by the cursor positioned on the display part of the image 352 by a predetermined distance downward causes the images 351 through 353 to slide downward.

Figure 7A:
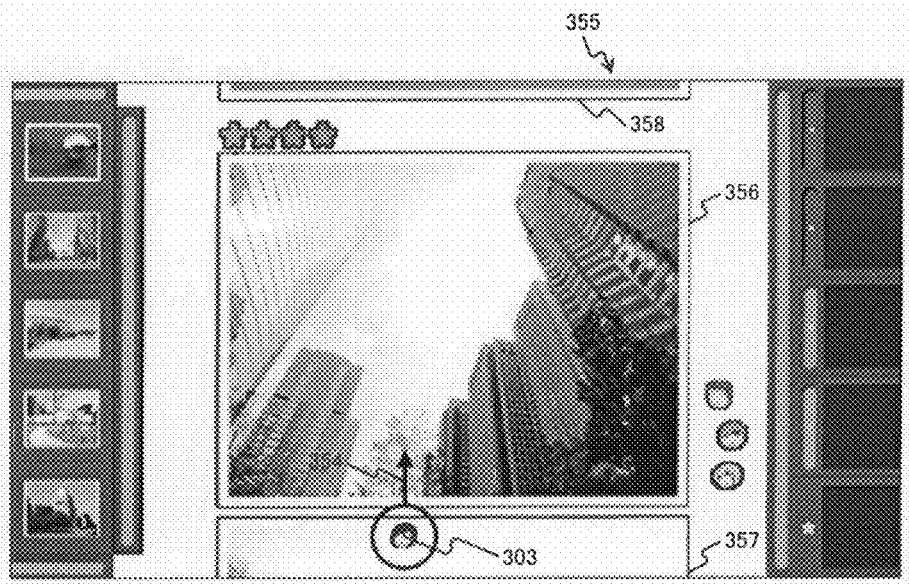
FIGS. 7A and 7B are display screens, one example of display screens shown on the display block.
Figure 7B:
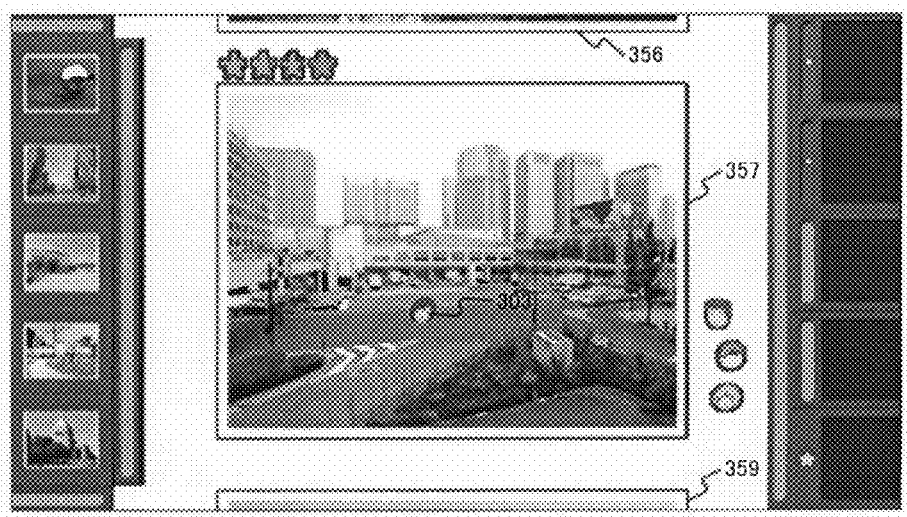

Referring to FIG. 7, in the display screen 355 shown in FIG. 7A, left-button dragging the image 357 with the mother cursor 303 positioned on the display part of the image 357 by a predetermined distance upward can slide the images 356 through 358 upward. For example, left-button dragging in the direction of an arrow 354, the images 356, 357, and 359 are displayed on the display screen 355.

It should be noted that images displayed on the slide panel 310 and thumbnail images displayed on the shelf panel 320 can be slid independently of each other. Hence, there may not be a synchronization in display between images displayed on the slide panel 310 and corresponding thumbnail images displayed on the shelf panel 320 on the same screen.

The following describes an operation of displaying thumbnail images corresponding to images displayed on the slide panel 310 onto the shelf panel 320 with reference to drawings.

Figure 8A:
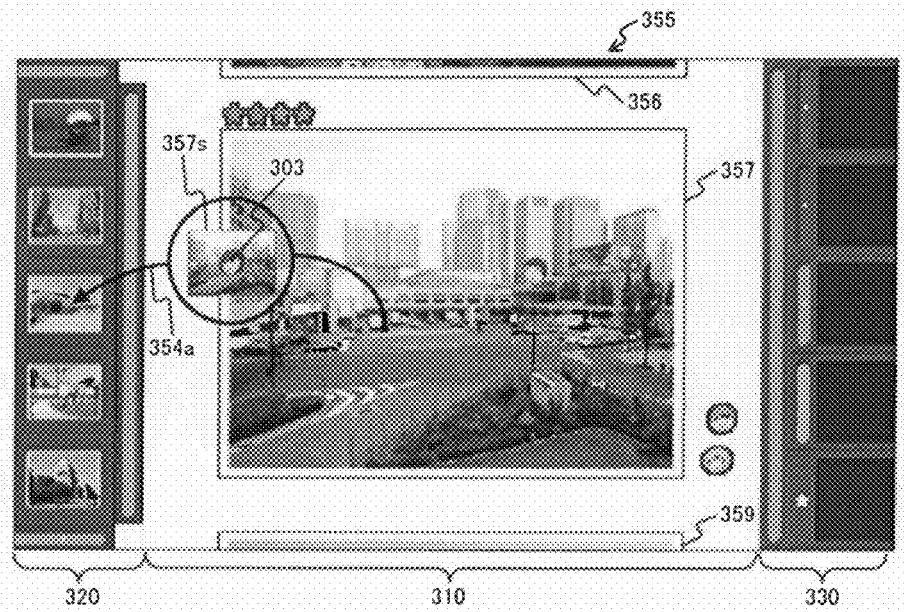
FIGS. 8A and 8B are display screens, one example of display screens shown on the display block.

Referring to FIG. 8, there are shown display screens 355, one example of display screens to be displayed on the display block 150.

Figure 8B:
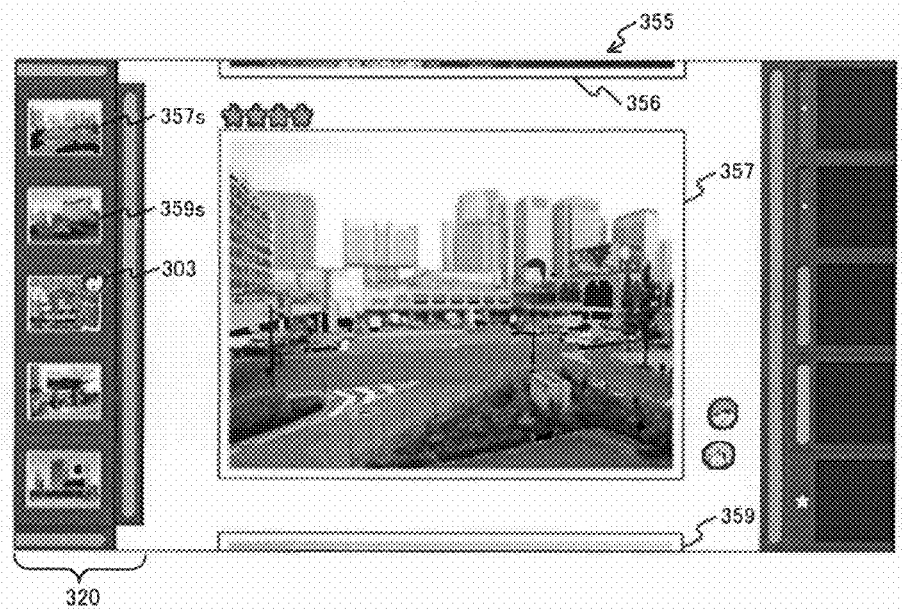

In the display screen 355 shown in FIG. 8, in order to display a thumbnail image corresponding to the image 357 displayed on the slide panel 310 onto the shelf panel 320, for example, the image 357 is left-button dragged by the mother cursor 303 positioned on the display part of the image 357 to the left side to the area of the shelf panel 320 and dropped in the area of the shelf panel 320. For example, the image 357 is left-button dragged in the direction of arrow 354a. In this case, when the left-button dragging is being executed, a thumbnail 357s corresponding to the image 357 is displayed along with the mother cursor 303. Then, left-button dragging the thumbnail image 357s to the area of the shelf panel 320 with the mother cursor 303 and dropping the thumbnail 357s in the area of the shelf panel 320 cause thumbnail images including the thumbnail image 357s corresponding to the image 357 to be displayed in the shelf panel 320 as shown in FIG. 8B. For example, next to the thumbnail 357s, a thumbnail 359s is displayed that corresponds to the image 359 displayed next to the image 357 in the slide panel 310. Consequently, both the images displayed in the slide panel 310 and the corresponding thumbnail images can be easily displayed in synchronization.

The following describes an operation of displaying images corresponding to thumbnail images shown on the shelf panel 320 onto the slide panel 310 with reference to drawings.

Figure 9A:
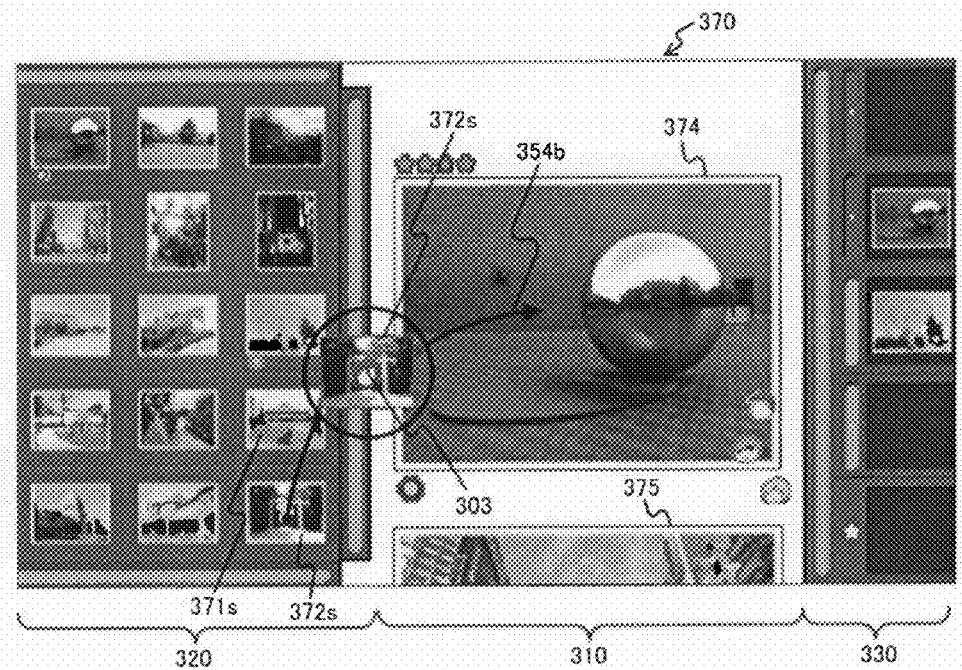
FIGS. 9A and 9B are display screens, one example of display screens shown in the display block.

Referring to FIG. 9, there are shown display screens 370, one example of display screens to be shown on the display block 150. It should be noted that an image 374 shown in FIG. 9A corresponds to the first thumbnail stored in a predetermined folder shown in shelf panel 320 in FIG. 9A, so that the image 374 is not displayed on top of the slide panel 310.

Figure 9B:
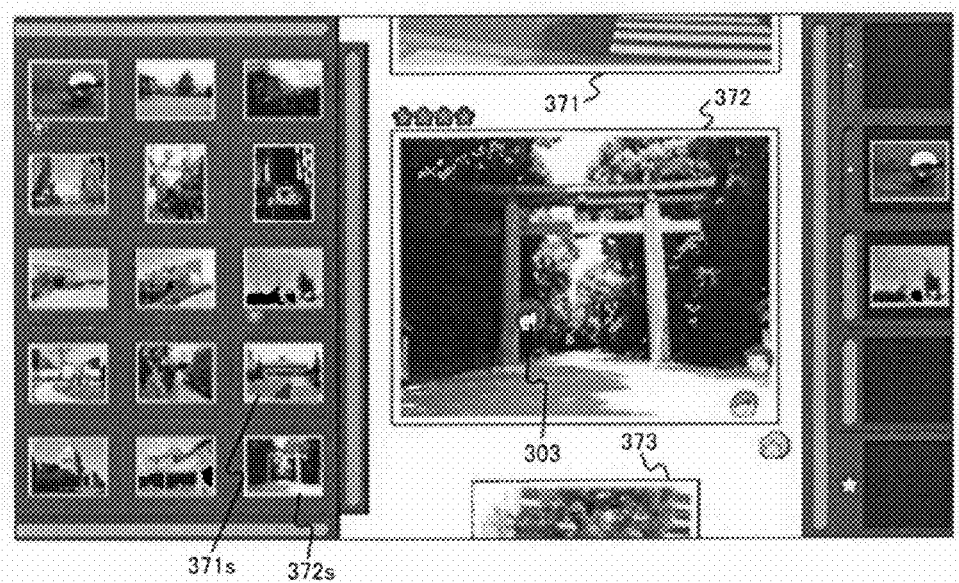

When displaying, on the slide panel 310, the image 372 corresponding to the thumbnail 372s displayed in the shelf panel 320 with the images 374 and 375 displayed on the display screen 370 shown in FIG. 9, the thumbnail image 372s is left-button dragged with the mother cursor 303 positioned on the display part of the thumbnail image 372s to the right side to the area of the slide panel 310 and dropped in the area of the slide panel 310. For example, the 372s is left-button dragged in the direction of arrow 354b. In this case, when the left-button dragging is being executed, the thumbnail image 372s is displayed along with the mother cursor 303 as shown in FIG. 9A. Then, when the thumbnail image 372s is left-button dragged with the mother cursor 303 to the area of the slide panel 310 and dropped in the area of the slide panel 310, the image 372 corresponding to the thumbnail image 372s is displayed in the slide panel 310 as shown in FIG. 9B. Also, in this case, the images arranged before and after the thumbnail image 372s are displayed above and below the image 372. For example, the image 371 corresponding to the thumbnail image 371s arranged before the thumbnail image 372s is displayed above the image 372. Consequently, images displayed on the slide panel 310 and corresponding thumbnail images can be easily displayed in synchronization.

Figure 10A:
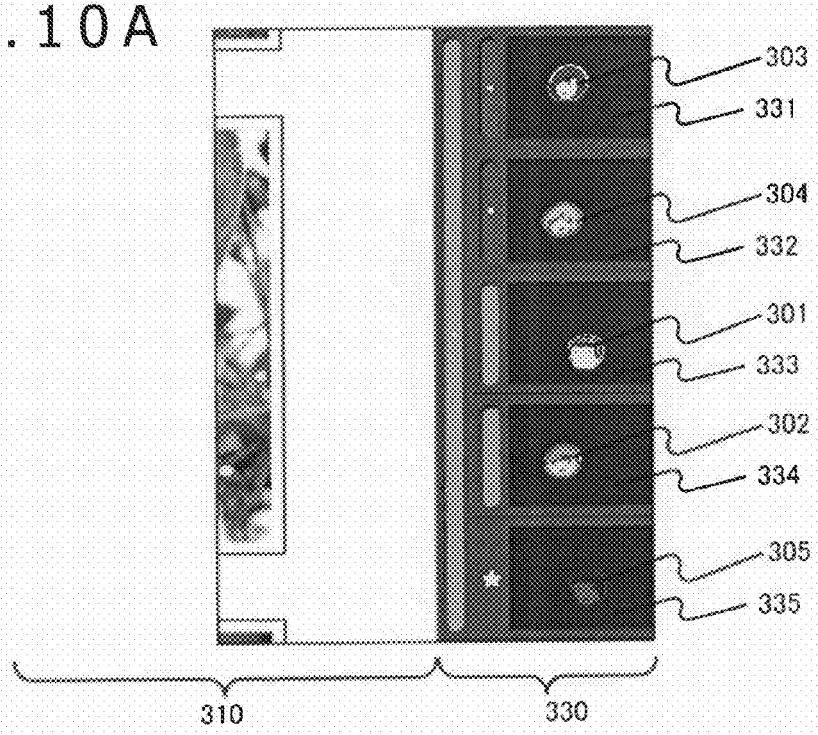
FIGS. 10A and 10B are display screens indicative of a transition associated with correlation between mouse and cursor, one example of display screens shown on the display block.

Referring to FIG. 10, there are shown examples of display screens shown on the display block 150, showing transitions associated with the correlation between mouse and cursor. FIG. 10A shows a part of the drawer panel 330 in the display screen 300 shown in FIG. 3.

Figure 10B:
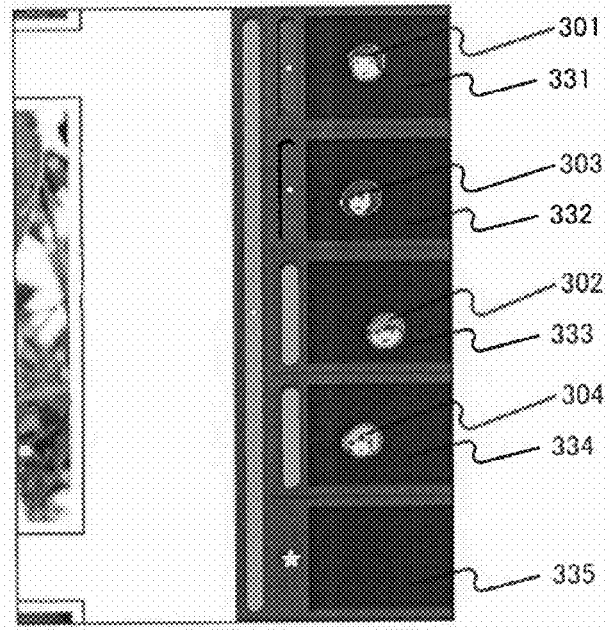

Each user of the information processing apparatus 100 is allocated with a drawer section that is normally used from the first drawer section 331 through the fourth drawer section 334 of the drawer panel 330. When each user uses the information processing apparatus 100, the user finds a cursor, displayed on the display block 150, of any one of the mouses and positions the cursor on the area of his or her drawer section as shown in FIG. 10A. Then, the user presses a predetermined key with the cursor positioned on the area of his or her drawer section. For example, the user presses "R" key on the keyboard of the operation acceptance block 160. When "R" key is pressed, the cursor is changed to one that is suited for the user as shown in FIG. 10B; namely, the cursor corresponding to the drawer section.

Thus, in the embodiments of the invention, every time the information processing apparatus 100 is used, one mouse is allocated to one user; but there is no need for setting a dedicated mouse for each cursor. This is because, every time the information processing apparatus 100 is used, the information processing apparatus 100 can be used after providing a correlation between mouse and cursor as described above.

The following details a case in which the number of thumbnail images to be displayed on the shelf panel 320 is increased with reference to drawings.

Figure 11:
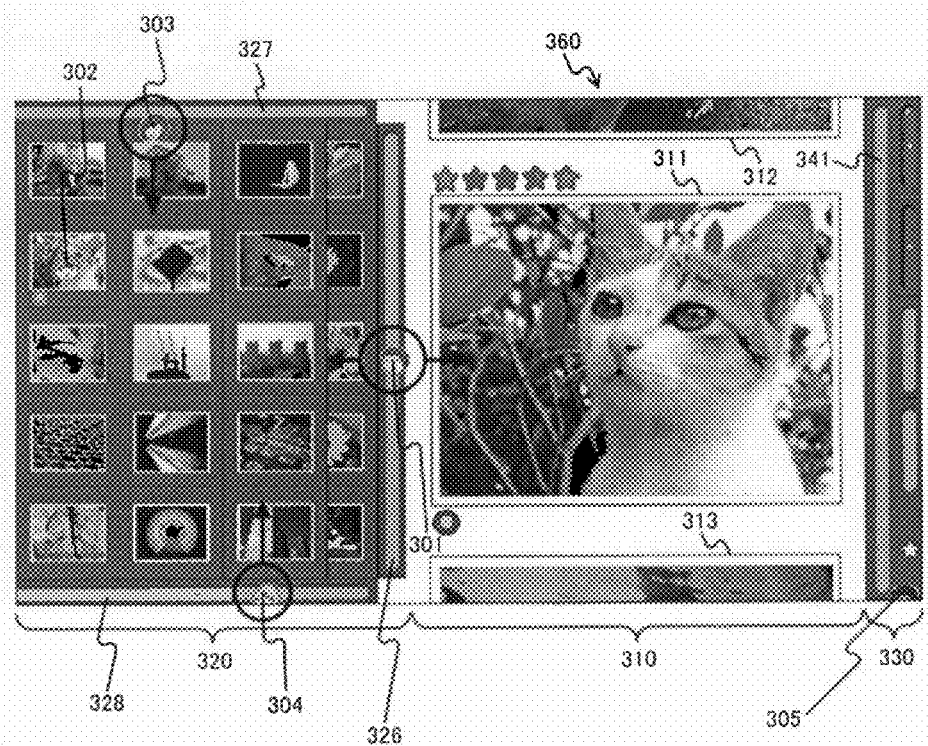
FIG. 11 is a display screen, one example of display screens shown on the display block.

Referring to FIG. 11, there is shown a display screen 360, one example of display screens to be shown on the display block 150.

The display screen 360 is obtained by moving the right handle section 326 of the shelf panel 320 to the right side and the entire drawer panel 330 to the right side on the display screen 300 shown in FIG. 3. Shown on the display screen 360 in this case are the images 311 through 313 of the slide panel 310, a plurality of thumbnail images on the shelf panel 320, the right handle section 326, the upper handle section 327, the lower handle section 328, the overall handle section 341 of the drawer panel 330, the father cursor 301, the son cursor 302, the mother cursor 303, the daughter cursor 304, and a general cursor 305.

When the area of the shelf panel 320 is enlarged to the right side, the display area of the slide panel 310 is reduced and the images 311 through 313 are displayed as accordingly reduced. In this case, it is practicable to execute the reduction processing so as to prevent each image in the slide panel 310 from getting smaller than a predetermined size. In addition, because the thumbnail display area of the shelf panel 320 is enlarged by the enlargement of the area of the shelf panel 320 to the right side, other thumbnail images are displayed on the shelf panel 320 along with the thumbnail images 321 through 325 shown in FIG. 3. For example, a total of 15 thumbnail images, five horizontally and three vertically, are displayed.

In the shelf panel 320, left-button dragging the right handle section 326 of the shelf panel 320 by the father cursor 301 positioned on the right handle section 326 of the shelf panel 320 can horizontally move the right handle section 326. In this case, if the right handle section 326 has been horizontally moved beyond a predetermined distance, the right handle section 326 can be moved in an animation manner. The display in an animation manner denotes here that, in moving an image drawn in a display area as instructed by an operation input, the images indicative of the change caused by this movement are sequentially displayed with time.

The above-mentioned configuration allows the user to easily see the transition of the reduction or enlargement of the thumbnail display area of the shelf panel 320. Also, moving the right handle section 326 to the side of the slide panel 310 to enlarge the thumbnail display area of the shelf panel 320 allows the increase of the number of thumbnail images on a row basis with the currently displayed thumbnail images displayed. In addition, moving the right handle section 326 to the opposite side of the slide panel 310 to enlarge the thumbnail display area of the shelf panel 320 allows the deletion of thumbnail images on a row basis with the currently display thumbnail images displayed. Thus, the number of thumbnail images can be increased or decreased with the thumbnail images displayed on the shelf panel 320 easily seen.

In the shelf panel 320, left-button dragging downward the upper handle section 327 of the shelf panel 320 by the mother cursor 303 positioned on the upper handle section 327 of the shelf panel 320 allows the movement of the upper handle section 327 downward. In this case, if the upper handle section 327 has been moved downward beyond a predetermined distance, the thumbnail images in the shelf panel 320 can be moved downward in an animation manner, for example. Likewise, left-button dragging upward the lower handle section 328 of the shelf panel 320 by the daughter cursor 304 allows the movement of the lower handle section 328 upward, for example. In this case, if the lower handle section 328 has been moved upward beyond a predetermined distance, the thumbnail images in the shelf panel 320 can be moved upward in an animation manner. Consequently, as described with reference to FIGS. 4 and 5, the transition of the movement of the thumbnail display area in the shelf panel 320 can be easily seen. In addition, this movement can be made with the thumbnail images displayed in the shelf panel 320 easily seen.

FIGS. 12 through 15 show a display screen 380, one example of display screen shown on the display block 150, showing examples of transitions of the shelf panel 320 displayed on the display screen 380.

Figure 12A:
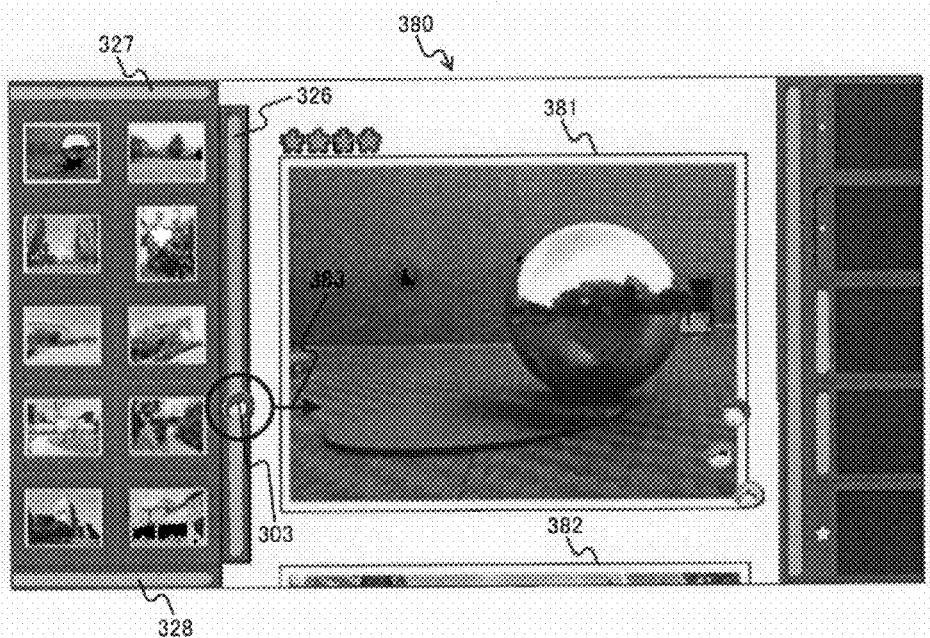
FIGS. 12A and 12B are screens indicative of an exemplary transition of the shelf panel shown on a display screen.

FIG. 12A shows the display screen 380 in which ten (5 rows×2 columns) thumbnail images are displayed in the shelf panel 320. In this display screen 380, left-button dragging the right handle section 326 of the shelf panel 320 to the right side by the mother cursor 303 positioned on the right handle section 326 of the shelf panel 320 as shown in FIG. 12A, for example, allows the right handle section 326 to be moved in the direction of arrow 383. If the right handle section 326 is further moved in the direction of arrow 383, the right handle section 326 can be moved in the direction of arrow 383 in an animation manner. After this movement in an animation manner, 15 (5 rows×3 columns) thumbnail images are displayed in the shelf panel 320 as shown in FIG. 13B.

Figure 12B:
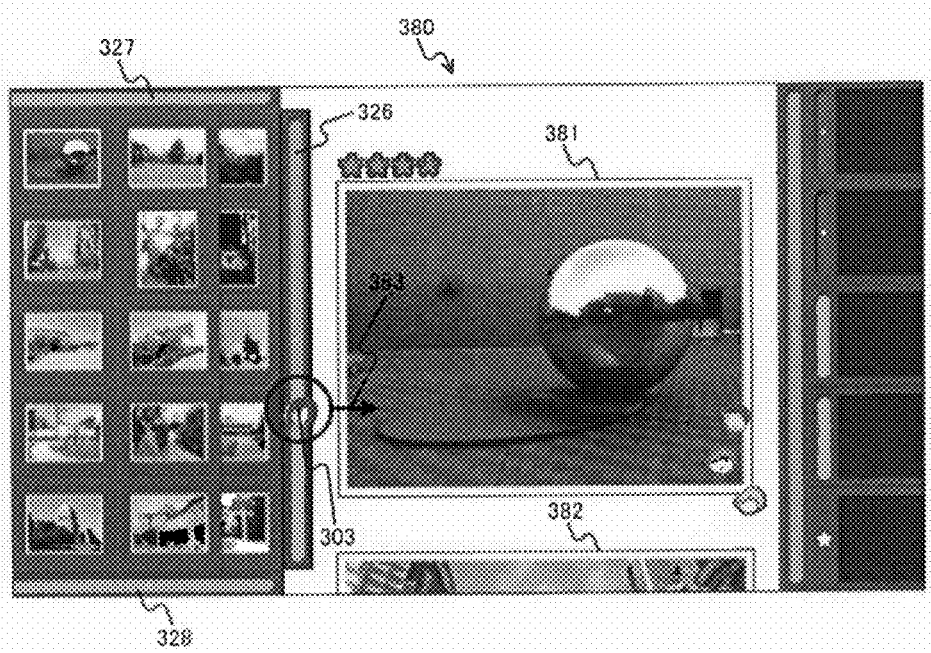
Figure 13A:
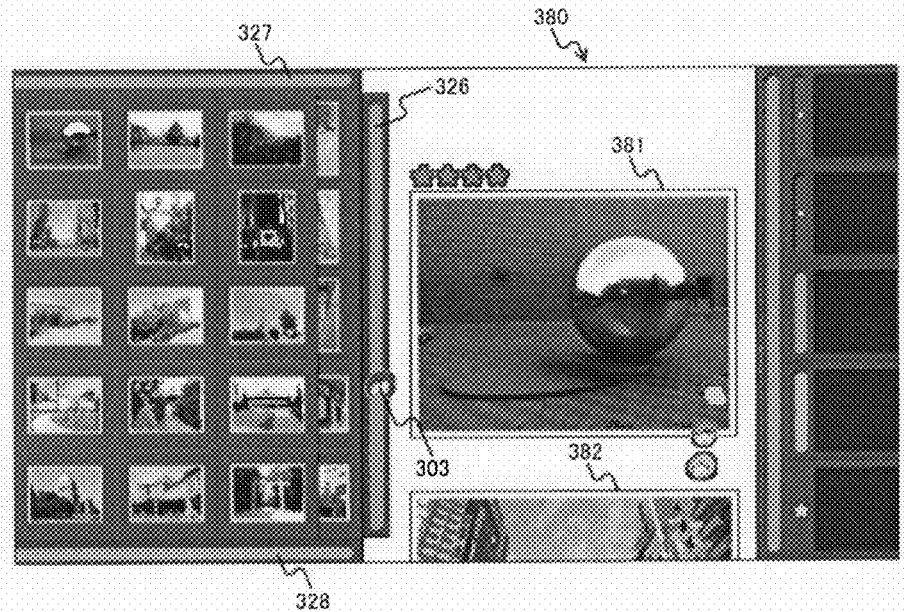
FIGS. 13A and 13B are screens indicative of an exemplary transition of the shelf panel shown in the display screen.

As shown in FIG. 13A, in further moving the right handle section 326 in the direction of arrow 383 (shown in FIG. 12), if the left-button dragging is stopped before a predetermined distance, the right handle section 326 can be moved in an animation manner in the direction opposite to the direction of arrow 383 (shown in FIG. 12). After this movement in an animation manner, 15 (5 rows×3 columns) thumbnail images are displayed in the shelf panel 320 as shown in FIG. 13B. Consequently, the transition of the movement of the right handle section 326 can be easily seen. Also, as shown in FIGS. 12A and 13B, for example, all thumbnail images can be displayed in the shelf panel 320.

Figure 13B:
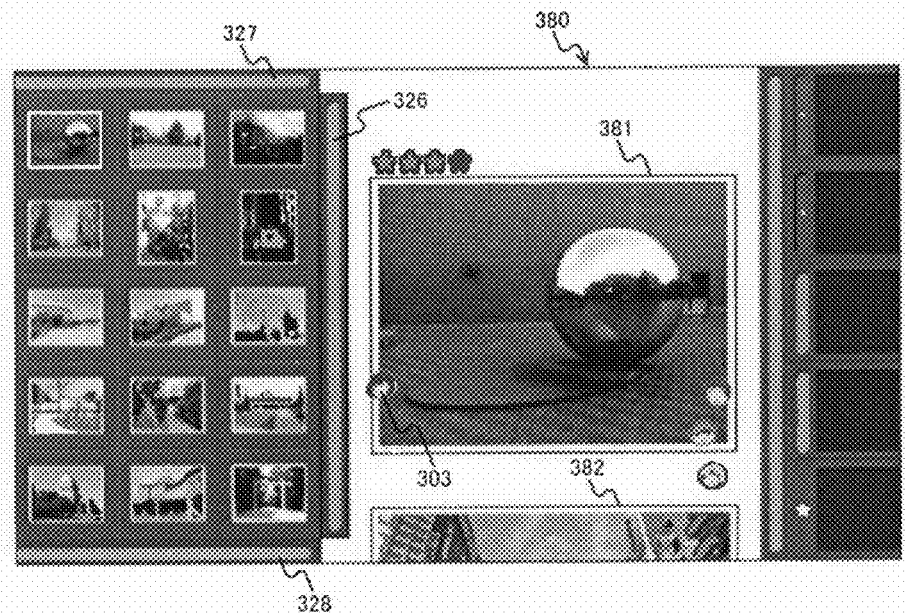

In the display screen 380, when 15 (5 rows×3 columns) thumbnail images are displayed in the shelf panel 320 as shown in FIG. 13B, left-button dragging the lower handle section 328 by the mother cursor 303 positioned on the lower handle section 328 of the shelf panel 320 upward moves the lower handle section 328 in the direction of arrow 384. When the lower handle section 328 is further moved in the direction of arrow 384 to a predetermined distance, the lower handle section 328 and the thumbnail images can be moved in the direction of arrow 384 in an animation manner. After this movement in an animation manner, 15 (5 rows×3 columns) thumbnail images slid before the movement are displayed in the shelf panel 320 as shown in FIG. 14B.

Figure 14A:
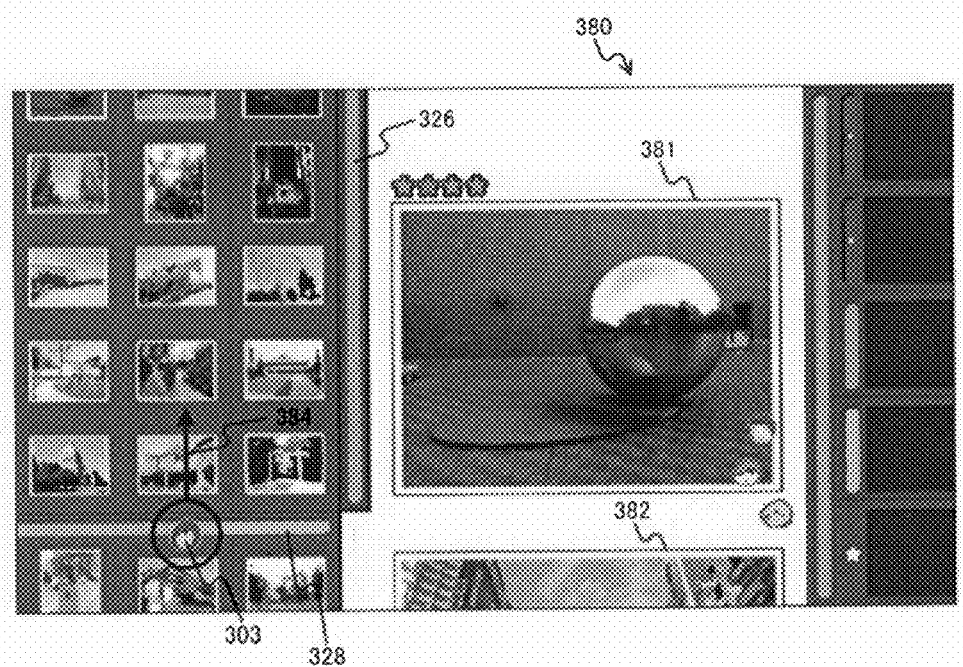
FIGS. 14A and 14B are screens indicative of an exemplary transition of the shelf panel shown on the display screen.
Figure 14B:
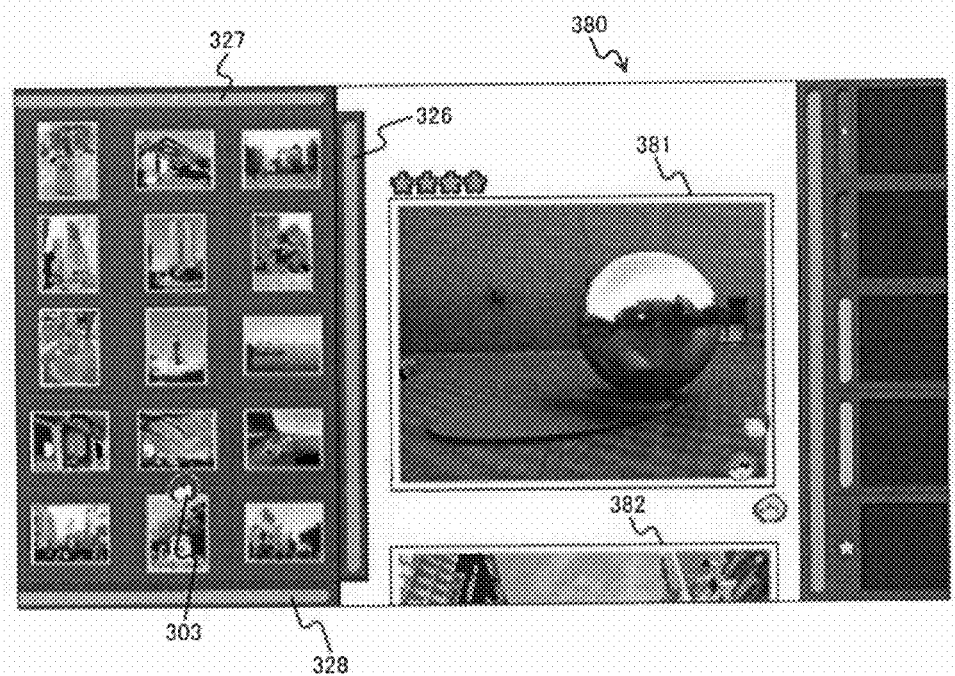

It should be noted that, as shown in FIG. 14A, if the left-button dragging is stopped before a predetermined distance has been reached in moving the lower handle section 328 in the direction of arrow 384, the lower handle section 328 can be moved in an animation manner in the direction opposite to the direction of arrow 384. After this movement in an animation manner, 15 (5 rows×3 columns) thumbnail images are displayed in the shelf panel 320 as shown in FIG. 13B. Consequently, the transition of thumbnail images by movement can be seen with ease. In addition, as shown in FIGS. 13B and 14B, all thumbnail images can be displayed on the shelf panel 320.

The following describes the changing of the number of thumbnail images to be displayed on the shelf panel 320 with reference to drawings.

FIG. 15 shows a part of a display screen 390, one example of display screens to be displayed on the display block 150, showing a relationship between a width 400 of the display area, a threshold (low) 401, and a threshold (high) 402 in changing the number of thumbnail images to be displayed on the shelf panel 320. It should be noted that, with each of the display screens to be described below, the horizontal direction is indicated by x and the vertical direction is indicated by y.

The width 400 of the shelf panel 320 is the distance between the left end of the display area of the shelf panel 320 and the right end thereof. It should be noted that the right handle section 326 is included in the display area of the shelf panel 320 and therefore the right end of the display area of the shelf panel 320 is right end of the right handle section 326. If the width 400 of the display area of the shelf panel 320 is smaller than the threshold (low) 401, the area of the shelf panel 320 is reduced in an animation manner. If the width 400 of the display area of the shelf panel 320 is equal to or greater than the threshold (high) 402, the area of the shelf panel 320 is enlarged in an animation manner. Details of the relationship between the width of display area, the threshold (low), and the threshold (high) will be described later with reference with FIG. 43.

The following describes the switching of thumbnail images displayed on the shelf panel 320 with reference to drawings.

FIG. 16 shows a part of a display screen 391, one example of display screens to be displayed on the display block 150, showing a relationship between the y-coordinate 410 of the display area, a threshold (high) 411, and a threshold (low) 412 in switching the thumbnail images displayed on the shelf panel 320.

The y-coordinate 410 of the display area of the shelf panel 320 is indicative of the center between the top end and the bottom end of the display area of the shelf panel 320. It should be noted that the upper handle section 327 and the lower handle section 328 are included in the display area of the shelf panel 320 and the top end of the shelf panel 320 is the top end of the upper handle section 327 and the bottom end of the shelf panel 320 is the bottom end of the lower handle section 328. If the y-coordinate 410 of the display area of the shelf panel 320 is equal to or greater than the threshold (high) 411, then the current thumbnail image is switched to the next thumbnail image in an animation manner. If the y-coordinate 410 of the display area of the shelf panel 320 is smaller than the threshold (low) 412, then the current thumbnail image is switched to the previous thumbnail image in an animation manner. Details of the relationship of the y-coordinate of the display area, the threshold (high), and the threshold (low) will be described later with reference to FIG. 44.

The following describes in detail the enlargement and reduction of the drawer panel 330 with reference to drawings.

Figure 17A:
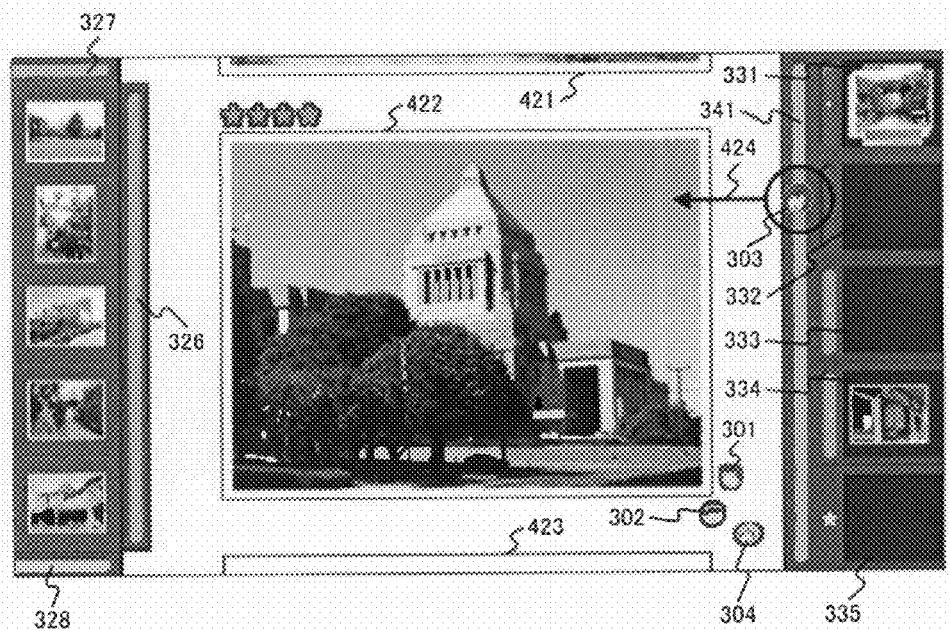
FIGS. 17A and 17B are display examples of display screens shown on the display block.
Figure 17B:
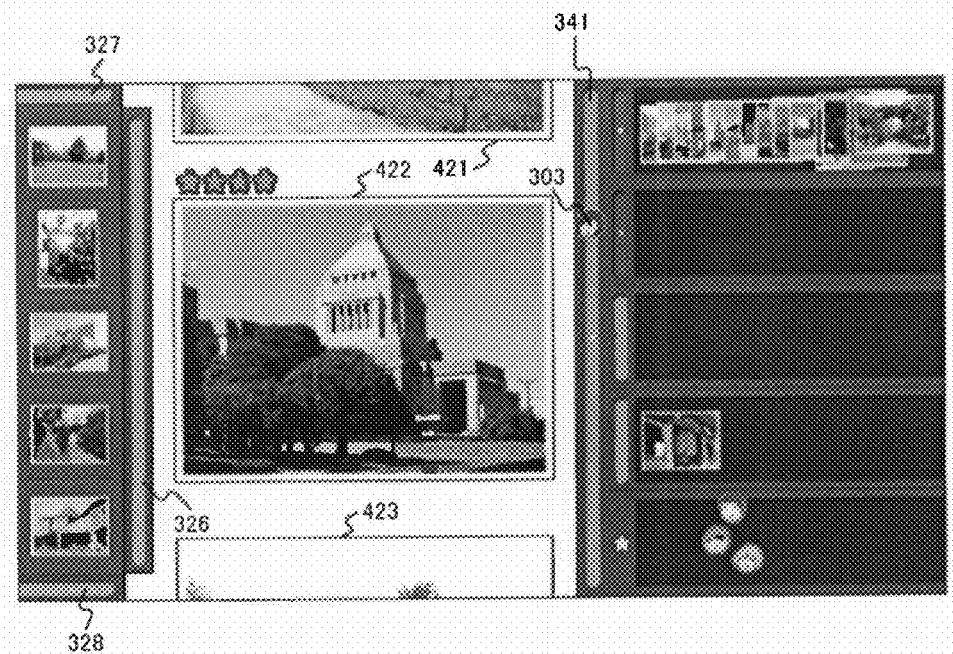
Figure 18A:
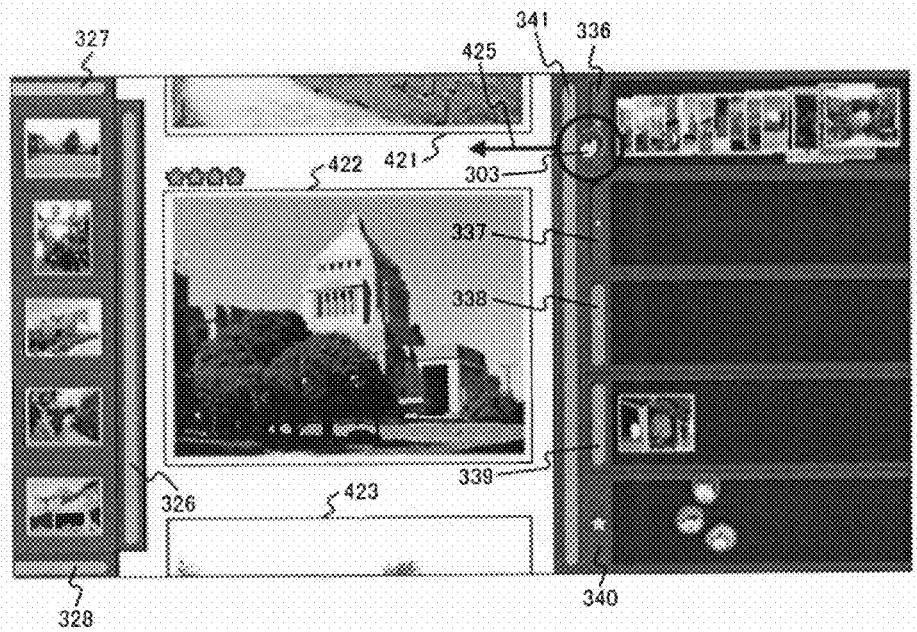
FIGS. 18A and 18B are display examples of display screens shown on the display block.
Figure 18B:
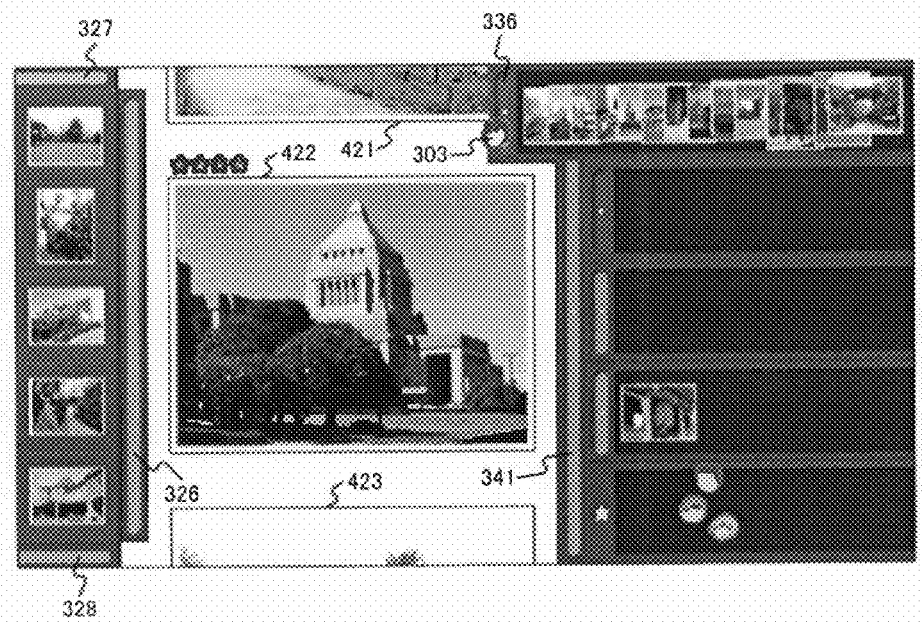

FIGS. 17 and 18 show display examples of display screens to be displayed on the display block 150. FIG. 17A shows a state before the area of the drawer panel 330 is enlarged. FIGS. 17B and 18A show states in which the area of the entire drawer panel 330 has been enlarged by use of the overall handle section 341. FIG. 18B shows a state in which the area of the first drawer section 331 has been enlarged by use of the first handle section 336.

The display screen shown in FIG. 17A shows images 421 through 423 in the slide panel 310, a plurality of thumbnail images in the shelf panel 320, the first drawer section 331 through the fourth drawer section 334, the bookmark drawer section 335, the first handle section 336 through the fifth handle section 340, the overall handle section 341, thumbnail images stored in the first drawer section 331 or the fourth drawer section 334, the father cursor 301, the son cursor 302, the mother cursor 303, and the daughter cursor 304.

As shown in FIG. 17A, when the left end of each of the first drawer section 331 through the fourth drawer section 334 and the bookmark drawer section 335 is positioned at the right side of the overall handle section 341, left-button dragging the overall handle section 341 by the mother cursor 303 positioned on any part of the overall handle section 341 in the direction of arrow 424, for example, accordingly moves the overall handle section 341 in the direction of arrow 424, thereby enlarging the horizontal area of the drawer panel 330 as shown in FIGS. 17B and 18A. Thus, when the area of the drawer panel 330 is enlarged to the left side, the display area of the slide panel 310 is reduced and the images 421 through 413 are displayed as accordingly reduced. In this case, it is practicable to execute the reduction processing so as to prevent the size of each image in the slide panel 310 from getting smaller than a predetermined size.

When the first handle section 336 is left-button dragged by the mother cursor 303 positioned on the first handle section 336 in the direction of arrow 425 as shown in FIG. 18A, the first handle section 336 moves in the direction of arrow 425 in accordance with a dragged distance, thereby enlarging the horizontal area of the first drawer section 331 as shown in FIG. 18B. It should be noted that, if the area of each drawer section is enlarged to the left side, the display area of the slide panel 310 is reduced, but the images 421 through 423 are displayed without being reduced. Also, in accordance with the enlargement of the area of the first drawer section 331, thumbnail images are displayed so as to make smaller the overlap portion between the thumbnails stored in the first drawer section 331. It should be noted that a method of displaying thumbnail images stored in drawer sections will be detailed later with reference to FIGS. 29 and 30. The areas in the horizontal direction of the drawer panel 330 can also be reduced by use of the overall handle section 341 or the first handle section 336 through the fifth handle section 340. In addition, the enlargement and reduction of the areas of drawing sections can be executed by any cursors. Consequently, the collaborative work of image sorting, for example, by two or more persons can be facilitated.

Figure 19:
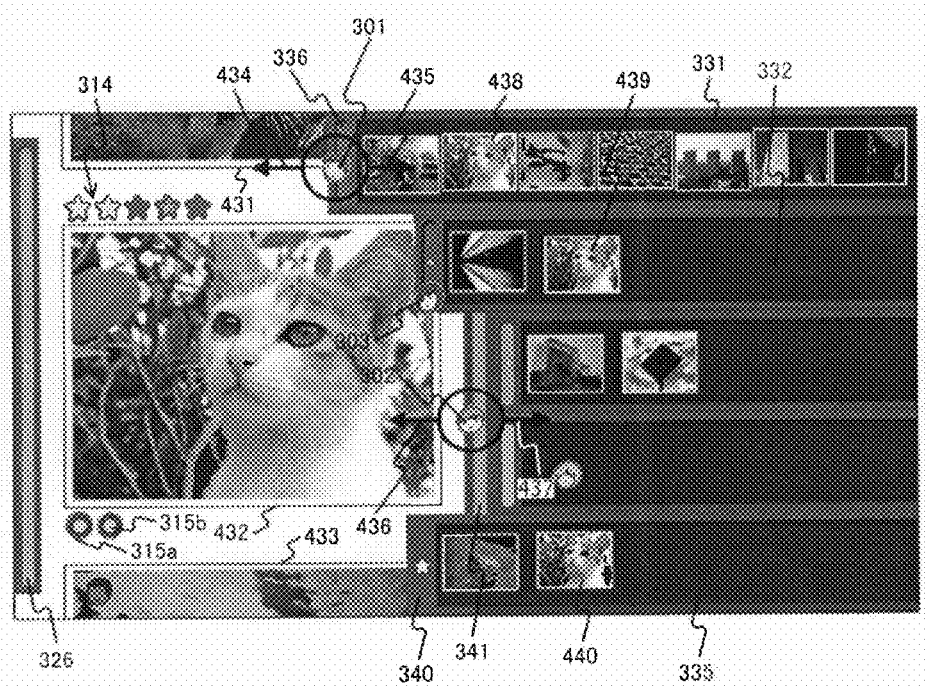
FIG. 19 is a display example of display screens shown on the display block.

FIG. 19 shows an exemplary display screen to be displayed on the display block 150, in which the right handle section 326 is moved to the left to reduce the area of the shelf panel 320 and enlarge each area of the drawer panel 330.

In the display screen shown in FIG. 19, the first handle section 336 can be moved by the father cursor 301 for example in the direction of arrow 434 or arrow 435 to enlarge or reduce the area of the first drawer section 331 and the overall handle section 341 can be moved by the son cursor 302 for example in the direction of arrow 436 or arrow 437 to enlarge or reduce the areas of the third drawer section 333 and the fourth drawer section 334. Thus, the areas of the drawer sections of the drawer panel 330 can be independently enlarged or reduced.

The following describes a relationship between each image to be displayed on the slide panel 310 and each image stored in each drawer section of the drawer panel 330. Left-button dragging an image displayed on the slide panel 310 by the cursor positioned on the image displayed on the slide panel 310 to a drawer section and dropping this image in the area of drawer section can display the thumbnail image corresponding to this image onto that drawer section. Namely, images displayed in the drawer panel 330 can be stored in drawer sections. This storage operation will be detailed later with reference to FIGS. 20 through 23.

For example, when a cat image 432 is displayed in the slide panel 310, this image can be stored by left-button dragging into a drawer section. As shown in FIG. 19, for example, a thumbnail image 438 corresponding to the cat image 432 is stored in the first drawer section 331 and a thumbnail image 439 corresponding to the cat image 432 is stored in the second drawer section 332. Thus, when images displayed in the slide panel 310 are stored in any of drawer sections, stamps in accordance with the number of drawer sections in which the images are stored are displayed in the lower left portion of each image shown in the slide panel 310. Also, each stamp is colored in accordance with the handle section corresponding to each drawer section in which the image is stored. For example, a point 315a having a color (for example, blue "0") corresponding to the first handle section 336 and a point 315b having a color (for example, red "0") corresponding to the second handle section 337 are displayed in the lower left portion of the cat image 432. Consequently, the user can easily recognize the storage status of each drawer section.

Left-button clicking the bookmark 314 by the cursor positioned on the bookmark 314 causes a thumbnail image corresponding to an image displayed below the bookmark 314 to be stored in the bookmark drawer section 335. For example, a thumbnail image 440 is stored in the bookmark drawer section 335.

If the number of thumbnail images stored in each drawer section is large, some thumbnail images are displayed as overlapped each other so as to display at least a part of each of these thumbnails is shown. In addition, in accordance with the enlargement or reduction of the area of each drawer section, the overlapped parts are increased or decreased. This allows the user to easily recognize the storage state of each drawer section.

The following details a method of storing images displayed in the slide panel 310 or the shelf panel 320 into any of the first drawer section 331 through the fourth drawer section 334 and the bookmark drawer section 335, with reference to drawings.

Figure 20A:
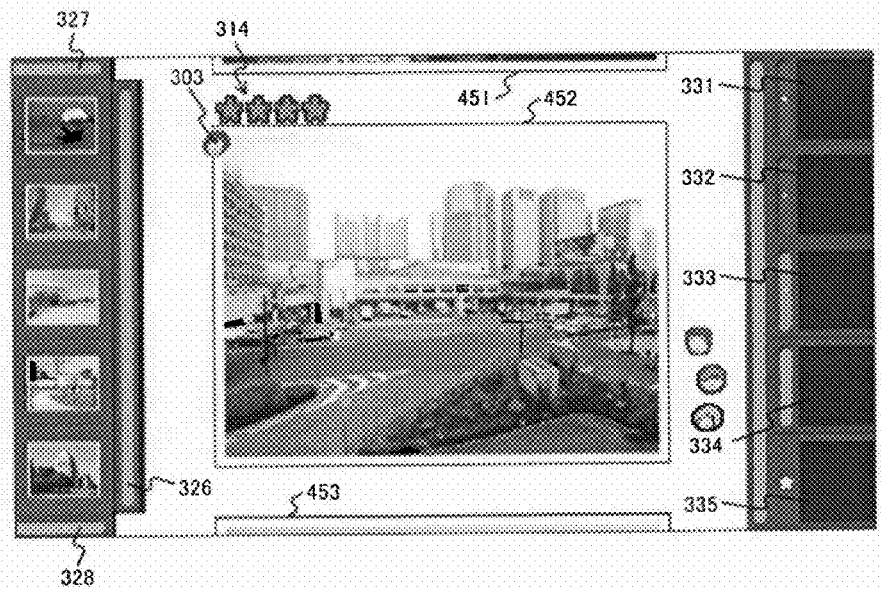
FIGS. 20A and 20B are display examples of display screens shown on the display block.
Figure 20B:
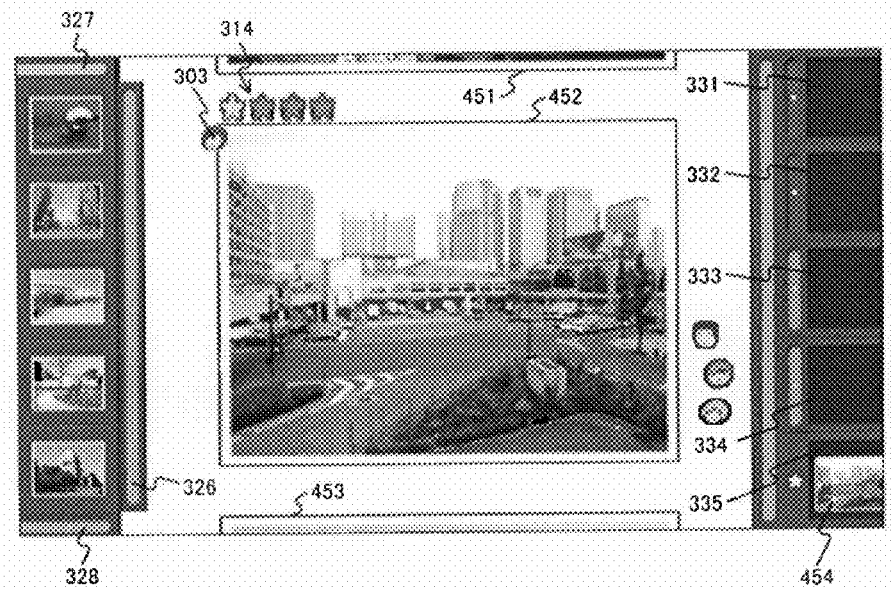

FIGS. 20A and 20B show display examples of screens shown on the display block 150, showing how an image displayed in the slide panel 310 is stored in the bookmark drawer section 335.

The following describes the storage of an image 452 into the bookmark drawer section 335 with images 451 through 453 displayed in the slide panel 310. As shown in FIG. 20A, for example, the bookmark 314 displayed at the upper left of the image 452 is left-button clicked by the mother cursor 303 positioned any part of the bookmark 314. This clicking causes one of the bookmarks 314 to change in color as shown in FIG. 20B and the thumbnail image 454 corresponding to the image 452 displayed below the bookmark 314 to be stored in the bookmark drawer section 335. It should be noted that, if the image 452 is left-button dragged by the mother cursor 303 and dropped in the bookmark drawer section 335, one the bookmarks 314 changes in color and the thumbnail image 454 corresponding to the dragged and dropped image 452 is stored in the bookmark drawer section 335.

Figure 21A:
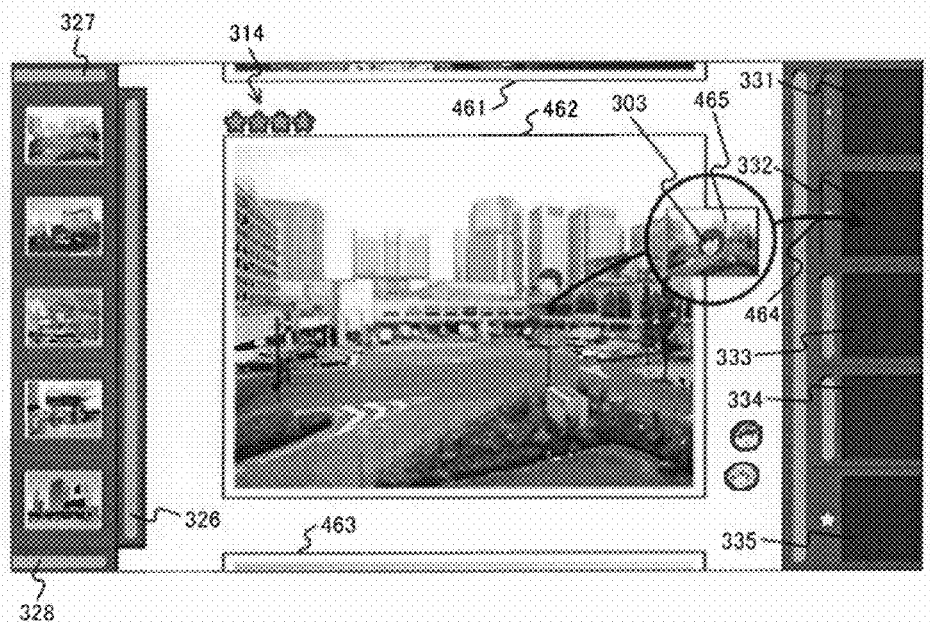
FIGS. 21A and 21B are display examples of display screens shown on the display block.
Figure 21B:
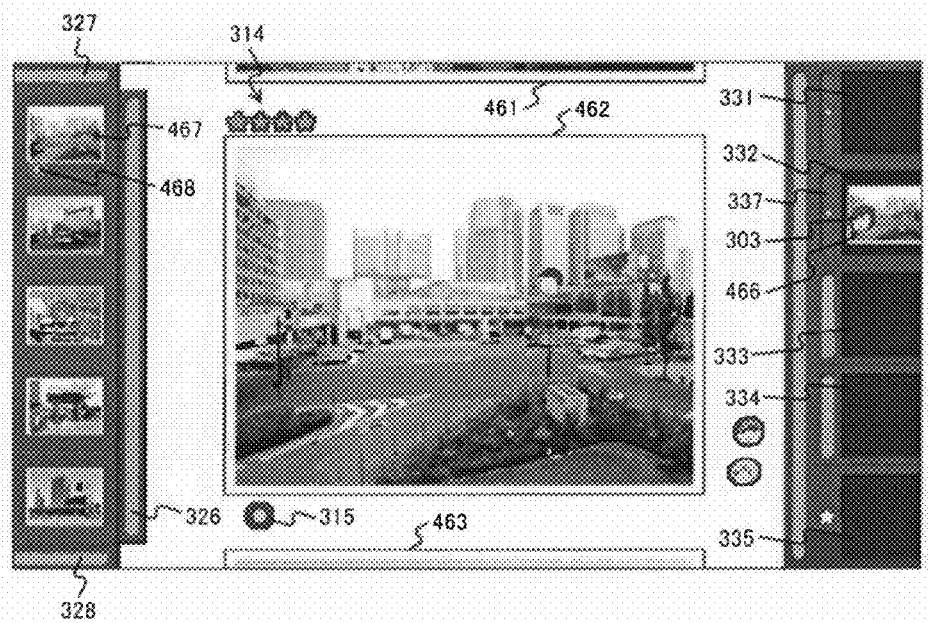

FIGS. 21A and 21B show display examples of screens to be displayed on the display block 150, showing the storage of an image displayed in the slide panel 310 into the second drawer section 332.

The following describes the storage of an image 462 into the second drawer section 332 with images 461 through 463 displayed in the slide panel 310. As shown in FIG. 21A, for example, the image 462 is left-button dragged by the mother cursor 303 positioned on any part of the image 462 and dropped in the second drawer section 332. For example, this dragging is made in the direction of arrow 464. In this case, while the left-button dragging is being executed, a thumbnail image 465 corresponding to the image 462 is displayed as shown in FIG. 21A. Then, when the thumbnail image 465 is left-button dragged by the mother cursor 303 to the area of the second drawer section 332 and dropped in the area of the second drawer section 332, the stamp 315 is displayed in the slide panel 310 as shown in FIG. 21B and an thumbnail image 466 corresponding to the left-button dragged image 462 is stored in the second drawer section 332. In this case, the stamp 315 allocated with a color (red for example) corresponding to the second handle section 337 corresponding to the second drawer section 332 is displayed at the lower left of the image 462 shown in the slide panel 310. Further, of the thumbnail images displayed in the shelf panel 320, a reduced stamp 468 is displayed at the lower left of a thumbnail image 467 corresponding to the image 462. It should be noted that the reduced stamp 468 is obtained by reducing the stamp 315 and has the same color and shape as those of the stamp 315.

Figure 22A:
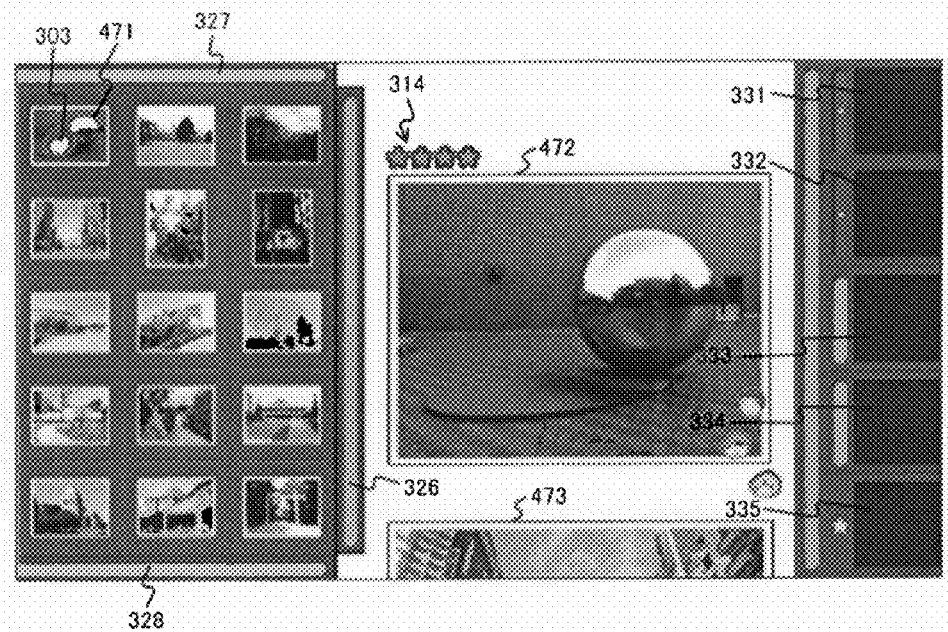
FIGS. 22A and 22B are display examples of display screens shown on the display block.
Figure 22B:
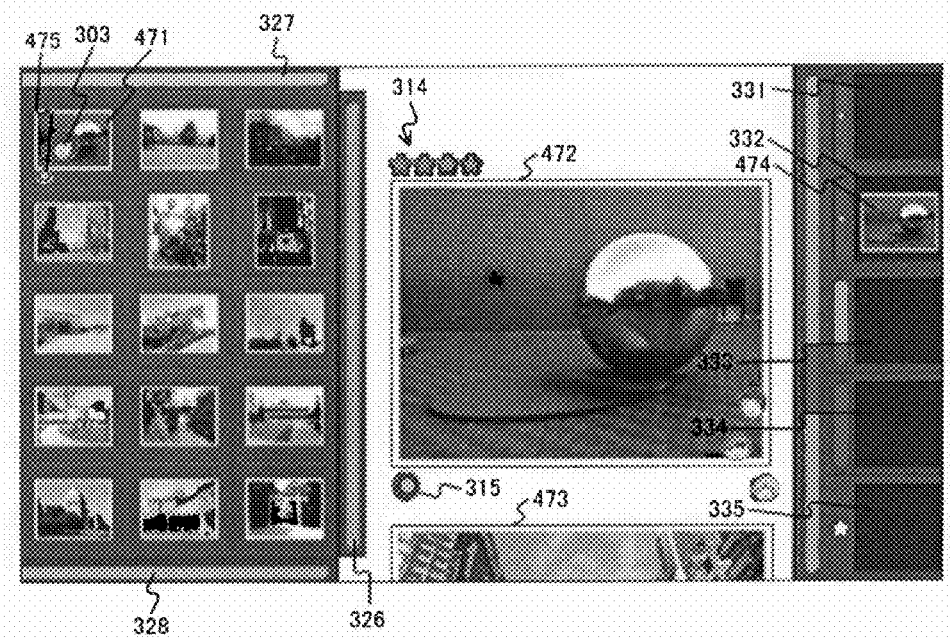

FIGS. 22A and 22B show display examples of screens to be displayed on the display block 150, showing the transition of display screens in storing a thumbnail image displayed in the shelf panel 320 into the second drawer section 332. The following describes an example of a storage operation by use of the mother cursor 303 corresponding to the second drawer section 332.

The following describes the storage of a thumbnail image 471 into the second drawer section 332 with the thumbnail image 471 displayed in the shelf panel 320. As shown in FIG. 22A, for example, the thumbnail image 471 is left-clicked with the mother cursor 303 positioned on any part of the thumbnail image 471, corresponding to the second drawer section 332. This clicking operation causes the stamp 315 to be displayed at the lower left of the image 472 corresponding to the clicked thumbnail 471 and a thumbnail image 474 corresponding to the thumbnail image 471 to be stored in the second drawer section 332. In this case, a color (red for example) corresponding to the second handle section 337 corresponding to the second drawer section 332 is allocated to the stamp 315 position at the lower left of the image 472 shown in the slide panel 310. Also, a reduced stamp 475 having the same color as the stamp 315 is displayed at the lower left of the thumbnail image 471 displayed in the shelf panel 320. Thus, the storage operation by use of the cursor corresponding to each drawer section can be executed with ease.

Figure 23A:
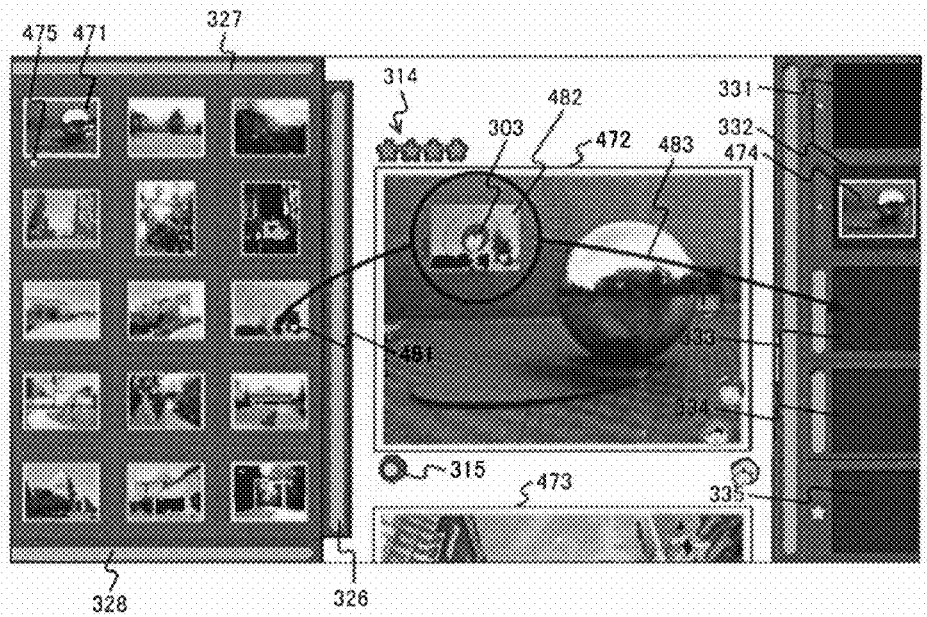
FIGS. 23A and 23B are display examples of display screens shown on the display block.
Figure 23B:
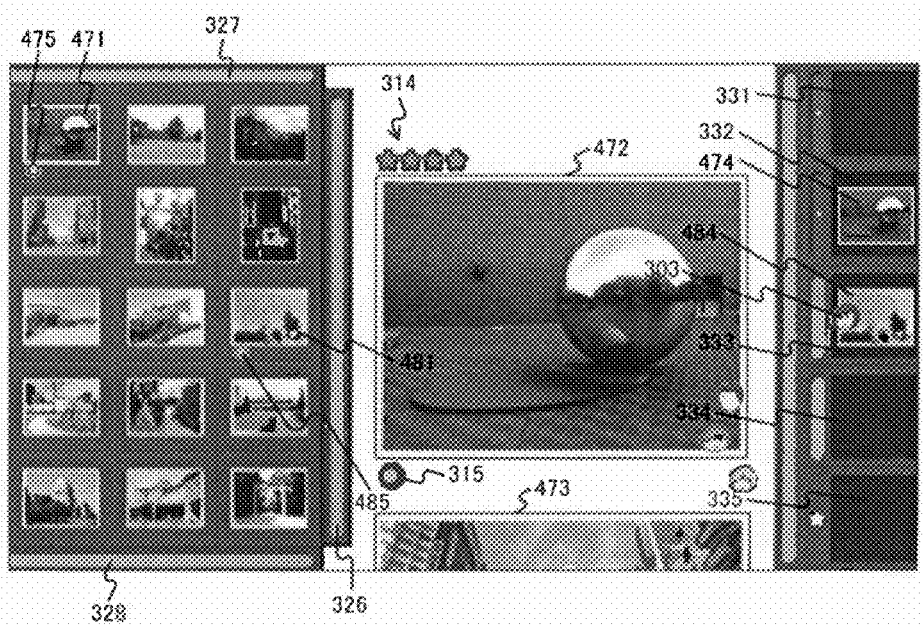

FIGS. 23A and 23B show display examples of screens to be displayed on the display block 150, showing the storage of an image displayed in the shelf panel 320 into the third drawer section 333. The following describes an example of storing by use of the mother cursor 303 that does not correspond to the third drawer section 333.

The following describes an example of storing a thumbnail image 481 into the third drawer section 333 with the thumbnail image 481 displayed in the shelf panel 320. As shown in FIG. 23A, for example, the thumbnail 481 is left-button dragged by the mother cursor 303 positioned on any part of the thumbnail 481 and dropped in the area of the third drawer section 333. For example, the dragging is made in the direction of arrow 483. In this case, while the left-button dragging is being executed, a thumbnail image 482 corresponding to the thumbnail image 481 is displayed along with the mother cursor 303 as shown in FIG. 23A. Then, when the thumbnail image 481 is left-button dragged by the mother cursor 303 and dropped in the area of the third drawer section 333, a thumbnail image 484 corresponding to the thumbnail image 481 is stored in the third drawer section 333 as shown in FIG. 23B. In this case, a reduced stamp 485 is displayed at the lower left of the thumbnail image 481 displayed in the shelf panel 320. It should be noted that the reduced stamp 485 is obtained by reducing the stamp 315 and has the same color and shape thereof.

Figure 24:
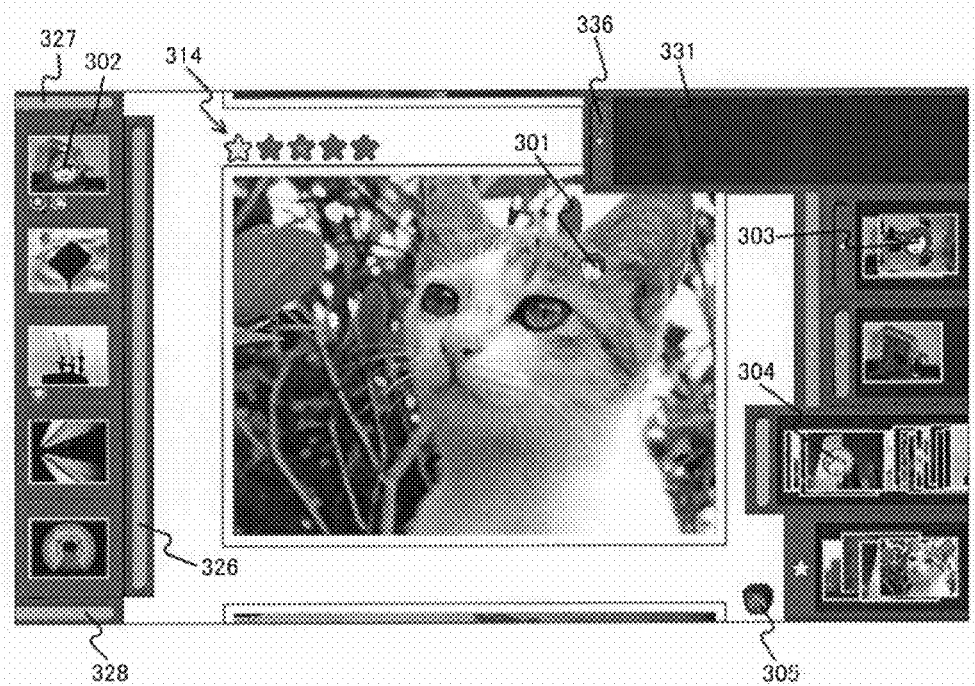
FIG. 24 is a display example of a display screen shown on the display block.
Figure 25:
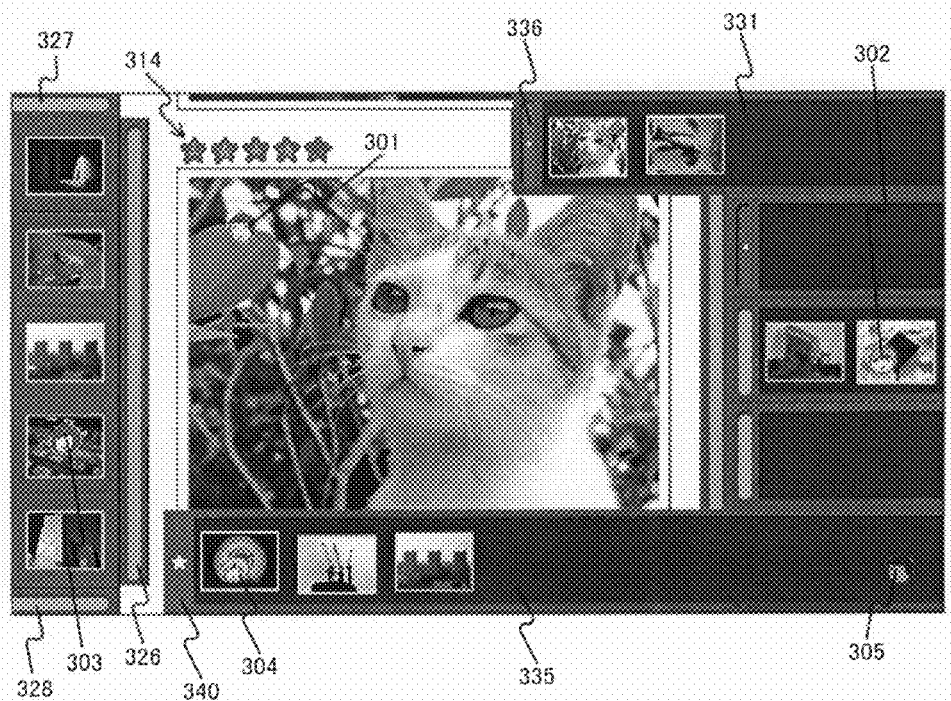
FIG. 25 is a display example of a display screen shown on the display block.

FIGS. 24 and 25 show display examples of screens to be displayed on the display block 150. As shown in FIGS. 24 and 25, the areas of the first drawer section 331 through the fourth drawer section 334 and the bookmark drawer section 335 can be enlarged or reduced in accordance with the ease of operation of each cursor by the user. For example, as shown in FIG. 24, if the storage into the first drawer section 331 is started by the operator of the father cursor 301, the area of the first drawer section 331 can be enlarged so as to make all the operators be able to see the first drawer section 331 to get the cooperation in storage operation by the other operators. Also, as shown in FIG. 25, if an operation of storing thumbnail images displayed in the shelf panel 320 into the bookmark drawer section 335 is executed, the area of the bookmark drawer section 335 can be enlarged up to the proximity of the right end of the shelf panel 320. Consequently, the distance in which each drag operation is executed can be shortened, resulting in a quicker drag operation.

The following describes in detail a method of moving thumbnails stored in any of the first drawer section 331 through the fourth drawer section 334 and the bookmark drawer section 335 to another area, with reference to drawings.

Figure 26A:
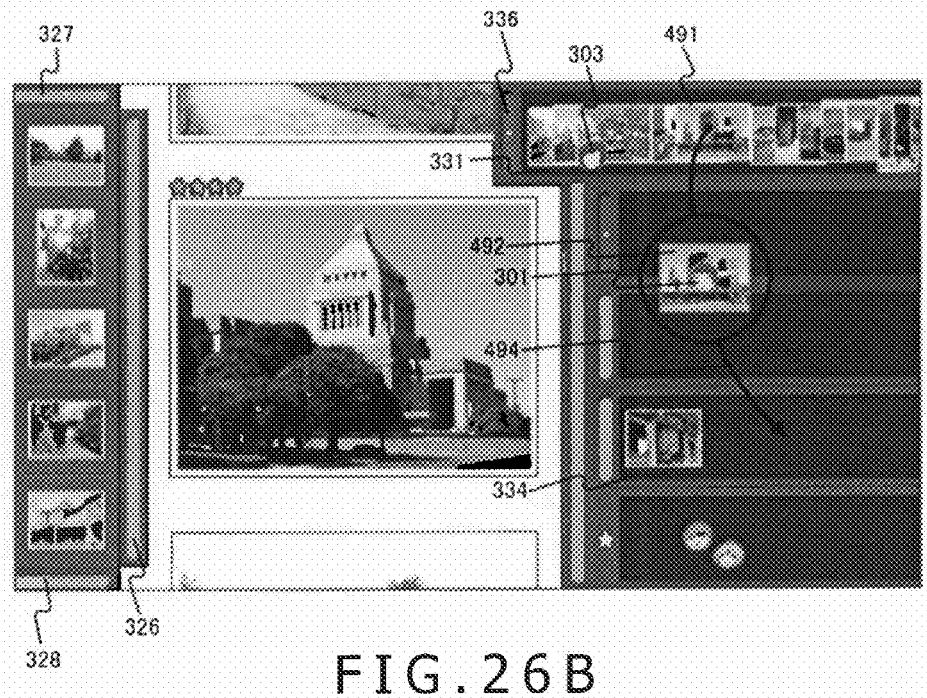
FIGS. 26A and 26B are display examples of display screens shown on the display block.
Figure 26B:
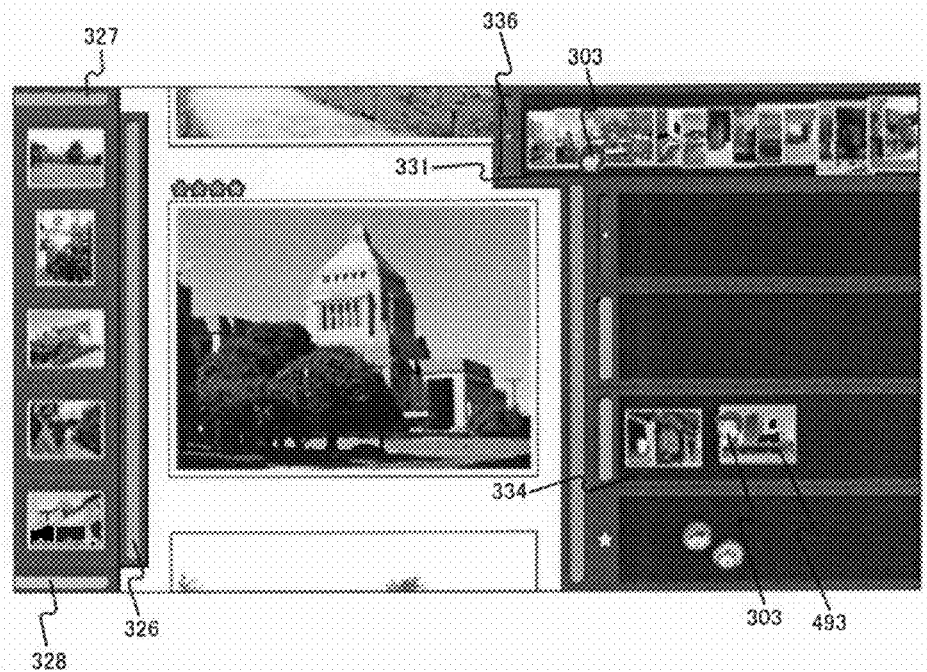

FIGS. 26A and 26B show display examples of screens to be displayed on the display block 150, showing the transition of display screens that takes place when thumbnail images stored in the first drawer section 331 are stored in another drawer section.

The following describes the moving of a thumbnail 491 to the fourth drawer section 334 by the father cursor 301 with the thumbnail 491 displayed in the first drawer section 331. As shown in FIG. 26A, for example, the thumbnail 491 is left-button dragged by the father cursor 301 positioned on any part of the thumbnail 491 and dropped in the area of the fourth drawer section 334. For example, this left-button dragging is executed in the direction of arrow 494. As shown in FIG. 26A, while the left-button dragging is being executed, a thumbnail image 492 corresponding to the thumbnail image 491 is displayed along with the father cursor 301. Then, when the thumbnail 492 is left-button dragged by the father cursor 301 and dropped in the area of the fourth drawer section 334, a thumbnail image 493 corresponding to the left-button dragged thumbnail image 491 is stored in the fourth drawer section 334 as shown in FIG. 26B. It should be noted that this movement deletes the thumbnail 491 from the first drawer section 331. In addition, the color of the stamp and the reduced stamp attached to the image corresponding to the thumbnail 491 is changed to the color (for example, pink [0]) of the fourth handle section 339 to the destination of the movement. In the area of the fourth drawer section 334, the thumbnail image 493 is displayed at the position of the drop. It should be noted that this holds true with other movements made between drawer sections.

Figure 27A:
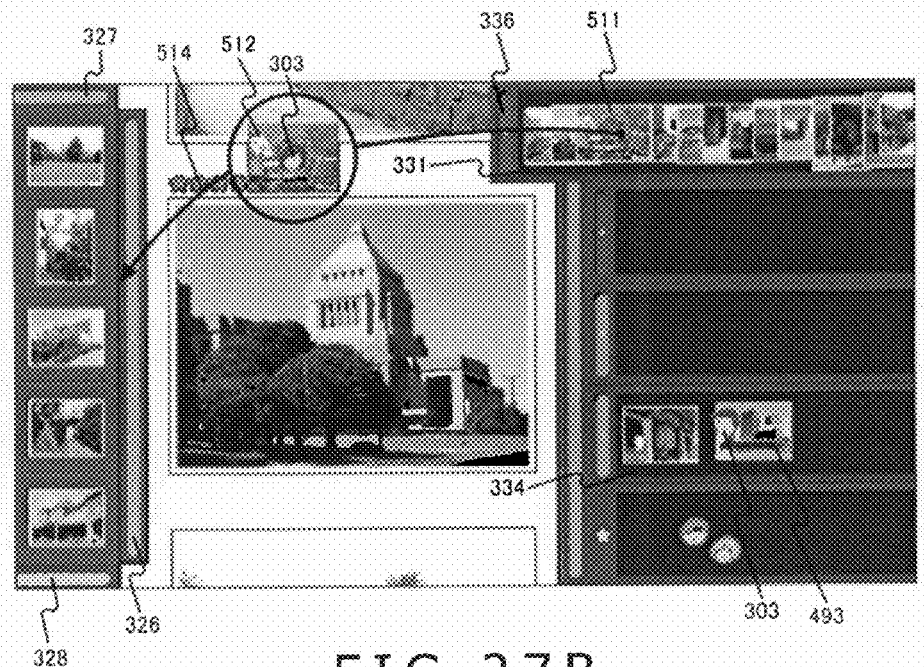
FIGS. 27A and 27B are display examples of display screens shown on the display block.
Figure 27B:
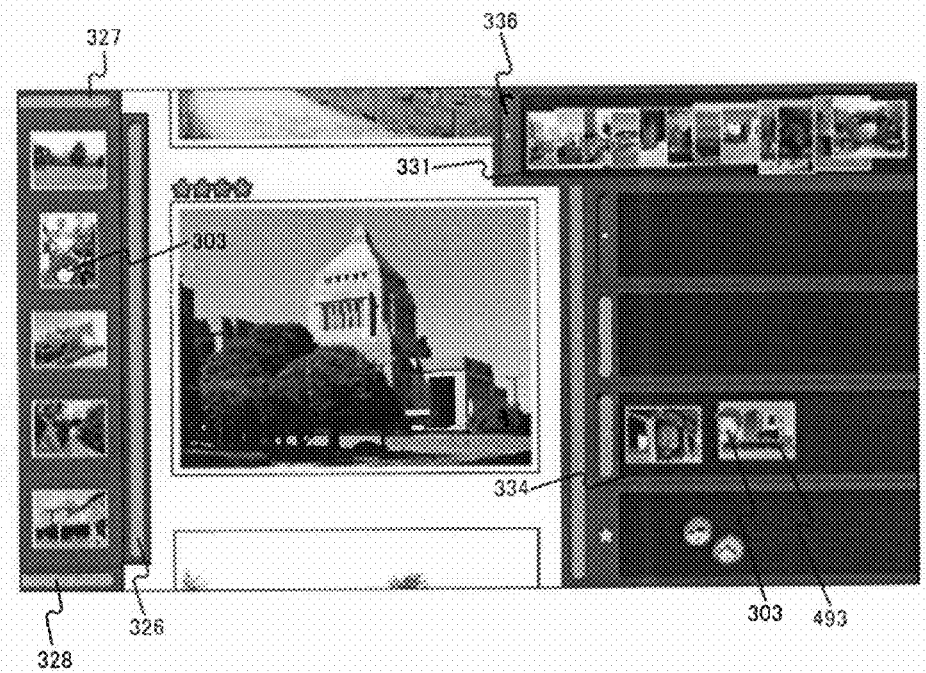

FIGS. 27A and 27B are display examples of screens to be shown on the display block 150, showing the transition of display screens at the time of deleting thumbnail images from the first drawer section 331.

The following describes an operation of deleting a thumbnail 511 by the mother cursor 303 with the thumbnail 511 displayed in the first drawer section 331, for example. As shown in FIG. 27A, for example, a thumbnail 511 is left-button dragged by the mother cursor 303 and dropped in the area of the shelf panel 320. For example, this left-dragging is executed in the direction of arrow 514. In this case, while the left-button dragging is being executed, a thumbnail image 512 corresponding to the thumbnail 511 is displayed along with the mother cursor 303 as shown in FIG. 27A. Then, when the thumbnail image 512 is left-button dragged by the mother cursor 303 and dropped in the area of the shelf panel 320, the left-dragged thumbnail image 511 is deleted from the first drawer section 331 as shown in FIG. 27B. It should be noted that this movement deletes the stamp and the reduced stamp attached to the image corresponding to the thumbnail 511. This holds true with the deletion of thumbnail images from other drawer sections.

Figure 28A:
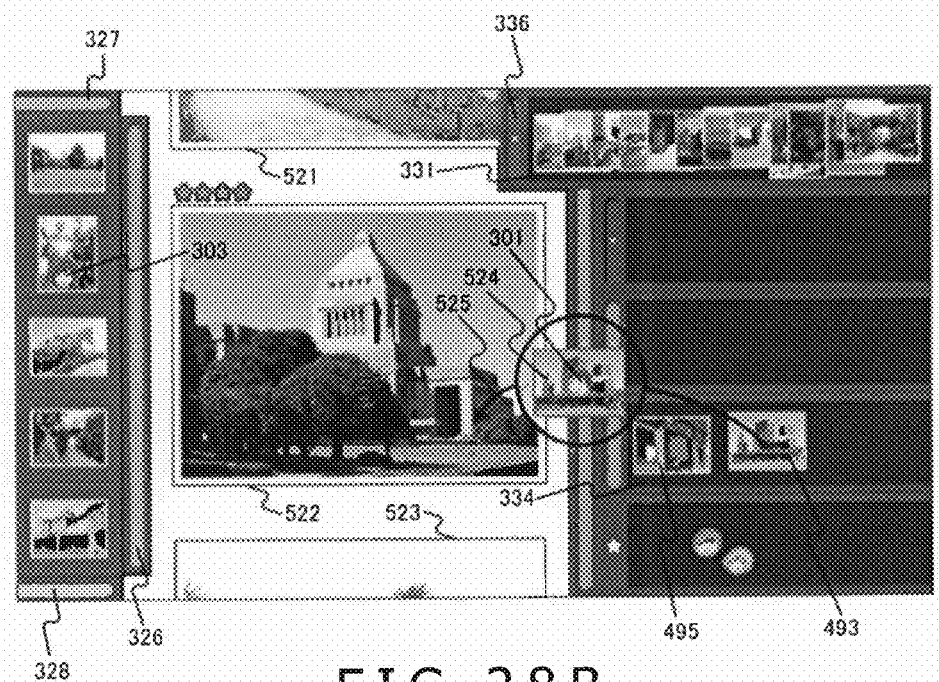
FIGS. 28A and 28B are display examples of display screens shown on the display block.
Figure 28B:
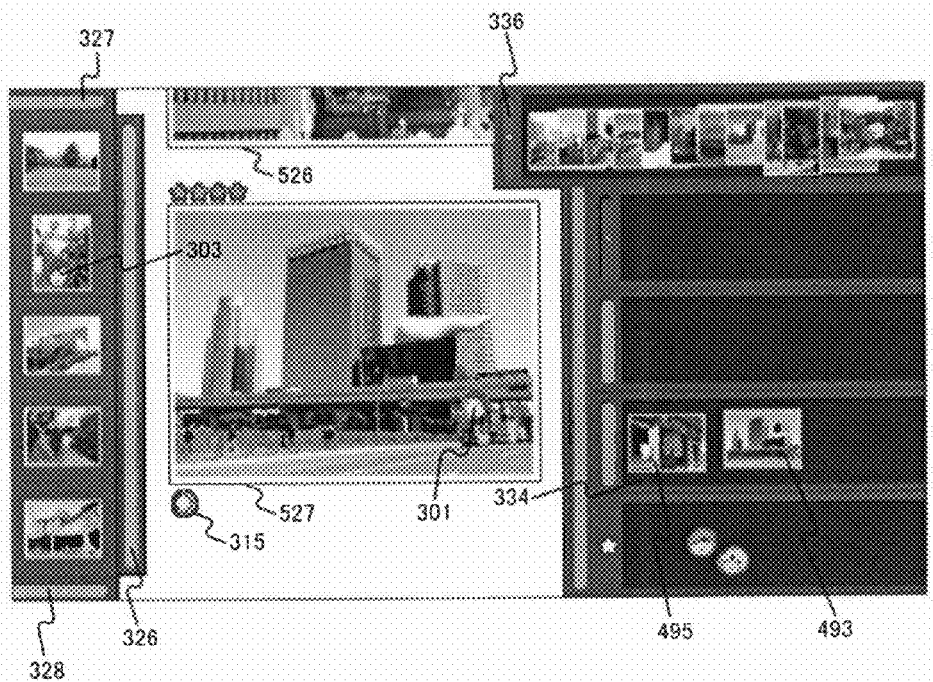

FIGS. 28A and 28B are display examples of screens to be displayed on the display block 150, showing the transition of display screens at the time of displaying an image corresponding to a thumbnail stored in the fourth drawer section 334 onto the slide panel 310.

The following describes the displaying of an image corresponding to the thumbnail image 493 onto the slide panel 310 by use of the father cursor 301 when the thumbnail image 493 is displayed in the fourth drawer section 334. As shown in FIG. 28A, for example, the thumbnail image 493 is left-button dragged by the father cursor 301 and dropped in the area of the slide panel 310. For example, the left-button dragging is executed in the direction of arrow 525. In this case, while the left-button dragging is being executed, the thumbnail image 524 corresponding to the thumbnail image 493 is displayed along with the father cursor 301 as shown in FIG. 28A. Then, when the thumbnail image 524 is left-button dragged by the father cursor 301 and dropped in the area of the slide panel 310, an image 527 corresponding to the dragged thumbnail image 493 is displayed in the slide panel 310 as shown in FIG. 28B. It should be noted that, in this movement, the thumbnail image 493 is not deleted from the fourth drawer section 334. The stamp 315 is attached to the lower left of the image 527 displayed in the slide panel 310. In addition, an image 526 corresponding to the thumbnail 495 stored in the fourth drawer section 334 is displayed above the image 527 dropped in the slide panel 310. Thus, if a thumbnail image stored in any drawer section is left-button dragged and dropped in the area of the slide panel 310, the thumbnail image thus operated is displayed at the center of the slide panel 310 and only the thumbnail images stored in the drawer section in which the thumbnail thus operated is stored are displayed in the slide panel 310. For example, the thumbnail images stored in the drawer section in which the thumbnail image dropped in the slide panel 310 are displayed in the slide panel 310 in a sequence in which these thumbnail images are stored in this drawer section. This holds true when thumbnail images stored in other drawing sections are displayed in the slide panel 310.

The following details a method of displaying thumbnail images stored in any of the first drawer section 331 through the fourth drawer section 334 and the bookmark drawer section 335, with reference to drawings.

FIGS. 29A and 29B and FIGS. 30A and 30B show display examples of screens to be displayed on the display block 150, showing the transition of display screens when displaying two or more thumbnail images stored in the first drawer section 331.

The following describes the displaying of a desired thumbnail image in the entirety thereof by use of the mother cursor 303 when two or more thumbnail images are stored in the first drawer section 331, for example. If two or more thumbnail images are stored in a drawer section, these thumbnail images are displayed as overlapping each other so as to show at least a part of each thumbnail image. For example, as shown in FIG. 29A, if two or more thumbnail images are stored in the first drawer section 331, these thumbnail images are displayed as overlapping each other so as to display at least a part of the left end of each of these thumbnail images. If the number of thumbnail images stored in each drawer section is small and therefore each of these thumbnail images can be displayed in the entirety thereof in the area of the drawer section, the thumbnail images are displayed in the entirety thereof in each drawer section. It should be noted that these thumbnail images may be arranged in the sequence of movement or in the sequence of storage time. Also, these thumbnail images need not be arranged in a row; that is, these thumbnail images may be arranged as offset up and down. Further, those thumbnail images that correspond to images that are tall rather than wide are displayed accordingly in a tall rather than wide manner.

If, of two or more thumbnail images stored in the first drawer section 331, a thumbnail 531 is displayed in the entirety thereof as shown in FIG. 29A thereof, the mother cursor 303 is positioned on any part of the thumbnail image 531. When the mother cursor 303 is positioned on the thumbnail image 531, the thumbnail images (located to the right side of the thumbnail image 532) to the right side of the thumbnail images 531 start moving in the direction of arrow 533 as shown in FIG. 29B. Further, if the mother cursor 303 is left positioned on the thumbnail image 531, each thumbnail image located to the right side of the thumbnail image 531 continues moving in the direction of arrow 533. When the entire thumbnail image 531 is displayed as shown in FIG. 29B, for example, the movement of each thumbnail image located to the right side of the thumbnail image 531 stops. It should be noted that, if the mother cursor 303 is positioned on other than the thumbnail image 531 while each thumbnail image located to the right side of the thumbnail image 531 is moving in the direction of arrow 533 with the mother cursor 303 positioned on the thumbnail image 531, the movement of each thumbnail stops. Instead of starting the movement of each thumbnail upon positioning of the cursor, it is also practicable to start the movement of each thumbnail when a state in which the mother cursor 303 is kept positioned on the thumbnail image 531 has continued for a predetermined period of time.

Figure 30A:
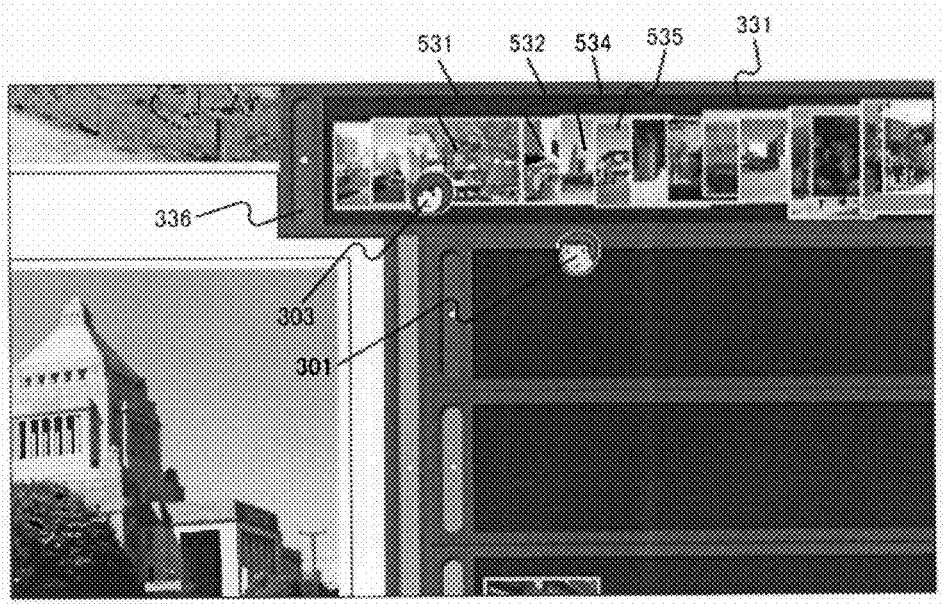
FIGS. 30A and 30B are display examples of display screens shown on the display block.
Figure 30B:
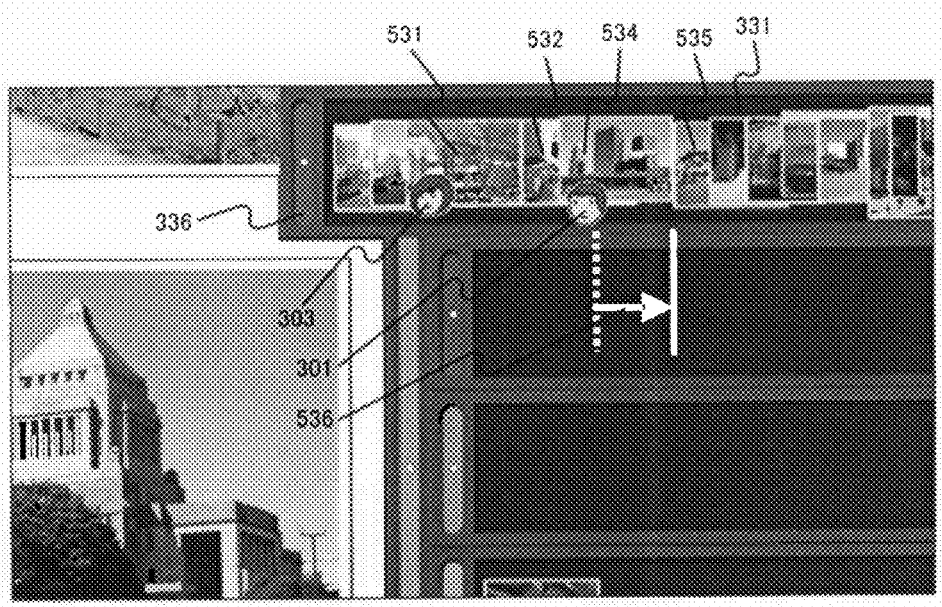

In addition, with the entire thumbnail image 531 displayed by use of the mother cursor 303, all the thumbnail images in the area of the same drawer section can be displayed by use of another cursor. As shown in FIG. 30A, for example, if a thumbnail image 534 is displayed in the entirety thereof with the thumbnail image 531 displayed in the entirety thereof by use of the mother cursor 303, the father cursor 301 is positioned on any display portion of the thumbnail image 534. Consequently, the movement of the thumbnail images (located to the right side of the thumbnail image 535) located to the right side of the thumbnail 534 starts in the direction of arrow 536 shown in FIG. 30B. Like the thumbnail image 531, the thumbnail image 534 can be displayed in the entirety thereof. It is also practicable to use one cursor to sequentially execute operations of displaying two or more thumbnail images in the entirety thereof.

It should be noted that the thumbnail images stored in the bookmark drawer section 335 may be sorted in accordance with the marked numbers (for example, the number of thumbnail images attached with the color of the bookmark 314). Consequently, the images can be dynamically arranged in a sequence of higher popularity, for example, thereby providing the user to browse results of popularity without sorting by himself.

The following details a method of enlarging images to be displayed on the slide panel 310 with reference to drawings.

FIGS. 31A and 31B and FIGS. 32A and 32B show display examples of screens to be displayed on the display block 150, showing display screens that are displayed when a part of each image displayed in the slide panel 310 is enlarged in part. With the display screens shown in FIGS. 31 and 32, the shelf panel 320 and the drawer panel 330 are omitted from display.

Figure 31A:
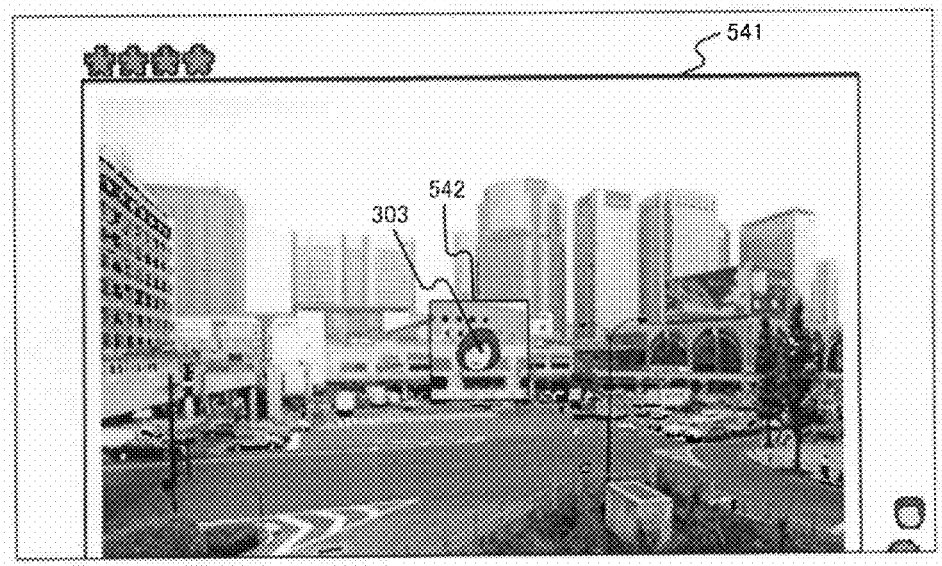
FIGS. 31A and 31B are display examples of display screens shown on the display block.
Figure 31B:
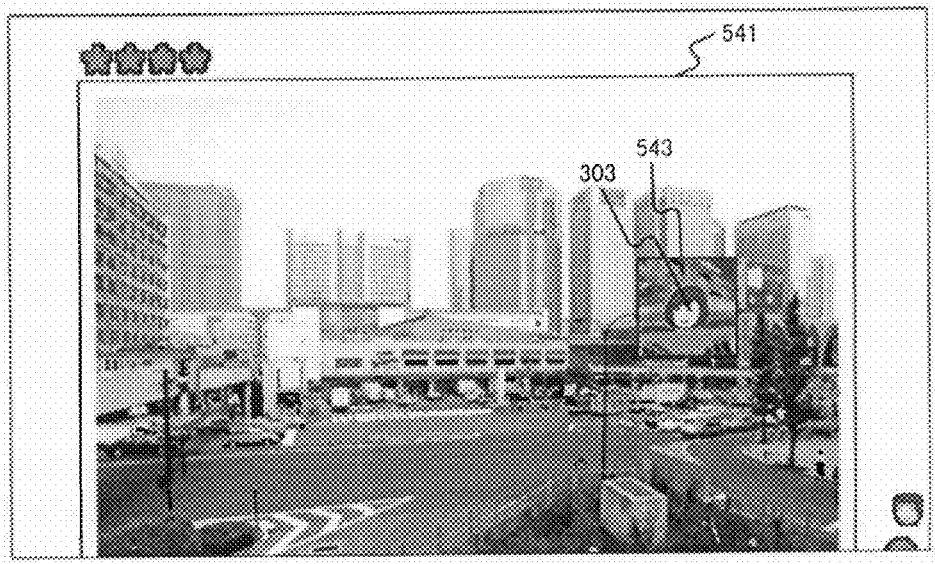

The following describes the displaying an image 541 by enlarging a part thereof by use of the mother cursor 303 with the image 541 displayed in the slide panel 310. As shown in FIG. 31A for example, if the image 541 displayed in the slide panel 310 is displayed by enlarging a predetermined part thereof, the mother cursor 303 is positioned onto a part to be enlarged. When the right button of the mouse is clicked in this state, the image around the mother cursor 303 is displayed as enlarged. For example, as shown in FIG. 31A, an enlarged image 542 is displayed with a rectangular image around the mother cursor 303 enlarged. If the mother cursor 303 is moved with the right button pressed, the position of the enlarge display accordingly moves, sequentially displaying enlarged images 543 of the destination as shown in FIG. 31B.

Figure 32A:
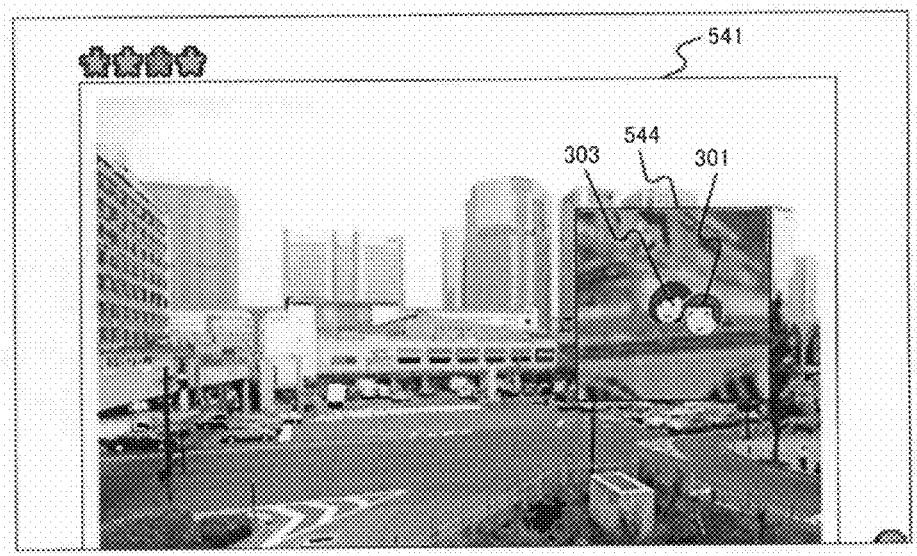
FIGS. 32A and 32B are display examples of display screens shown on the display block.
Figure 32B:
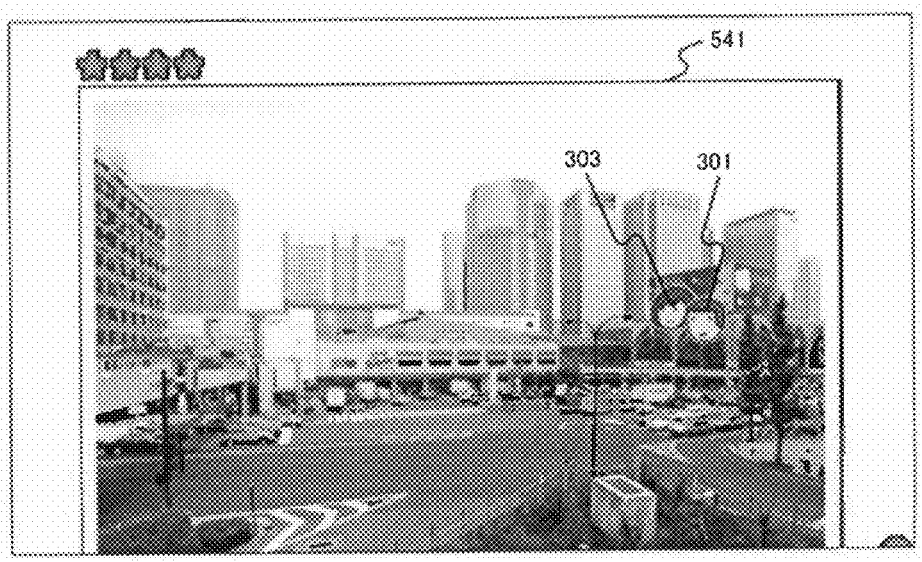

Superimposing another cursor on the cursor with which an enlarged display operation is executed in a state of enlarged display can increase the enlargement factor in accordance with the number of cursors. For example, as shown in FIG. 32A, positioning the father cursor 301 onto the mother cursor 303 when the enlarged display is executed by the mother cursor 303 increases the enlargement factor of the image enlarged by the mother cursor 303 and displays an enlarged image 544. It should be noted that, when the right button is released, the enlarged display ends, getting in the normal display state as shown in FIG. 32B. It is also practicable to restrict the enlarged display only to one part so as to prevent a topic at that time from being dispersed when two or more persons are viewing images. In addition, it is practicable to change the enlargement factors by weighting cursors and in accordance with a total value of cursor weights.

The following details a method of displaying lines on an image displayed in the slide panel 310 with reference to drawings.

Figure 33A:
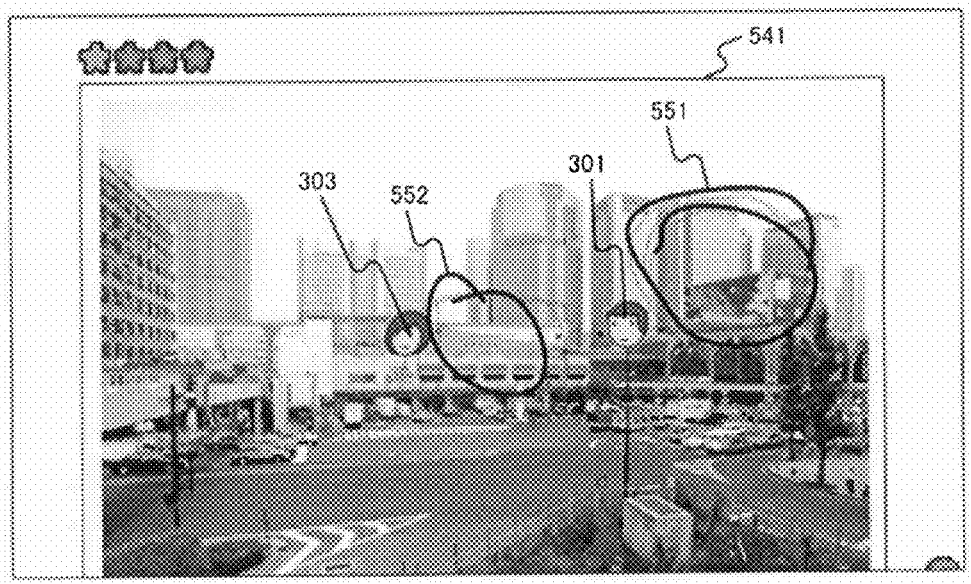
FIGS. 33A and 33B are display examples of display screens shown on the display block.
Figure 33B:
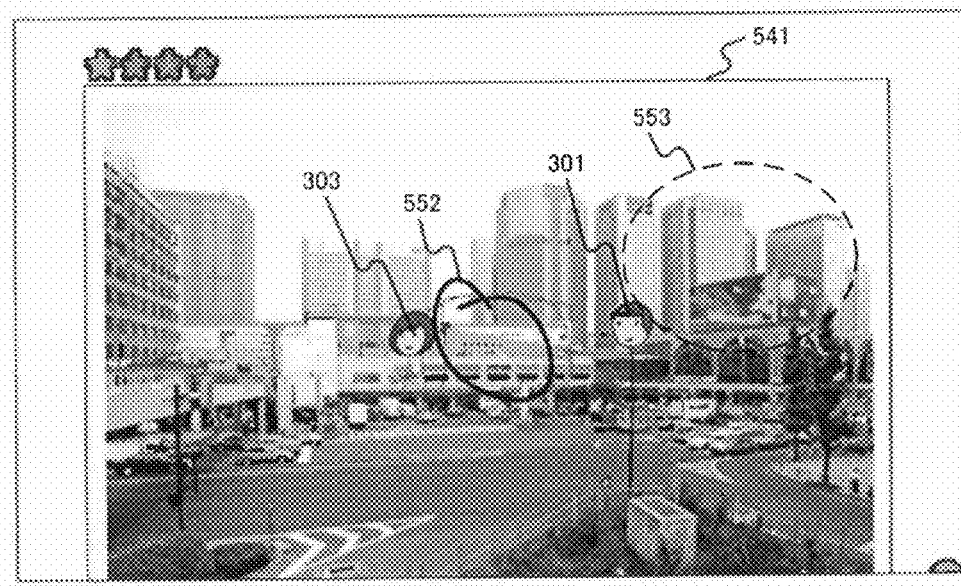

FIGS. 33A and 33B show display examples of screens to be displayed on the display block 150, showing display screens where lines are displayed on an image displayed in the slide panel 310. It should be noted that, in the display screens shown in FIGS. 33A and 33B, the shelf panel 320 and the drawer panel 330 are omitted from display.

The following describes the displaying of lines on the image 541 by use of the father cursor 301 and the mother cursor 303 when the image 541 is displayed in the slide panel 310. For example, a shown in FIG. 33A, in order to draw lines on the image 541 displayed in the slide panel 310, lines can be drawn by moving the cursor with the middle button pressed. For example, as shown in FIG. 33A, a line 551 is drawn on the image 541 displayed in the slide panel 310 by use of the father cursor 301 and a line 552 is drawn on the image 541 by use of the mother cursor 303. It should be noted that these lines are colored in accordance with the colors of the cursors. The drawn lines automatically disappear as a predetermined time passes. For example, as shown in FIG. 33B, the line 551 drawn by use of the father cursor 301 disappears from an area 553.

The following details the execution of predetermined operations by a cooperation of two or more persons on images that are displayed in the slide panel 310 with reference to drawings.

Figure 34:
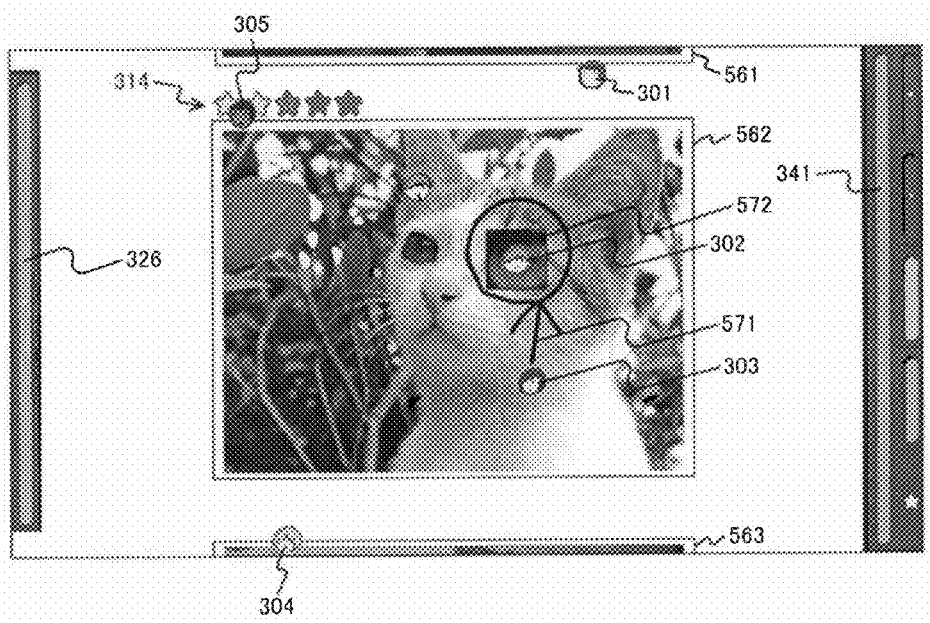
FIG. 34 is a display example of a display screen shown on the display block.

FIG. 34 shows a display example of a screen to be displayed on the display block 150, showing a display screen that is displayed when a predetermined operation is executed on an image displayed in the slide panel 310.

For example, the following describes a case in which four family members and one guest are viewing images taken by a digital still camera on the information processing apparatus 100. In this case, these five peoples operate different corresponding cursors.

For example, assume that the left eye of a cat of a cat image 561 be talked about with a cat image 562 displayed in the slide panel 310. In this case, the mother cursor 303 can draw lines 571 on the left eye of the cat. For example, the left eye of the cat is circled and this circle is indicated by an arrow. It is also practicable to display an enlarged image 572 of the left eye of the cat in question by use of the son cursor 302. In addition, because the cat is talked about, the bookmark 314 is left-clicked by use of the general cursor 305 so as to store the cat image 562 into the bookmark drawer section 335. In order to see the image 561 over the cat image 562, the image 561 can be pulled down by the father cursor 301 to the center of the slide panel 310. In order to see an image 563 below the cat image, the image 563 can be pulled up by the daughter cursor 304 to the center of the slide panel 310. Thus, each of the five peoples can operate his or her cursor to execute necessary operations.

The following describes operations of the information processing apparatus 100 practiced as one embodiment of the invention with reference to drawings.

Figure 35:
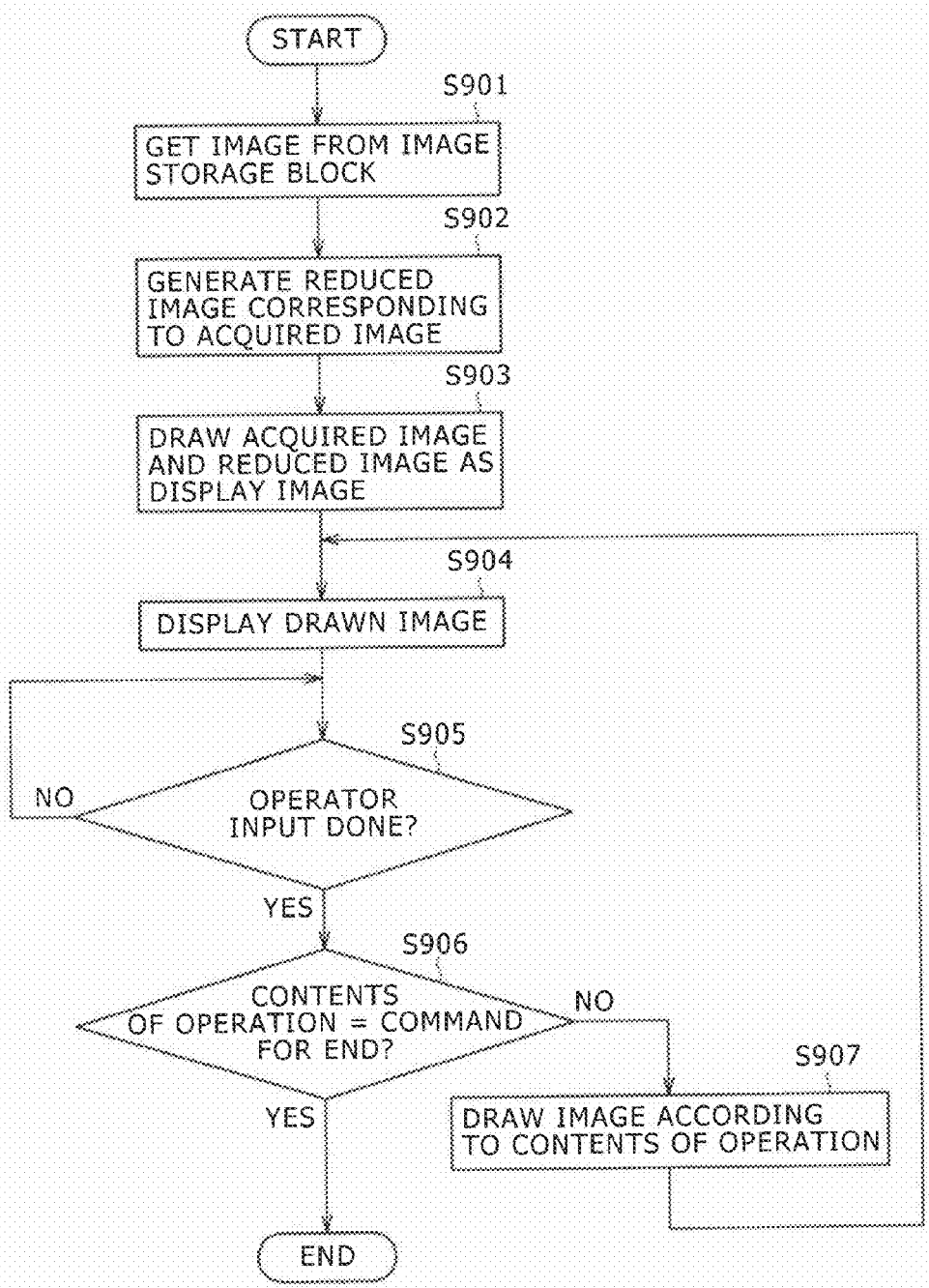
FIG. 35 is a flowchart indicative of a processing procedure of drawing control by the information processing apparatus.

Referring to FIG. 35, there is shown a flowchart indicative of a processing procedure of drawing control by the information processing apparatus 100.

First, an animation flag indicative whether or not to display, in an animation manner, each image drawn associated with the thumbnail image display area of the shelf panel 320 is turned OFF. Then, an image to be displayed is obtained from the image storage block 220 (step S901). Next, the reduced image generating block 230 generates a thumbnail image corresponding to the obtained image (step S902). Next, the generated thumbnail image is stored in the reduced image storage block 240. Then, the drawing block 250 draws the image stored in the image storage block 220 onto the display area of the slide panel 310 and draws the thumbnail image stored in the reduced image storage block 240 onto the display area of the shelf panel 320 (step S903). Next, the image drawn by the drawing block 250 is displayed on the display block 270 (step S904).

Next, it is determined whether an operation input has been done through mouse or keyboard (step S905). If no operation input done through mouse or keyboard is found, an operation input is monitored (step S905). If an operation input done through mouse or keyboard is found (step S905), it is determined whether the operation input is an end command (step S906). If the operation input is found to be an end command (step S906), then the drawing control processing procedure ends.

On the other hand, if the operation input is found not to be an end command (step S906), then an image is drawn by the drawing block 250 in accordance with the contents of the operation input (step S907) and the image drawing by the drawing block 250 is displayed on the display block 270 (step S904).

The following details an operation to be executed when storing an image into the bookmark drawer section 335 arranged on the drawer panel 330 or operation to be executed when deleting an image from the bookmark drawer section 335 with reference to drawings.

Figure 36:
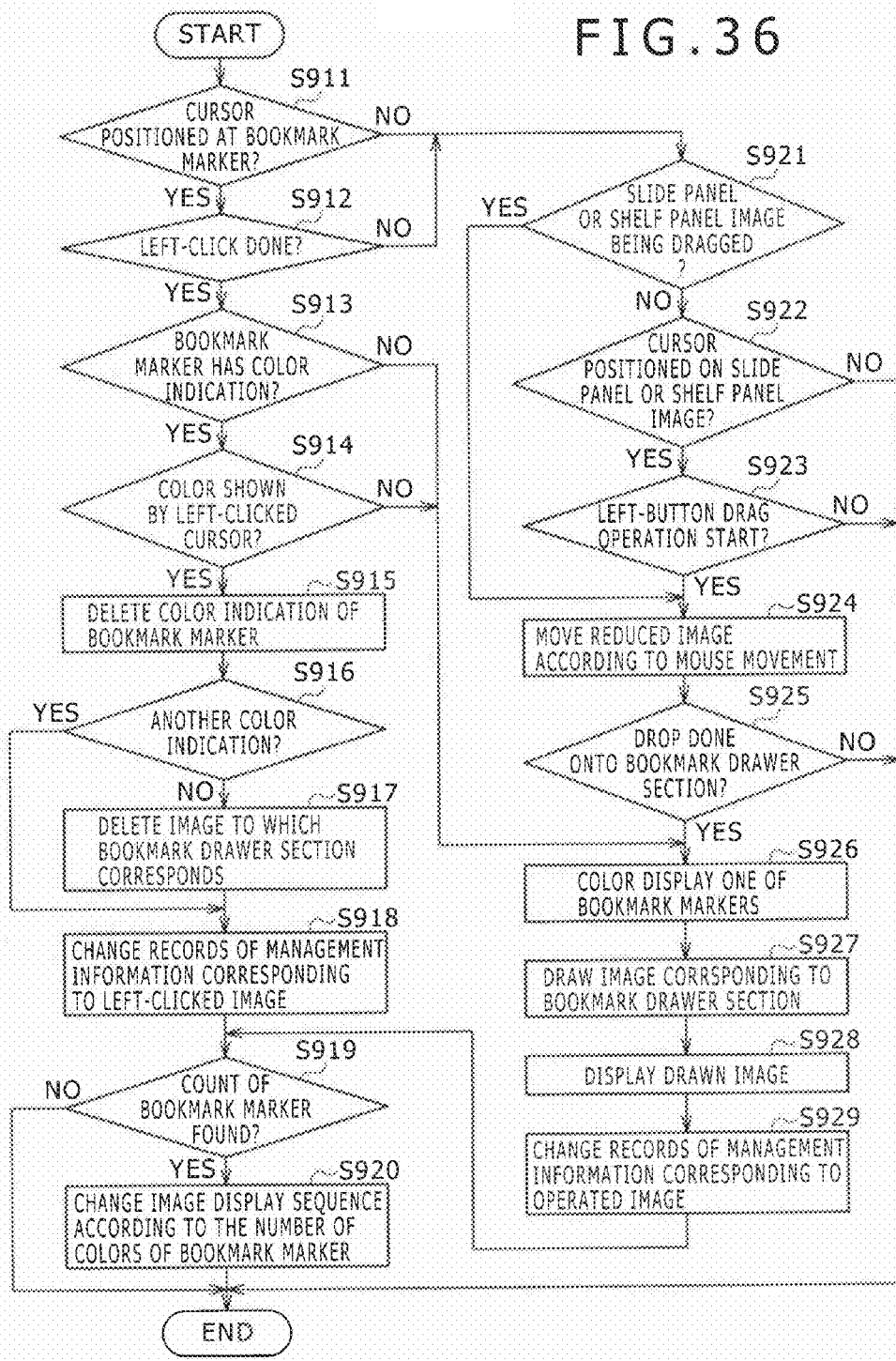
FIG. 36 is a flowchart indicative of a processing procedure of image storage or deletion processing in a bookmark drawer section by the information processing apparatus.

FIG. 36 is a flowchart indicative of a processing procedure of storing or deleting images in the bookmark drawer section 335 by the information processing apparatus 100.

First, it is determined whether a star image of the bookmark 314 displayed at the upper left of an image displayed in the slide panel 310 is pointed by a cursor (step S911). If any cursor is found positioned on the star image of the bookmark 314 (step S911), it is determined whether the mouse corresponding to that cursor has been left-clicked or not (step S912). If the left-clicking is found done by the mouse (step S912), it is determined whether any of the star images of the bookmark 314 is colored or not (step S913). If any of the star images of the bookmark 314 is found colored (step S913), then it is determined the star image was colored by the cursor corresponding to the mouse on which the left-clicking has been made immediately before (step S914).

If none of the star images of the bookmark 314 is found colored (step S913) or if the star image is not colored by the cursor corresponding to the mouse on which the left-clicking has been made immediately before (step S914), the procedure goes to step S926. One of the star images of the bookmark 314 corresponding to the image for which the left-clicking has been made (step S926) and the drawing block 250 draws a thumbnail image corresponding to the left-clicked image onto the display area of the bookmark drawer section 335 (step S927), thereby displaying the image drawn by the drawing block 250 onto the display block 270 (step S928).

On the other hand, if any of the star images is found colored by the cursor corresponding to the mouse on which the left-clicking has been made immediately before (step S914), the color display of one of the star images of the bookmark 314 is deleted (step S915) and it is determined whether at least one of the star images of the bookmark 314 is colored or not (step S916).

If none of the star images of the bookmark 314 is found colored (step S916), then the corresponding thumbnail image of the thumbnail images displayed in the bookmark drawer section 335 is deleted (step S917).

The record of the management information corresponding to the left-clicked image for the bookmark 314 is changed (step S918). To be more specific, the record associated with the left-clicked cursor in the drawer area information recorded to the management information corresponding to the left-clicked image is deleted.

It is determined whether there is any image recorded with "5" as the drawer area information of the management information corresponding to each of the images displayed in the slide panel 310 (step S919). If none of images recorded with "5" as the drawer area information (step S919), the operation of image storage or deletion processing ends. On the other hand, if there is an image recorded with "5" as the drawer area information (step S919), the sequence of images displayed in the slide panel 310 and the shelf panel 320 is changed in accordance with the number of "5"s recorded as the drawer area information (step S920). For example, the images can be sorted in the descending order of the number "5"s recorded to the drawer area information. Consequently, more popular images can be viewed earlier when reviewing two or more images stored in the image storage block 220.

If none of cursors is positioned on any star image of the bookmark 314 (step S911) or if the left-clicking has not been done (step S912), then it is determined whether an image displayed in the slide panel 310 or the shelf panel 320 has been left-button dragged or not (step S921). If an image displayed in the slide panel 310 or the shelf panel 320 is found left-button dragged (step S921), then a thumbnail image corresponding to the left-button dragged image is moved along with the cursor (step S924). On the other hand, if the left-button dragging has not been done on the image displayed in the slide panel 310 or the shelf panel 320 (step S921), then it is determined whether a cursor is positioned on the displayed part of the each image displayed in the display area of the slide panel 310 or the shelf panel 320 (step S922).

If a cursor is found positioned on the displayed part of any of the images displayed in the display area of the slide panel 310 or the shelf panel 320 (step S922), it is determined whether the left-button dragging has been started by the mouse corresponding to that cursor (step S923). If the left-button dragging is found started by the mouse (step S923), then a thumbnail image corresponding to the image with the cursor positioned is moved along with the cursor (step S924).

Next, it is determined whether a dropping operation has been done for the thumbnail image moved by the left-button dragging into the display area of the display screen 355 (step S925). If the dropping operation is found done in the display area of the bookmark drawer section 335 (step S925), then one of star images of the bookmark 314 corresponding to the dropped image is colored (step S926) and the thumbnail image corresponding to the dropped image is drawn by the drawing block 250 on the display area of the bookmark drawer section 335 (step S927), thereby displaying the image drawn by the drawing block 250 on the display block 270 (step S928).

Next, the record of the management information corresponding to the clicked or dropped image is changed (step S929). To be more specific, the counter of the bookmark is added by one. Namely, in the management information corresponding to the left-button clicked or dropped image, the record of the left-button clicked or dropped cursor in the drawer area information is added. Then, the procedure goes to step S919.

The following details an operation to be executed when storing images into any of the first drawer section 331 through the fourth drawer section 334 arranged on the drawer panel 330 with reference to drawings.

Figure 37:
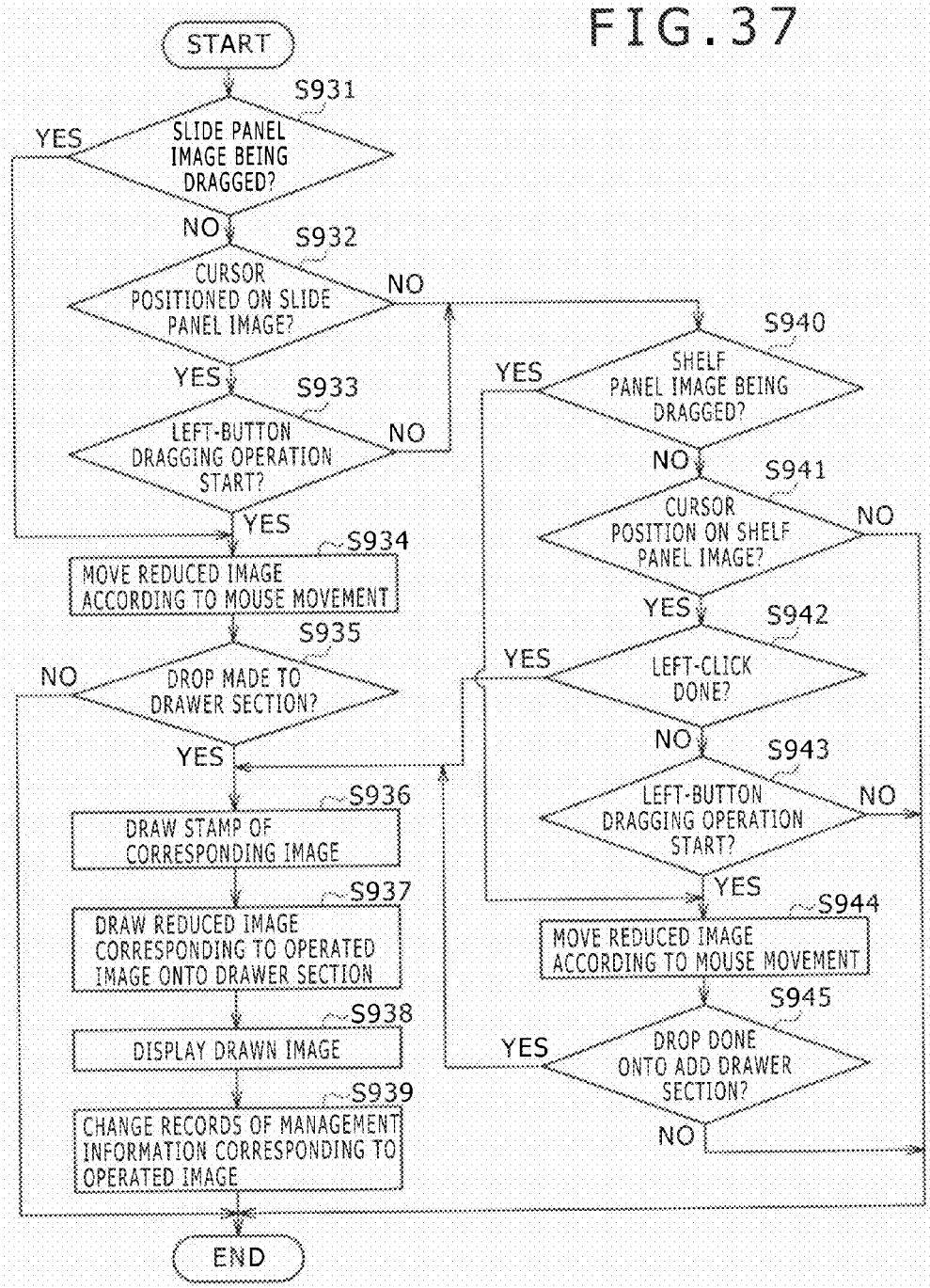
FIG. 37 is a flowchart indicative of a processing procedure of image storage processing in a first drawer section through a fourth drawer section by the information processing apparatus.

Referring to FIG. 37, there is shown a flowchart indicative of a processing procedure of storing images into any of the first drawer section 331 through the fourth drawer section 334 by the information processing apparatus 100.

First, it is determined whether an image displayed in the display area of the slide panel 310 has been left-button dragged (step S931). If an image displayed in the display area of the slide panel 310 is found left-button dragged (step S931), then a thumbnail image corresponding to the left-button dragged image is moved along with the cursor in accordance with the movement of the left-button dragging mouse (step S934). On the other hand, if an image displayed in the slide panel 310 is found not left-button dragged (step S931), it is determined whether any cursor is positioned on any of images displayed in the display area of the slide panel 310 (step S932). If any cursor is found positioned on a displayed part of any image displayed in the display area of the slide panel 310 (step S932), it is determined whether a left-button dragging has started by the mouse corresponding to that cursor (step S933). If the left-button dragging by the mouse is found started (step S933), the thumbnail image corresponding to the image with the cursor positioned is moved along with cursor in accordance with the movement of the mouse (step S934).

Next, it is determined whether a drop operation in the display area of any of the first drawer section 331 through fourth drawer section 334 has been done for the thumbnail image being moved by the above-mentioned left-button dragging operation (step S935). If a drop operation in the display area of any of the first drawer section 331 through the fourth drawer section 334 is found done (step S935), a stamp is drawn at the lower left of the dropped image and the corresponding thumbnail image (step S936). Then, the thumbnail image corresponding to the dropped image is drawn by the drawing block 250 onto the display area of the drawer section in which the image has been dropped (step S937), thereby displaying the image drawn by the drawing block 250 onto the display block 270 (step S938).

Then, the record of the management information corresponding to the dropped image is changed (step S939) For example, if the image has been stored in the first drawer section 331 as a result of the above-mentioned drop operation, "1" is recorded as the drawer area information of the management information corresponding to the dropped image.

If no cursor is found positioned on the displayed part of the images displayed in the display area of the slide panel 310 (step S932), then it is determined whether a left-button dragging has been done for a thumbnail image displayed in the display area of the shelf panel 320 (step S940). If a left-button dragging is found done for a thumbnail image displayed in the display area of the shelf panel 320 (step S940), then the thumbnail image corresponding to the left-button dragged thumbnail image is moved with the cursor in accordance with the movement of the left-button dragged mouse (step S944). On the other hand, if left-button dragging is found not done for the thumbnail image displayed in the display area of the shelf panel 320 (step S940), then it is determined whether there is any cursor positioned on the displayed part of any thumbnail image displayed in the display area of the shelf panel 320 (step S941). If there is a cursor position on the displayed part of any thumbnail image displayed in the display area of the shelf panel 320 (step S941), it is determined whether a left-clicking operation has been done by the mouse corresponding to that cursor (step S942). Then, a stamp is drawn by the drawing block 250 onto the lower left of the left-clicked thumbnail image and the image corresponding thereto (step S936). Next, the drawing block 250 draws the thumbnail image corresponding to the left-button dragged image onto the display area of the drawer section corresponding to the left-clicked cursor (step S937).

On the other hand, if the left-clicking is found not done by the mouse (step S942), then it is determined whether a left-button drag operation has been started by that mouse (step S943). If a left-button drag operation is found started by the mouse (step S943), then a thumbnail image corresponding to the image pointed by the cursor is moved along with the cursor (step S944). Next, it is determined whether a drop operation has been done in the display area of any of the first drawer section 331 through the fourth drawer section 334 for the thumbnail image being left-button dragged (step S945). If a drop operation in the display area of any of the first drawer section 331 through the fourth drawer section 334 is found done (step S945), a stamp is drawn on the lower left of the dropped image and the thumbnail image corresponding thereto (step S936).

The following describes an operation of moving images from the first drawer section 331 through the fourth drawer section 334 arranged in the drawer panel 330 with reference to drawings.

Figure 38:
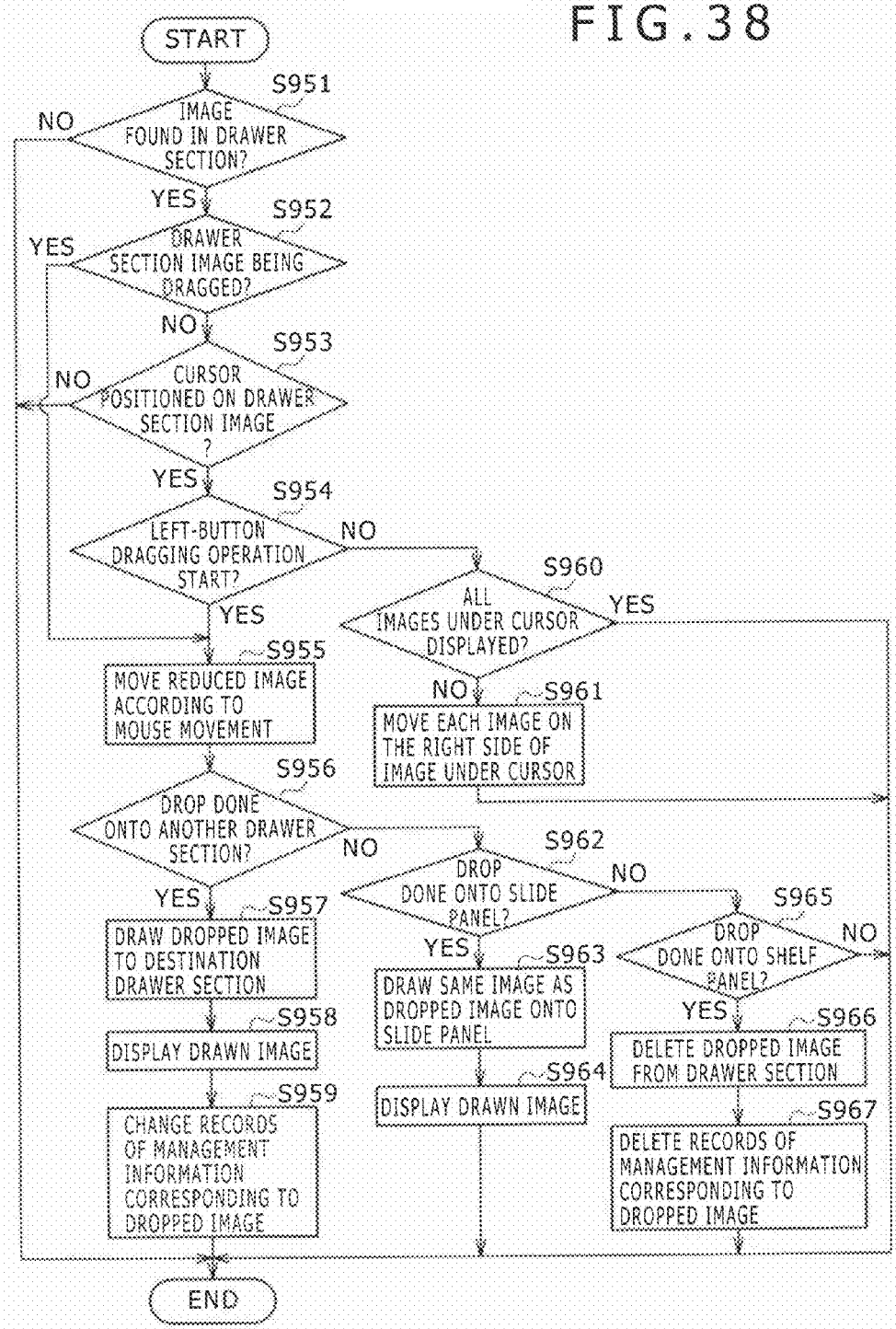
FIG. 38 is a flowchart indicative of a processing procedure of image move processing in the first drawer section through the fourth drawer section by the information processing apparatus.

FIG. 38 is a flowchart indicative of a processing procedure of moving images from the first drawer section 331 through the fourth drawer section 334 by the information processing apparatus 100.

First, it is determined whether any thumbnail image is stored in any of the first drawer section 331 through the fourth drawer section 334 (step 951). If any thumbnail image is found stored in any of the first drawer section 331 through the fourth drawer section 334 (step S951), then it is determined whether a left-button drag operation has been made for the thumbnail stored in any of the first drawer section 331 through the fourth drawer section 334 (step S952). If a left-button drag operation is found done from the thumbnail image stored in any of the first drawer section 331 through the fourth drawer section 334 (step S952), a thumbnail image corresponding to the left-button dragged image is moved along with the cursor (step S955). On the other hand, if a left-button drag operation is found not done for the thumbnail image stored in any of the first drawer section 331 through the fourth drawer section 334 (step S952), it is determined whether any cursor is positioned on any of the displayed part of the thumbnail image stored in any of the first drawer section 331 through the fourth drawer section 334 (step S953). If no thumbnail image is found in any of the first drawer section 331 through the fourth drawer section 334 (step S951) or if no cursor is found positioned on the displayed part of the thumbnail image stored in any of the first drawer section 331 through the fourth drawer section 334 (step S953), the processing procedure of the moving processing ends.

If any cursor is found positioned on the displayed part of the thumbnail image stored in the first drawer section 331 through the fourth drawer section 334 (step S953), it is determined whether a left-button drag operation has been started by the mouse corresponding to that cursor (step S954). If a left-button drag operation is found started by the mouse (step S954), a thumbnail image corresponding to the image pointed by the cursor is moved along with the cursor (step S955).

Next, it is determined whether a drop operation has been done in any of other drawer sections for the thumb image being moved by the left-button dragging (step S956). If a drop operation is found done in the display area of another drawer section for the thumbnail image being moved by that left-button dragging (step S956), the color of the stamp attached to the lower left of the dropped image and the thumbnail image corresponding thereto is changed to the color of the destination of the movement and the thumbnail image corresponding to the dropped image is drawn on the display area of that drawer section by the drawing block 250 (step S957), thereby displaying the drawn image on the display block 270 (step S958).

Then, the record of the management information corresponding to the dropped image is changed (step S959) For example, if an image has been moved from the first drawer section 331 to the third drawer section 333, the drawer area information of the management information corresponding to that image is changed from "1" to "3" and the changed information is recorded.

If a drop operation is found not done in the display area of any other drawer sections for the thumbnail image being moved by that left-dragging operation (step S956), it is determined whether a drop operations has been done in the display area of the slide panel 310 (step S962). If a drop operation is found done in the display area of the slide panel 310 for the thumbnail image being moved by that left-button dragging (step S962), the image corresponding to that thumbnail being moved along that cursor is drawn by the drawing block 250 (step S963), thereby displaying the drawn image on the display block 270 (step S964).

If a drop operation is found not done in the display area of the slide panel 310 for the thumbnail image being moved by that left-button dragging (step S962), it is determined whether a drop operations has been done in the display area of the shelf panel 320 (step S965). If a drop operation is found done in the display area of the shelf panel 320 for the thumbnail image being moved by that left-button dragging (step S965), then the stamp attached to the lower left of the dropped image and the thumbnail image corresponding thereto is deleted and the thumbnail image corresponding to the dropped image is deleted by the drawing block 250 from the display area of the drawer section in which the drop operation has been done, thereby displaying the drawn image with the thumbnail image deleted on the display block 270 (step S966).

Next, the record of the management information corresponding to the dropped image is changed (step S967). For example, if an image has been moved from the first drawer section 331 to the shelf panel 320 by that drop operation, "1" recorded as the drawer area information of the management information corresponding to that image is deleted. It should be noted that, if a drop operation is not found done in the display area of the shelf panel 320 for the thumbnail image being moved by the left-button dragging (step S965), the processing procedure of the movement processing ends.

When a cursor is positioned on any displayed part of a thumbnail image stored in any of the first drawer section 331 through the fourth drawer section 334 (step S953), if a left-button drag operation is not started by the mouse corresponding to that cursor (step S954), it is determined whether a thumbnail image below that cursor is displayed in the entirety thereof (step S960). If the thumbnail image below the cursor is not displayed in the entirety thereof (step S960), the thumbnail image to the right side of the thumbnail image below the cursor is moved to the right side (step S961). On the other hand, if the thumbnail image below the cursor is displayed in the entirety thereof (step S960), the processing procedure of the movement processing ends.

As described above, in classifying displayed photographic images, if a two or more photographic images are stored in the area of a drawer section, at least a part of stored photographic images is displayed, so that all viewing people can recognize all stored images without scrolling. It should be noted that the degree of overlapping of the photographic images can be varied in accordance with the area of each drawer section. Further, by positioning the cursor on the stored photographic image, the image under the cursor may be displayed in the entirely thereof so as to be browsed. Still further, if two or more cursors are positioned on two or more different photographic images, the above-mentioned processing can be executed on each of the photographic images, thereby executing two or more operations.

The following details an operation of providing synchronization between an image to be displayed in the display area of the slide panel 310 and a thumbnail image to be displayed in the display area of the shelf panel 320 with reference to drawings.

Figure 39:
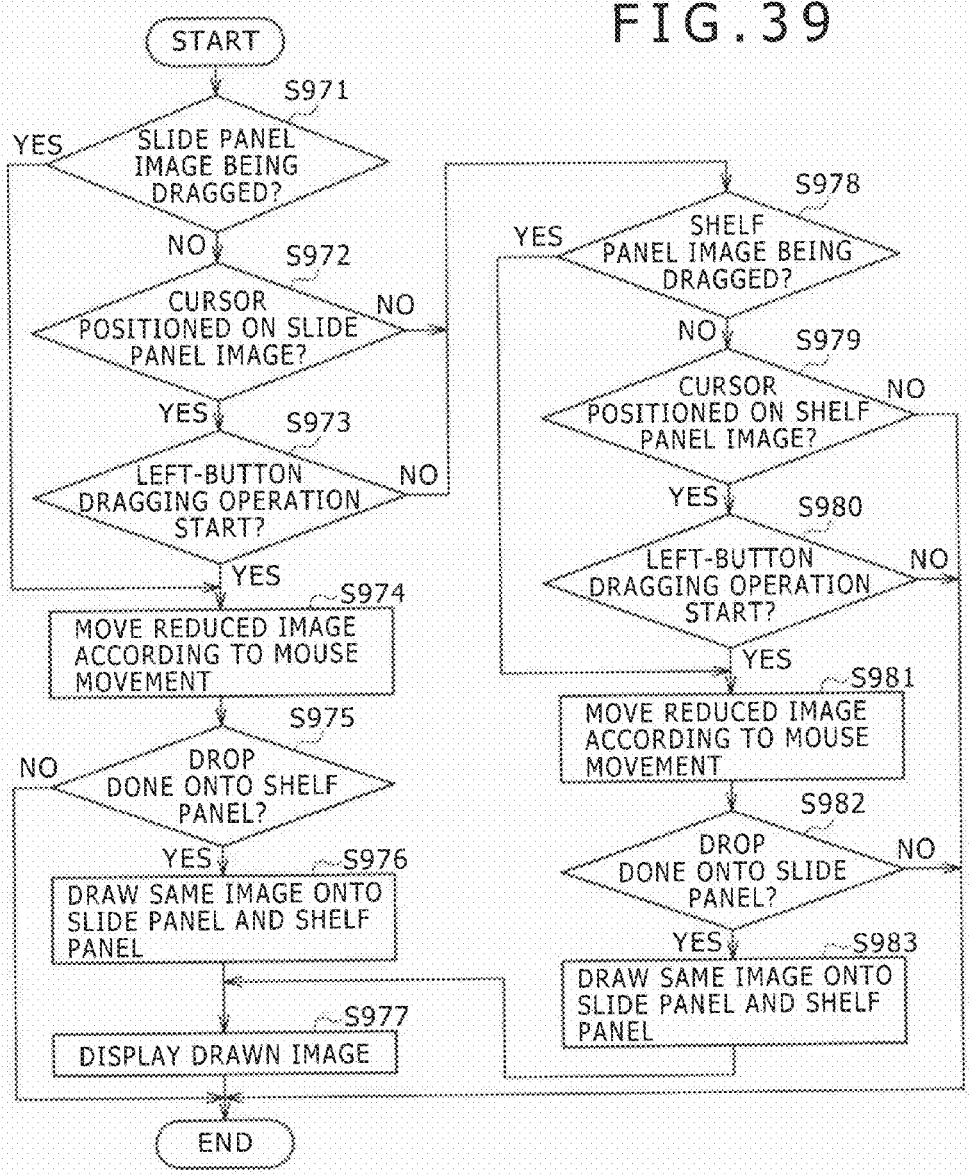
FIG. 39 is a flowchart indicative of a processing procedure of synchronization processing of images between a slide panel 310 and a shelf panel by the information processing apparatus.

FIG. 39 is a flowchart indicative of a processing procedure of providing synchronization between the images to be displayed in the slide panel 310 and the shelf panel 320 by the information processing apparatus 100.

First, it is determined whether a left-button drag operation has been done for an image displayed in the display area of the slide panel 310 (step S971). If a left-button drag operation is found done for an image displayed in the display area of the slide panel 310 (step S971), then a thumbnail image corresponding to the left-button dragged image is moved along with the cursor (step S974). On the other hand, if a left-button drag operation is found not done for an image displayed in the display area of the slide panel 310 (step S971), it is determined whether any cursor is positioned on any displayed part of each image displayed in the display area of the slide panel 310 (step S972). If a cursor is found positioned on any displayed part of each image displayed in the display area of the slide panel 310 (step S972), it is determined whether a left-button drag operation has been started by the mouse corresponding to that cursor (step S973). If a left-button drag operation is found started by that mouse (step S973), then a thumbnail image corresponding to the image with the cursor positioned is moved along with the cursor (step S974).

Next, it is determined whether a drop operation has been done in the display area of the shelf panel 320 for the thumbnail image being moved by that left-button dragging (step S975). If a drop operations is found done in the display area of the shelf panel 320 (step S975), a sequence of thumbnail images including the dropped thumbnail image are drawn on the display area of the shelf panel 320 by the drawing block 250 (step S976), displaying the image drawn by the drawing block 250 on the display block 270 (step S977).

It should be noted that a drop operation is found not done in the display area of the shelf panel 320 for the thumbnail image being moved by the left-button dragging (step S975), then the processing procedure of synchronization processing ends.

If any cursor is found positioned on the displayed part of each image displayed in the display area of the slide panel 310 (step S972) or if a left drag operations has not been started by the mouse (step S973), then it is determined whether a left-button drag operation has been done for an image displayed in the display area of the shelf panel 320 (step S978). If a left-button drag operation is found done for an image displayed in the display area of the shelf panel 320 (step S978), a thumbnail image corresponding to the left-button dragged image is moved along with the cursor (step S981). On the other hand, if a left-button drag operation is found not done for the image displayed in the display area of the shelf panel 320 (step S978), then it is determined whether any cursor is positioned on any displayed part of each image displayed in the display area of the shelf panel 320 (step S979).

If any cursor is found positioned on the displayed part of each image displayed in the display area of the shelf panel 320 (step S979), then it is determined whether a left-button drag operation has been started by the mouse corresponding to that cursor (step S980). If the left-button drag operation is found started by the mouse (step S980), then the thumbnail image corresponding to the image with the cursor positioned is moved along with the cursor (step S981).

It is determined whether a drop operation has been done in the display area of the slide panel 310 for the thumbnail image being moved by the above-mentioned left-button dragging (step S982). If a drop operation is found done in the display area of the slide panel 310 (step S982), then an image corresponding to the dropped thumbnail image is drawn on the display area of the slide panel 310 by the drawing block 250 (step S983), thereby displaying the drawn image on the display block 270 (step S977).

If a drop operation is found not done in the display area of the slide panel 310 for the thumbnail image being moved by the left-button dragging (step S982), then the processing procedure of synchronization processing ends.

If any cursor is found positioned on the displayed part of any image displayed in the display area of the shelf panel 320 (step S979) or if a left-button drag operation is not found started (step S980), the processing procedure of synchronization processing ends.

Consequently, the main area and the thumbnail area can be browsed independently. Therefore, especially when operating and browsing images by two or more viewers by use of the information processing apparatus 100, if the content displayed in the main area has been changed to a next item of content by one viewer, the other viewers can browse thumbnails without interfering the progression of this change, easily classifying images from the thumbnail area to drawer sections, for example.

Supporting the independent actions of the main area and the thumbnail area and left-button dragging the displayed content allow the easy alignment of content positions in both the main area and the thumbnail area, thereby providing flexible operations according to situations.

The following details an operation of moving an image displayed in the display area of the slide panel 310 by use of two or more mouses with reference to drawings.

Figure 40:
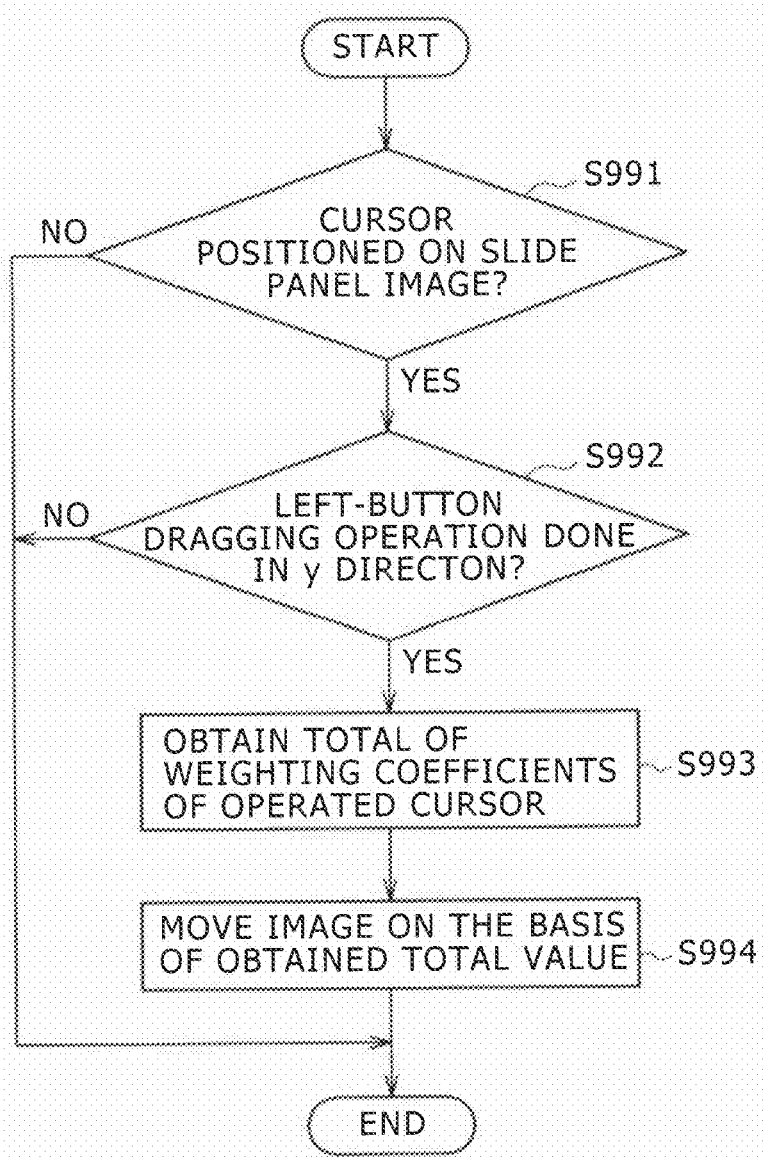
FIG. 40 is a flowchart indicative of a processing procedure of move processing of images of the slide panel 310 by the information processing apparatus.

FIG. 40 is a flowchart indicative of a processing procedure of moving an image displayed in the slide panel 310, by the information processing apparatus 100. In the following description, each of the cursors is weighted and an image is moved in accordance with a total value of cursor weights.

First, it is determined whether any cursor is positioned on the displayed part of any image shown in the display area of the slide panel 310 (step S991). If a cursor is found positioned on the displayed part of an image shown in the slide panel 310 (step S991), then it is determined whether a left-button drag operation has been done vertically by the mouse corresponding to that cursor (step S992).

When a left-button drag operation has been done vertically by any mouse (step S992), a total of weighting coefficients of the cursor of the left-button dragging is obtained in each of upper position and the lower position (step S993). Next, the image is moved in the direction of the larger total value (step S996). It should be noted that, if the only one cursor is left-button dragged, the image is moved in accordance with the movement of that cursor.

If any cursor is found not positioned on the displayed part of any image shown in the display area of the slide panel 310 (step S991) or if a left-button drag operation is found not done vertically by the mouse corresponding to the cursor positioned on the displayed part of any image shown in the display area of the slide panel 310 (step S992), the processing of moving images stored in the slide panel 310 ends.

For example, let the weight coefficient of the father cursor 301 be 3.1, the weight coefficient of the son cursor 302 and the daughter cursor 304 be 1.1 and the weight coefficient of mother cursor 303 be 2.1. In this case, if a left-button drag operation is done upward by the son cursor 302 and the daughter cursor 304 while a left-button drag operation is being done downward by the father cursor 301, a total of the weight coefficients of the cursors left-button dragged downward is 3.1 while a total of the weight coefficients of the cursors left-button dragged upward is 2.2. As a result, the image is moved downward. If a left-button drag operation is done upward by the mother cursor 303 and the daughter cursor 304 while a left-button drag operation is being done downward by the father cursor 301, a total of the weight coefficients of the cursors left-button dragged downward is 3.1 while a total of the weight coefficients of the cursors left-button dragged upward is 3.2. As a result, the image is moved upward. If four viewers participate in a slide show in which two or more viewers can make an operation at the same time, let the power of a presenter be 3 and the power of the other viewers be 1.1. Then, power 3 of the presenter is higher than the total power 2.2 of two viewers. However, when three viewers combine their powers, making a total of 3.3, it becomes higher than the power of the presenter.

Thus, when displayed images are operated by two or more peoples, cursors having different designs can be shown on a display screen and are weighted appropriately to define the role of each cursor, thereby providing multiple simultaneous operations that are well balanced for the handling of displayed images. Consequently, while maintaining the ease of operation along the intention of the presenter, other viewing peoples can be given chances of participating in the handling of displayed images, thereby providing a proportionate relationship between the presenter and other peoples.

The following details an operation of drawing lines on images shown in the display area of the slide panel 310 with reference to drawings.

Figure 41:
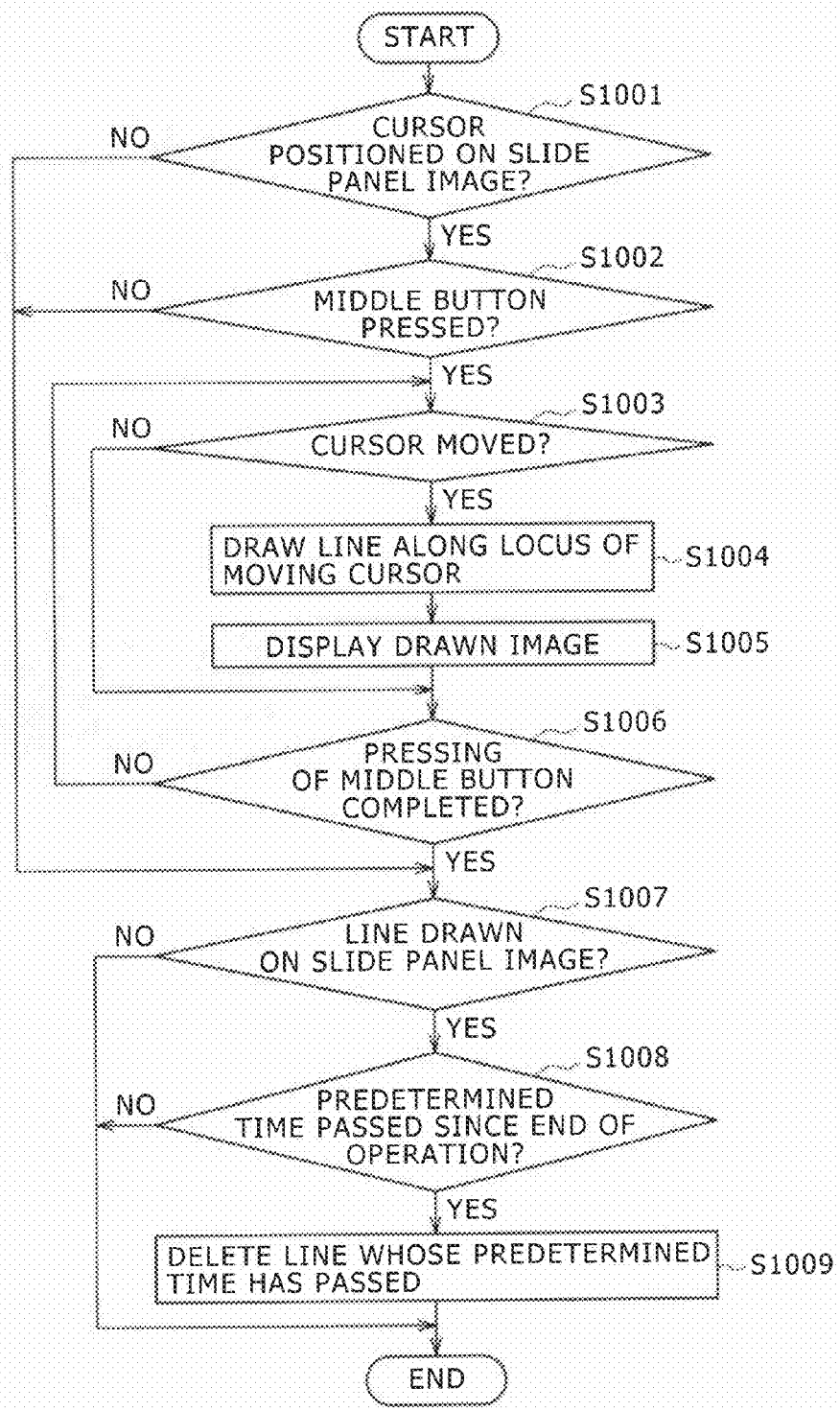
FIG. 41 is a flowchart indicative of a processing procedure of drawing processing for drawing lines on an image of the slide panel by the information processing apparatus.

FIG. 41 is a flowchart indicative of a processing procedure of drawing processing for drawing lines on images shown in the slide panel 310, by the information processing apparatus 100.

First, it is determined whether any cursor is positioned on the displayed part of any image shown in the display section of the slide panel 310 (step S1001). If any cursor is found positioned on the displayed part of an image shown in the display area of the slide panel 310 (step S1001), it is determined whether the middle button of the mouse corresponding to that cursor has been pressed or not (step S1002). If the middle button of the mouse is found pressed (step S1002), it is further determined whether the cursor has been moved by the mouse with the middle button of the mouse pressed (step S1003).

If the cursor is found moved with the middle button of the mouse pressed (step S1003), a line is drawn along the locus of the moving cursor (step S1004) and the drawn line is displayed on the image shown in the slide panel 310 (step S1005). Next, it is determined whether the middle button of the mouse has been released or not (step S1006). If the middle button of the mouse is found not released (step S1006), then the procedure goes to step S1003. If the middle button of the mouse is found released (step S1006), then the procedure goes to step S1007.

Next, it is determined whether a line has been drawn on an image shown in the slide panel 310 (step S1007). If a line is found drawn on an image shown in the slide panel 310 (step S1007), then it is determined whether a predetermined period of time has passed since the completion of the drawing of the line (step S1008). If a predetermine period of time is found passed since the completion of the drawing of the line (step S1008), then the drawn line is deleted (step S1009), upon which the processing procedure of the line drawing processing ends.

The following details an operation of enlarging a part of an image shown in the display section of the slide panel 310 and displaying the enlarged part, by the information processing apparatus 100 with reference to drawings.

Figure 42:
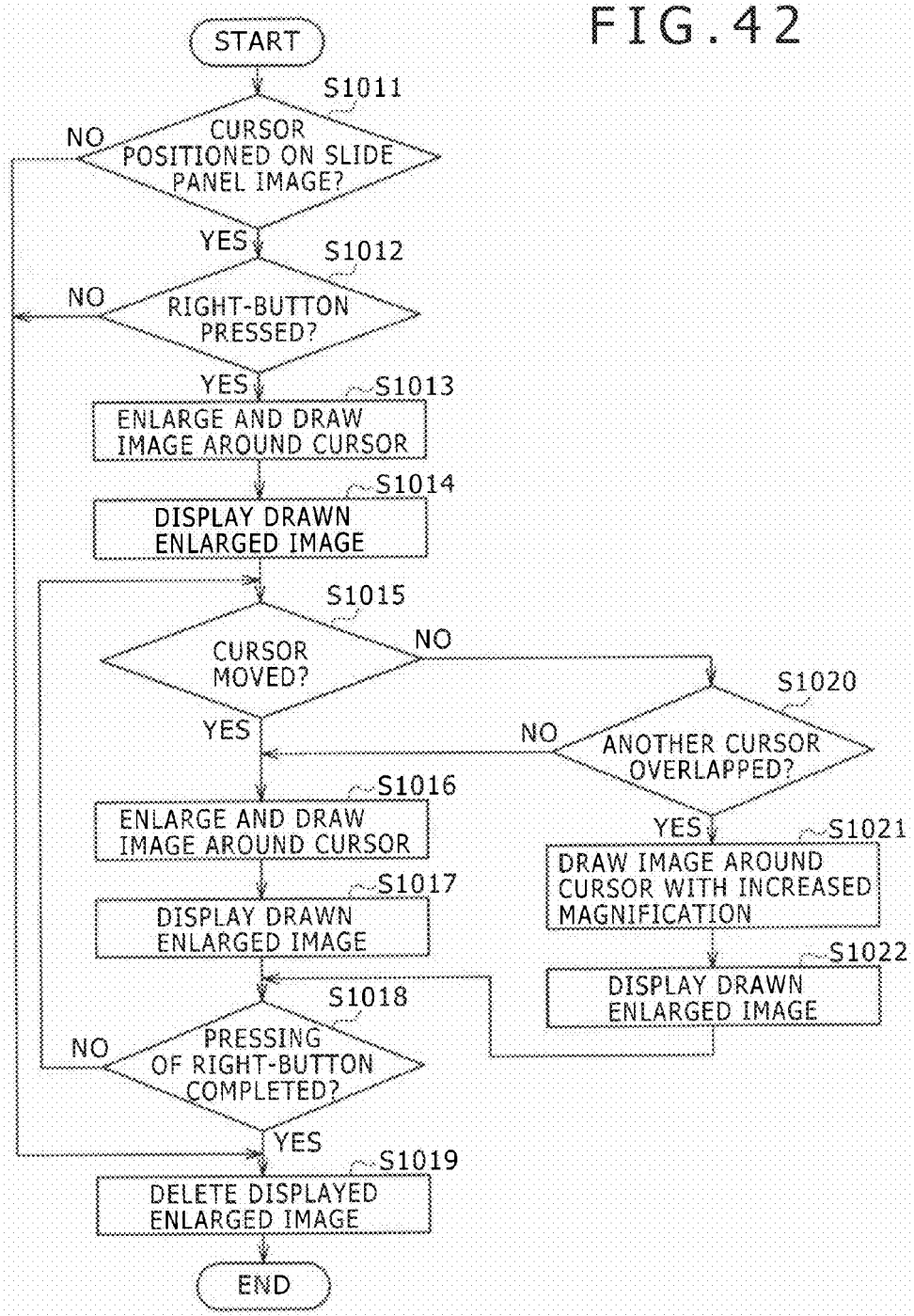
FIG. 42 is a flowchart indicative of a processing procedure of partially enlarged display processing of the slide panel by the information processing apparatus.

FIG. 42 is a flowchart indicative of a processing procedure of enlarging and displaying a part of any image shown in the slide panel 310, by the information processing apparatus 100.

First, it is determined whether any cursor is positioned on the displayed part of any image shown in the display area of the slide panel 310 (step S1011). If any cursor is found positioned on the displayed part of any image shown in the display area of the slide panel 310 (step S1011), then it is determined whether the right-side button of the mouse corresponding to that cursor has been pressed or not (step S1012). If the right-side button of the mouse is found pressed (step S1012), a rectangle image around the cursor is drawn as enlarged (step S1013) and the drawn image is displayed (step S1014).

Next, it is determined whether the cursor has been moved with the right-side button of the mouse pressed (step S1015). If the cursor is found moved with the right-side button of the mouse pressed (step S1015), then a rectangular image around the cursor is drawn as enlarged with the movement of the cursor (step S1016) thereby sequentially displaying drawn images (step S1017). Next, it is determined whether the right-button has been released or not (step S1018). If the right-side button is found not released (step S1018), then the procedure goes to step S1015. If the right-side button is found released (step S1018), then the image around the cursor is deleted (step S1019), upon which the processing procedure of enlarged display processing ends.

If the cursor is not moved with the right-side button of the mouse pressed (step S1015), then it is determined whether this cursor is superimposed with another cursor (step S1020). If this cursor is found not superimposed with another cursor (step S1020), then the procedure goes to step S1016. If this cursor is found superimposed with another cursor, then the enlargement factor of an image around that cursor is increased in accordance with the number of superimposed cursors and the image is drawn with the increased enlargement factor (step S1021), thereby displaying the drawn image (step S1022). It should be noted that it is also practicable to enlarge the size of the image around the cursor in accordance with the number of superimposed cursors.

In enlarging a part of an image shown in the slide panel 310 and displaying the enlarged image, it is also practicable to set the enlargement factor of the presenter (the father for example) to a high level and the enlargement factors of other participants to a low level. This allows the maintenance of a balance with the presenter at the center. By superimposing the cursors of other participants, the enlargement factor can be increased with ease. It is also practicable to prevent the attention of participants from being dispersed, by using one screen enlargement point, namely, without providing two or more screen enlargement points at the same time.

The following details an operation of changing the number of thumbnail images to be shown in the shelf panel 320 with reference to drawings.

Figure 43:
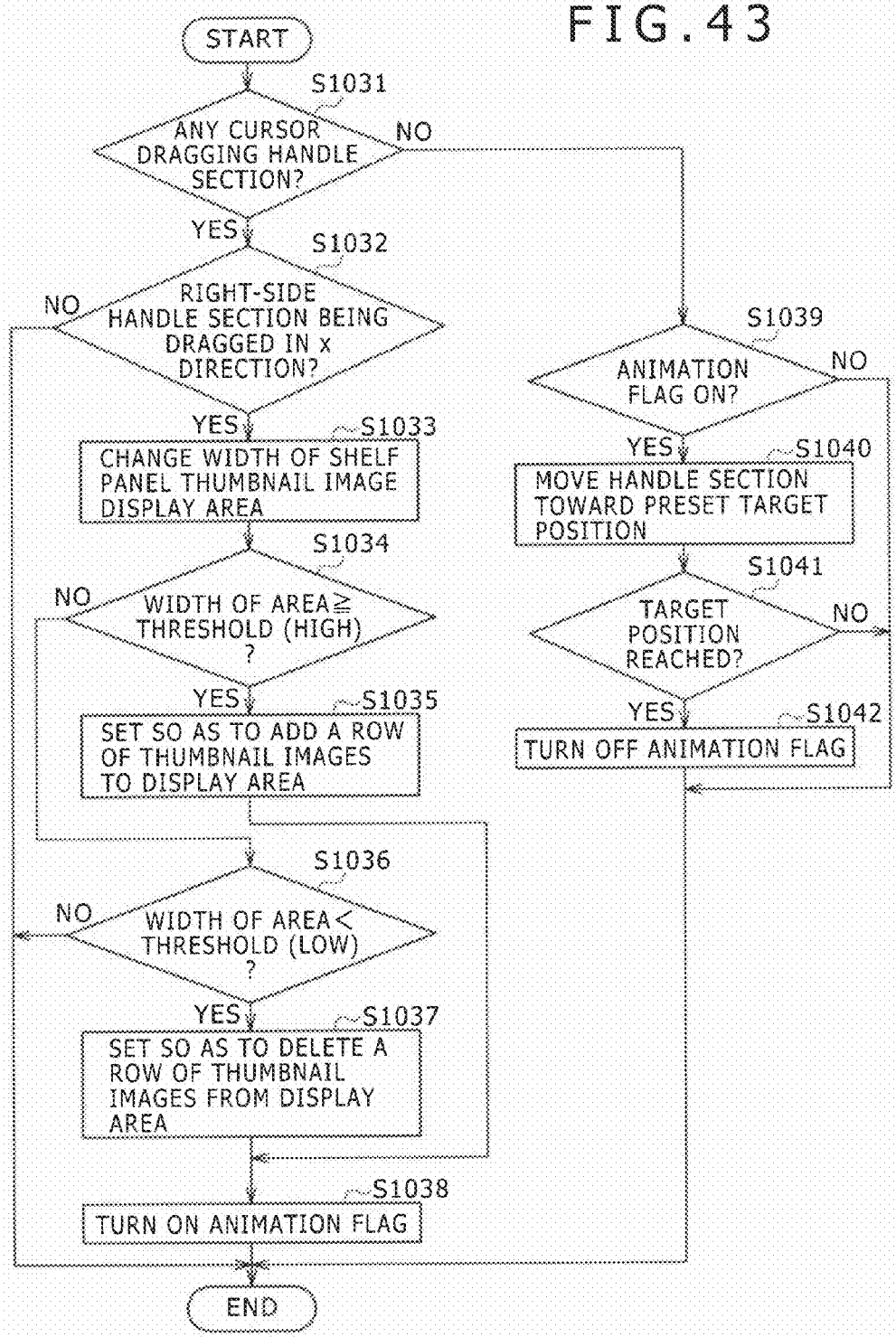
FIG. 43 is a flowchart indicative of a processing procedure of change processing of the number of thumbnail images by the information processing apparatus.

FIG. 43 is a flowchart indicative of a processing procedure of changing the number of thumbnail images to be displayed, by the information processing apparatus 100.

First, it is determined whether any cursor is dragging the right handle section 326, the upper handle section 327, or the lower handle section 328 (step S1031). For example, in FIG. 15, the right handle section 326 is dragged by the father cursor 301 to the right in the x direction.

If a cursor dragging the right handle section 326, the upper handle section 327, or the lower handle section 328 is found (step S1031), it is determined whether the right handle section 326 is left-button dragged in the x direction by that cursor (step S1032). For example, in FIG. 15, the right handle section 326 on which the father cursor 301 is positioned is left-button dragged in the x direction (to the right) in the display screen 390.

For example, if the right handle section 326 is left-button dragged by the cursor in the x direction (step S1032), the right handle section 326 is moved in accordance with that left-button drag operation (step S1033). Namely, the width of the thumbnail image display area of the shelf panel 320 is changed. It should be noted that, if the right handle section 326 is left-button dragged in the x direction by two or more cursors (step S1032) and if the left-button dragging is done with these cursors superimposed on the right handle section 326, the operation of each of these cursors is reflected (step S1033).

Next, it is determined whether the width of the thumbnail image display area of the shelf panel 320 is equal to or greater than a predetermined threshold (high) (step S1034). For example, it is determined whether a width 400 of the display area is equal to or greater than a threshold (high) 402 in the display screen 390.

If the width of the thumbnail image display area of the shelf panel 320 is equal to or greater than the predetermined threshold (high) (step S1034), the setting necessary for adding a sequence of thumbnail images to the thumbnail image display area is executed (step S1035). For example, as shown in FIG. 15, if the width 400 of the display area is equal to or greater than the threshold (high) 402 in the display screen 390 where ten (5 rows×2 columns) thumbnail images are displayed in the shelf panel 320 (step S1034), the setting is made so as to display 15 (5 row×3 columns) thumbnail images in the shelf panel 320 (step S1035). It should be noted that, if the setting is made so as to add a line of thumbnail images to the thumbnail image display area (step S1035), the line of thumbnail images arranged next to the thumbnail images displayed in the thumbnail image display area of the shelf panel 320 of the thumbnail images stored in the reduced image storage block 240. For example, as shown in FIG. 4A, if the thumbnail images 1 through 10 are displayed in the shelf panel 320, the thumbnail images 11 through 15 arranged subsequent to the thumbnail images 6 through 10 are read and displayed. Next, an animation flag for animating the 15 (5 rows×3 columns) thumbnail images to be displayed in the thumbnail image display area of the shelf panel 320 is turned on (step S1038), upon which the operation of changing the number of thumbnail image displays ends.

On the other hand, if the width of the thumbnail image display area of the shelf panel 320 is less than the predetermined threshold (high) (step S1034), then it is determined whether the width of the thumbnail image display area of the shelf panel 320 is less than a predetermined threshold (low) (step S1036).

If the width of the thumbnail image display area of the shelf panel 320 is found to be less than the predetermined threshold (low) (step S1036), then the setting is made so as to delete the line of thumbnail images at the right end from the thumbnail image display area (step S1037). For example, if 15 (5 rows×3 columns) thumbnail images are displayed in the shelf panel 320 shown in FIG. 15 and the width 400 of the display area gets less than the threshold (low) 401 (step S1036), the setting is made so as to display ten (5 rows×2 columns) thumbnail images in the thumbnail display area of the shelf panel 320 (step S1037). Next, an animation flag for animating the ten (5 rows×2 columns) thumbnail images to be displayed in the thumbnail image display area of the shelf panel 320 is turned on (step S1038), upon which the operation of changing the number of thumbnail image displays ends.

If no cursor is found dragging the right handle section 326, the upper handle section 327, or the lower handle section 328 (step S1031), it is determined whether the animation flag is turned on or not (step S1039). If the animation flag is found not turned on (step S1039), the operation of changing the number of thumbnail image displays ends.

If the animation flag is found turned on (step S1039), then the right handle section 326 is moved in an animation manner to a target position at which the number of thumbnail images set in step S1035 or step S1037 are displayed in the thumbnail image display area of the shelf panel 320 (step S1040). Next, it is determined whether the right handle section 326 has been moved to the target position in an animation manner (step S1041). Namely, it is determined whether the thumbnail image display area of the shelf panel 320 is a proper area in which to display the number of thumbnail images set in step S1035 or step S1037. If the right handle section 326 is found not reaching the target position (step S1041), the operation of changing the number of thumbnail image displays ends with the animation flag kept turned on. On the other hand, if the right handle section 326 is found reaching the target position (step S1041), then the animation flag is turned off (step S1042), upon which the operation of changing the number of thumbnail image displays end.

It should be noted that, if no cursor dragging the right handle section 326, the upper handle section 327, or the lower handle section 328 is found after the end of the operation of changing the number of thumbnail image displays (step S1031) and the animation flag is still on, the processes of step S1040 and step S1041 are executed, so that the thumbnail image display area of the shelf panel 320 becomes a proper area in an animation manner.

If the user stops a left-button drag operation when the right handle section 326 has been left-button dragged in the x direction (step S1032) and the width of the thumbnail image display area of the shelf panel 320 is neither equal to or greater than the predetermined threshold (high) (step S1034) nor below the predetermined threshold (low) (step S1036), the right handle section 326 can be returned, in an animation manner, to the position as it was before the left-button dragging was started. When a cursor is found dragging any of the right handle section 326, the upper handle section 327, and the lower handle section 328 (step S1031) and if the right handle section 326 is not left-button dragged by this cursor in the x direction (step S1032), it indicates that the upper handle section 327 or the lower handle section 328 is left-button dragged in the y direction. In this case, the operation of changing the number of thumbnail image displays ends without executing animation processing. Thus, if any of the right handle section 326, the upper handle section 327, or the lower handle section 328 is being dragged, animation processing is not executed so as to prioritize the processing according to a drag operation by each operator.

The following details an operation of switching between thumbnail images shown in the shelf panel 320 with reference to drawings.

Figure 44:
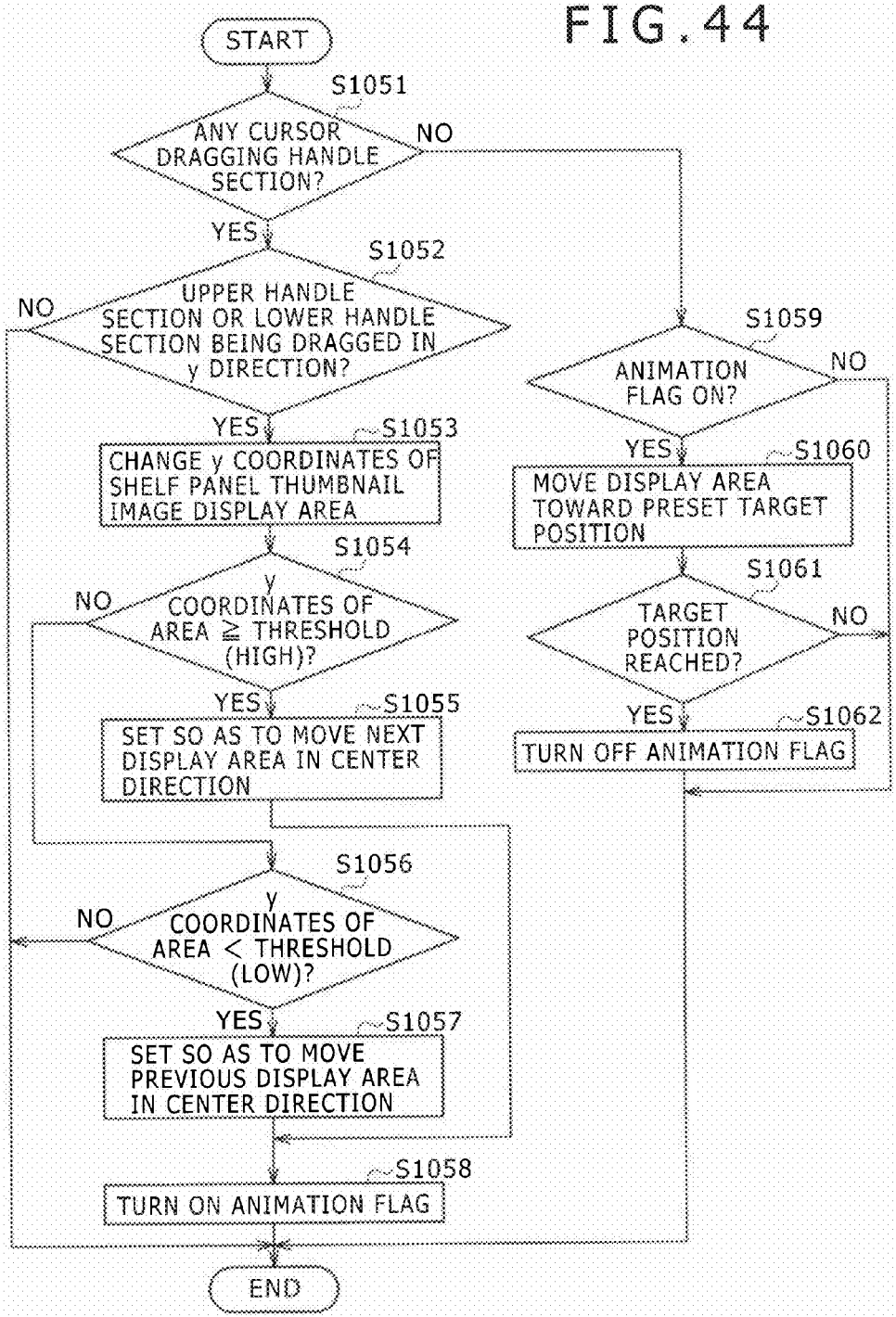
FIG. 44 is a flowchart indicative of a processing procedure of display switching processing of thumbnail images by the information processing apparatus.

FIG. 44 is a flowchart indicative of a processing procedure of switching the display of thumbnail images, by the information processing apparatus 100.

First, it is determined whether any cursor is dragging any of the right handle section 326, the upper handle section 327, and the lower handle section 328 (step S1051). For example, FIG. 16 shows that the lower handle section 328 is being dragged upward in the y direction by the father cursor 301.

If any cursor is found dragging any of the right handle section 326, the upper handle section 327, and the lower handle section 328 (step S1051), it is determined whether the upper handle section 327 or the lower handle section 328 is left-button dragged by that cursor in the y direction (step S1052).

For example, if the upper handle section 327 or the lower handle section 328 is left-button dragged by the cursor in the y direction (step S1052), the thumbnail image display area of the shelf panel 320 is moved along with the upper handle section 327 or the lower handle section 328 in accordance with this left-button drag operation (step S1053). Namely, each thumbnail image displayed in the shelf panel 320 is moved. It should be noted that, if the upper handle section 327 or the lower handle section 328 is left-button dragged in the y direction by two or more cursors (step S1052) and if the left-button dragging is done with these cursors superimposed on the upper handle section 327 or the lower handle section 328, the operation of each of these cursors is reflected (step S1053).

Next, it is determined whether the y coordinate of the thumbnail image display area of the shelf panel 320 is equal to or greater than a predetermined threshold (high) (step S1054). For example, the lower handle section 328 is left-button dragged and it is determined whether a y coordinate 410 of the display area is equal to or greater than a predetermined threshold 411 in the a display screen 391.

If the y coordinate of the thumbnail image display area of the shelf panel 320 is found to be equal to or greater than the predetermined threshold (high) (step S1054), then the setting is made so as to move a next thumbnail image display area to the center of the shelf panel 320 (step S1055). For example, a shown in FIG. 4A, if the ten thumbnail images (5 row×2 columns) 1 through 10 are displayed in the shelf panel 320 and the y coordinate 410 of the display area becomes equal to or greater than the threshold (high) 411 (step S1054), the setting is made so as to display thumbnail images 11 through 20 (FIG. 4B) arranged subsequent to the thumbnail images 1 through 10 (step S1055). Next, an animation flag for animating the thumbnail images subsequently arranged onto the thumbnail image display area of the shelf panel 320 is turned on (step S1058), upon which the operation of thumbnail image display switching ends.

On the other hand, if the y coordinate of the thumbnail image display area of the shelf panel 320 is less than the threshold (high) (step S1054), it is determined whether the y coordinate of the thumbnail image display area of the shelf panel 320 is below the predetermined threshold (low) (step S1056). For example, the upper handle section 327 is left-button dragged and it is determined whether the y coordinate of the display area is less than a threshold (low) 412 in the display screen 391.

If the y coordinate of the thumbnail image display area of the shelf panel 320 is less than the predetermined threshold (low) (step S1056), the setting is made so as to move the preceding thumbnail image display area to the center of the shelf panel 320 (step S1057). For example, as shown in FIG. 4B, if ten (5 rows×2 columns) thumbnail images 11 through 20 are displayed in the shelf panel 320 and a y coordinate 410 of the display area is less than the predetermined threshold (low) 412 (step S1056), the setting is made so as to display thumbnail images 1 through 10 arranged before the thumbnail images 11 through 20 shown in FIG. 4B onto the thumbnail image display area of the shelf panel 320 (step S1057).

Next, the animation flag for executing animation for displaying the thumbnail images arranged before the thumbnail image display area of the shelf panel 320 is turned on (step S1058), upon which the operation of thumbnail image display switching ends.

If no cursor is found dragging any of the right handle section 326, the upper handle section 327, and lower handle section 328 (step S1051), then it is determined whether the animation flag is turned on or not (step S1059). If the animation flag is found not to be on (step S1059), then the operation of thumbnail image display switching ends.

If the animation flag is found to be on (step S1059), then an operation is executed to move the thumbnail image set in step S1055 or step S1057 to a target position that is the center of the thumbnail image display area of the shelf panel 320 at which this thumbnail image is displayed (step S1060). Next, it is determined whether this thumbnail image has reached the target position or not (step S1061). Namely, it is determined whether the thumbnail image set in step S1055 or step S1057 is properly displayed in the thumbnail image display area of the shelf panel 320. If this thumbnail image is found not reaching the target position (step S1061), then the operation of thumbnail image display switching ends with the animation flag kept turned on. On the other hand, if the thumbnail image is found reaching the target position (step S1061), then the animation flag is turned off (step S1062), upon which the operation of thumbnail image display switching ends.

It should be noted that, if no cursor is found dragging any of the right handle section 326, the upper handle section 327, and the lower handle section 328 after the end of the operation of thumbnail image display switching (step S1051) and the animation flag is on, the processes of step S1060 and step S1061 are executed, so that the proper thumbnail image display is executed in the thumbnail image display area of the shelf panel 320.

It should be noted that, if, after left-button dragging the upper handle section 327 or the lower handle section 328 by the cursor in the y direction (step S1052), the user stops the left-button drag operation when the y coordinate of the thumbnail image display area of the shelf panel 320 is neither equal to or greater than the predetermined threshold (high) (step S1054) nor less than the predetermined threshold (low) (step S1056), then the upper handle section 327 or the lower handle section 328 can be returned to the position as it was before the left-button drag operation was executed in step S907 shown in FIG. 35. Also, when any cursor is found dragging the right handle section 326, the upper handle section 327, or the lower handle section 328 (step S1051), if the upper handle section 327 or the lower handle section 328 is not left-button dragged by this cursor in the y direction (step S1052), it indicates that the right handle section 326 is left-button dragged in the x direction by this cursor. In this case, the operation of thumbnail image display switching ends without executing animation processing. Thus, if any of the right handle section 326, the upper handle section 327, or the lower handle section 328 is dragged, the processing according to the drag operation by the operator is prioritized, so that animation processing is not executed. Thus, the thumbnail image display switching and the thumbnail image display count changing are not irrelevant to each other but affecting each other. Also, for example, while the father cursor 301 is left-button dragging the right handle section 326 to the right side in the x direction, the mother cursor 303 and the daughter cursor 304 can participate in the left-button dragging of the right handle section 326. Further, for example, while the father cursor 301 is left-button dragging the right handle section 326 to the right side in the x direction to change the number of thumbnail image displays, the mother cursor 303 can drag the upper handle section 327 or the lower handle section 328 to execute the thumbnail image display switching. Thus, both a thumbnail image display count changing operation and a thumbnail image display switching operation can be executed at the same time by use of two or more cursors. This allows many people to cooperate with each other in executing a display operation.

As described above, the number of thumbnail image displays can be changed with ease by enlarging or reducing the thumbnail image display area. In this case, enlarging or reducing the thumbnail image display area in an animation manner allows the user to easily see the change in enlargement or reduction. Also, this configuration allows thumbnail images to be added on a row basis in accordance with the enlargement of the thumbnail image display area. On the other hand, in accordance with the reduction of the thumbnail image display area, thumbnail images can be deleted on a row basis. Thus, the horizontal enlargement or reduction of the thumbnail image display area does not demand to move the thumbnail image display position, thereby making it unnecessary to adjust thumbnail image display positions, which allows the user to easily see the change in enlargement or reduction and thumbnail images.

Further, thumbnail image display switching vertically on a column basis can provide a seamlessly animated thumbnail image display operation. This allows the user to execute an operation different from a fine change by scrolling, thereby executing display switching that is easy for many people to see. Especially, when the information processing apparatus 100 is operated by two or more operators at the same time, the above-mentioned configuration can realize an interaction that easily copes with change.

As described above and according to the embodiments of the present invention, a software program can be provided for providing an interaction among peoples in a living room, for example, which is a common space.

In addition, the main area in which content is displayed, the thumbnail image area in which thumbnail images of content are displayed, and the drawer area in which content is stored are configured to be variable in size, so that, in accordance with occasional demands or presentation styles, the display areas can be changed into appropriate layouts.

Marking the content to be displayed on the information processing apparatus 100 allows the realtime moving of the marked content to a predetermined content storage area, thereby facilitating operations of iconic representation and classification.

In manipulating images displayed on a displace screen, a "pull" action is mainly used. Therefore, unlike button operations, display screens will not be instantaneously switched. This creates a preparatory time for the operator, in which the user can easily know the intention of other operators. This configuration allows the visual judgment of what is happening in the entire image viewing circumstances, thereby providing a useful interface in the simultaneous use by two or more peoples. Further, because a "pull" action is basic, the ease of operation can be enhanced also in the case of television, for example, seen at a distance, in which the margin for pull actions can be largely taken. Consequently, a user interface that is high in affinity as with the screen transition based on total dynamic action.

In browsing content simultaneously by two or more peoples, each operator can give an evaluation or tag to each item of content, thereby facilitating an operation of browsing only highly attractive items of content next time. It should be noted that, if content is a moving video, evaluation points can be attached to the time axis, thereby reproducing only highly attractive scenes in a digest manner, for example.

In browsing content simultaneously by two or more peoples, participants can be assigned with categories of scenery, people, animal, and so on to execute classification operations by assigned participants, thereby facilitating joint viewing and joint classification work. Consequently, as compared with a tagging operation and so on by one person, the above-mentioned configuration can quicken the work, thereby enhancing the communication among participants and executing classification work in a mood of entertainment.

In browsing content simultaneously by two or more peoples, if photographs taken in a travel joined by all participants of browsing are browed, each of the participants can execute a drag operation on the classification space of his or her own, thereby instantaneously executing browsing and classification work together. In this case, on the basis of the information recorded as drawer area information of management information, operations of printing photographs of each participant and transmitting image data to remote places can be executed with ease. In addition, arranging a direct print space for printing and a recipient space for image data transmission to remote mates, for example, as a storage area allows printing and remote sharing at the same time as browsing a classification work. Thus, setting the area of each drawer section as various classification spaces facilitates jobs such as classification, sharing, tagging, and printing at the same time as browsing.

Participating by all participants in an operation can give each operator's direct reaction to each other. Consequently, a barrier between the presenter and other participants can be lowered to enhance the sense of participation of all viewing members. Further, because all viewing members can get direct content access, the communication among the operating users can be promoted.

Because a marking operation is executed by two or more peoples, an objective ranking and so on of each participant can be easy known in addition to each person's preference, thereby providing a useful sort axis after the fixing of images.

As described above and according to the embodiments of the present invention, two or more images can be displayed such that many peoples can easily see the displayed images. In addition, each of two or more displayed images can be easily manipulated by many peoples.

It should be noted that, in the embodiments of the present invention, the information processing apparatus 100 has been described for example; it is also practicable to apply the embodiments of the present invention to image display devices, such as television receivers, that can be operated in a predetermined manner by such operating members, as a pointing device, for example. In addition, the embodiments of the present invention are applicable to any information processing system capable of displaying a same screen on the display blocks of two or more information processing apparatuses interconnected through a predetermined network and images displayed on each of these display blocks can be manipulated from each information processing apparatus. Further, the embodiments of the present invention are applicable to the displaying of document pages of document data for example instead of image data as described in viewing images, such as photographs, by use of the information processing apparatus 100.

While preferred embodiments of the present invention have been described using specific terms, such description is for illustrative purpose only, and it is to be understood that changes and variations may be made without departing from the spirit or scope of the following claims.

Namely, in claims 1 through 13, claim 14, and claim 15 attached hereto, the information processing apparatus corresponds to the information processing apparatus 100, for example.

In claim 1 and claim 13, the operation accepting means corresponds to the operation acceptance block 210, for example. The image storing means corresponds to the image storage block 220, for example. The management information storing means corresponds to the management information storage block 280, for example.

In claim 1, claim 2, claim 6, claim 8, claim 11 and claim 13, the image drawer corresponds to the drawing block 250, for example.

In claims 1 through 9, claim 11, claim 12 and claim 13, controlling means corresponds to the control block 260, for example.

In claim 2, claim 10, and claim 13, reduced image storing means corresponds to the reduced image storage block 240, for example.

In claim 10, the reduced image generating means corresponds to the reduced image generating block 230, for example.

In claim 14 or claim 15, the operation acceptance procedure corresponds to step S905. The drawing procedure corresponds to step S903. The control procedure corresponds to step S918 or step S929.

It should be noted that the processing procedures described above in the embodiments of the present invention may be understood as a method having a sequence of these procedures or a computer program for making a computer execute the sequence of these procedures, or a recording media in which this computer program is stored.

What is claimed is:
1. An information processing apparatus comprising:
circuitry configured to
store a plurality of images;
store reduced size images corresponding to each of the plurality of images;
control displaying, in a first display area, at least one of said plurality of images;
control displaying, in a second display area, a plurality of the reduced size images corresponding to the plurality of images;
control displaying, in a third display area, a plurality of storage areas that are each assigned to a specific user; and
a user interface configured to receive at least one user input selecting the at least one of the images displayed in the first display area or one of the reduced size images displayed in the second display area and dragging the at least one of the images or the reduced size images to at least one of the plurality of storage areas displayed in the third display area, wherein
the circuitry is configured to
store the at least one of the images or the one of the reduced size images to the at least one of the plurality of storage areas based on the at least one user input received at the user interface;
determine a number of times the at least one of the images or the at least one of the reduced size images is stored to the at least one of the plurality of storage areas based on the at least one user input received at the user interface; and
control displaying a graphic indicia indicating the determined number of times that the at least one of the images or the at least one of the reduced size images is stored to the at least one of the plurality of storage areas.

2. The information processing apparatus according to claim 1, wherein the circuitry is configured to control displaying a marker indicative of said at least one of the storage areas in proximity to said selected at least one of the images displayed in the first display area or one of the reduced size images displayed in the second display area in response to receiving said at least one user input.

3. The information processing apparatus according to claim 1, wherein, when a predetermined input is received at said user interface, said circuitry is configured to control enlarging or reducing a size of at least one of said storage areas.

4. The information processing apparatus according to claim 1, wherein said circuitry is configured to control displaying each of said storage areas as a rectangular area adjacent to said first display area, and
when a user input commanding movement of an end portion adjacent to said first display area in each of said storage areas toward said first display area is received at said user interface, said circuitry is configured to control moving said end portion in accordance with said user input to enlarge each of said storage areas.

5. The information processing apparatus according to claim 1, wherein, when at least two reduced size images are displayed in any of said storage areas, said circuitry is configured to control displaying the at least two reduced size images so as to be overlapped with one another with at least a part displayed in said storage area.

6. The information processing apparatus according to claim 5, wherein said circuitry is configured to control displaying a cursor that moves in accordance with a user input received at said user interface, and
when said cursor is superimposed on any of a plurality of reduced size images drawn as superimposed on each other in any of said storage areas, said circuitry is configured to control moving each reduced size image superimposed on said reduced size image to display said reduced size image in the entirety thereof.

7. The information processing apparatus of claim 1, wherein
one of the storage areas corresponds to a bookmark area, and
the circuitry is configured to control storing at least one of the images displayed in the first display area or one of the reduced size images displayed in the second display area in the bookmark area upon receiving a predetermined user input at the user interface.

8. The information processing apparatus of claim 7, wherein
the circuitry is configured to control displaying a graphic indicia indicating whether the at least one of the images displayed in the first display area or the one of the reduced size images displayed in the second display are stored in the bookmark area.

9. The information processing apparatus according to claim 1, wherein, when a predetermined user input is received at said user interface, said circuitry is configured to control displaying such that a reduced size image included in one of the storage areas corresponds to at least one of images included in said first display area.

10. The information processing apparatus according to claim 1, wherein the circuitry is configured to generate the reduced size images corresponding to said plurality of stored images.

11. The information processing apparatus according to claim 1, wherein said circuitry is configured to control displaying a cursor that moves in accordance with a user input received at said user interface, and
when a predetermined drag operation is received at said user interface when said cursor is superimposed on a predetermined area, said circuitry is configured to control displaying an image associated with said predetermined area in accordance with said drag operation.

12. The information processing apparatus according to claim 1, wherein said circuitry is configured to control, in accordance with a user input received at said user interface, moving a displayed image.

13. The information processing apparatus according to claim 1, wherein
the user input is configured to receive a plurality of user inputs each selecting the at least one of the images displayed in the first display area or one of the reduced size images displayed in the second display area and dragging the at least one of the images or the reduced size images to at least one of the plurality of storage areas displayed in the third display area, and
the circuitry is configured to
count a number of times the at least one of the images or the at least one of the reduced size images is stored to the at least one of the plurality of storage areas based on the user inputs received at the user interface; and
control displaying a graphic indicia indicating the counted number of times that the at least one of the images or the at least one of the reduced size images is stored to the at least one of the plurality of storage areas.

14. The information processing apparatus according to claim 1, wherein
the circuitry is configured to control displaying a plurality of cursors that are each graphically customized to correspond to one of the plurality of storage areas.

15. The information processing apparatus of claim 14, wherein
a first cursor corresponds to a first storage area and a second cursor corresponds to a second storage area, and
when the user interface receives an input corresponding to the first cursor dragging the at least one of the images displayed in the first display area or one of the reduced size images displayed in the second display area to the second storage area, the circuitry is configured to control displaying the at least one of the images displayed in the first display area or one of the reduced size images displayed in the second display area in the second storage area with an icon corresponding to the first cursor disposed thereon.

16. The information processing apparatus of claim 5, wherein
when the user interface receives a user input instructing an increase or decrease of said storage area, the circuitry is configured to increase or decrease a size of said storage area and decrease or increase an overlap amount of the at least two reduced size images.

17. A method performed by an information processing apparatus having a memory configured to store a plurality of images and reduced size images corresponding to each of the plurality of images, the method comprising:
controlling displaying, in a first display area, at least one of said plurality of images stored in said memory;
controlling displaying, in a second display area, a plurality of the reduced size images corresponding to the plurality of images;

controlling displaying, in a third display area, a plurality of storage areas that are each assigned to a specific user;

receiving, at a user interface of the information processing apparatus, at least one user input selecting the at least one of the images displayed in the first display area or one of the reduced size images displayed in the second display area and dragging the at least one of the images or the reduced size images to at least one of the plurality of storage areas displayed in the third display area;

storing the at least one of the images or the one of the reduced size images to the at least one of the plurality of storage areas based on the at least one user input received at the user interface;

determining a number of times the at least one of the images or the at least one of the reduced size images is stored to the at least one of the plurality of storage areas based on the at least one user input received at the user interface; and controlling displaying a graphic indicia indicating the determined number of times that the at least one of the images or the at least one of the reduced size images is stored to the at least one of the plurality of storage areas.

18. A non-transitory computer-readable medium including a program configured to cause a computer execute, in an information processing apparatus having a memory configured to store a plurality of images and reduced size images corresponding to each of the plurality of images, a method comprising:

controlling displaying, in a first display area, at least one of said plurality of images stored in said memory;

controlling displaying, in a second display area, a plurality of the reduced size images corresponding to the plurality of images;

controlling displaying, in a third display area, a plurality of storage areas that are each assigned to a specific user;

receiving, at a user interface of the information processing apparatus, at least one user input selecting the at least one of the images displayed in the first display area or one of the reduced size images displayed in the second display area and dragging the at least one of the images or the reduced size images to at least one of the plurality of storage areas displayed in the third display area;

storing the at least one of the images or the one of the reduced size images to the at least one of the plurality of storage areas based on the at least one user input received at the user interface;

determining a number of times the at least one of the images or the at least one of the reduced size images is stored to the at least one of the plurality of storage areas based on the at least one user input received at the user interface; and controlling displaying a graphic indicia indicating the determined number of times that the at least one of the images or the at least one of the reduced size images is stored to the at least one of the plurality of storage areas.

19. An information processing apparatus comprising:

means for storing a plurality of images;

means for storing reduced size images corresponding to each of the plurality of images;

means for controlling displaying, in a first display area, at least one of the images stored in said means for storing the plurality of images;

means for controlling displaying, in a second display area, a plurality of the reduced size images corresponding to the plurality of images;

means for controlling displaying, in a third display area, a plurality of storage areas that are each assigned to a specific user;

means for receiving at least one user input selecting the at least one of the images displayed in the first display area or one of the reduced size images displayed in the second display area and dragging the at least one of the images or the reduced size images to at least one of the plurality of storage areas displayed in the third display area; and means for storing the at least one of the images or the one of the reduced size images to the at least one of the plurality of storage areas based on the at least one user input received at the user interface;

means for determining a number of times the at least one of the images or the at least one of the reduced size images is stored to the at least one of the plurality of storage areas based on the at least one user input received at the user interface; and means for controlling displaying a graphic indicia indicating the determined number of times that the at least one of the images or the at least one of the reduced size images is stored to the at least one of the plurality of storage areas.

* * * * *